(12) United States Patent
Tamaki et al.

(10) Patent No.: US 8,624,867 B2
(45) Date of Patent: Jan. 7, 2014

(54) LIQUID CRYSTAL DISPLAY DEVICE, MANUFACTURING METHOD OF LIQUID CRYSTAL DISPLAY DEVICE, DISPLAY DEVICE AND INFORMATION INPUT APPARATUS

(75) Inventors: Masaya Tamaki, Kanagawa (JP); Takeo Koito, Aichi (JP); Masato Imai, Aichi (JP)

(73) Assignee: Japan Display West Inc., Aichi (JP)

( * ) Notice: Subject to any disclaimer, the term of this patent is extended or adjusted under 35 U.S.C. 154(b) by 508 days.

(21) Appl. No.: 12/694,347

(22) Filed: Jan. 27, 2010

(65) Prior Publication Data

US 2010/0194709 A1 Aug. 5, 2010

(30) Foreign Application Priority Data

Feb. 4, 2009 (JP) ................................ 2009-023931
Nov. 20, 2009 (JP) ................................ 2009-265486

(51) Int. Cl.
*G06F 3/041* (2006.01)

(52) U.S. Cl.
USPC .............................. 345/174; 349/12; 349/160

(58) Field of Classification Search
USPC ....................................................... 345/174
See application file for complete search history.

(56) References Cited

U.S. PATENT DOCUMENTS

| 6,501,529 | B1 * | 12/2002 | Kurihara et al. | ............... 349/160 |
| 2007/0070047 | A1 | 3/2007 | Jeon et al. | |
| 2008/0151133 | A1 * | 6/2008 | Kim et al. | ....................... 349/12 |

FOREIGN PATENT DOCUMENTS

| JP | 2000-267114 | 9/2000 |
| JP | 2001-075074 | 3/2001 |
| JP | 2007-052368 | 3/2007 |
| JP | 2007-095044 | 4/2007 |
| JP | 2008-026345 | 2/2008 |
| JP | 2008-116938 | 5/2008 |
| WO | 2010/035371 | 4/2010 |

OTHER PUBLICATIONS

Japanese Office Action issued on Mar. 8, 2011 in connection with counterpart JP Application No. 2009-265486.

* cited by examiner

*Primary Examiner* — Sumati Lefkowitz
*Assistant Examiner* — Jose Soto Lopez
(74) *Attorney, Agent, or Firm* — Dentons US LLP

(57) ABSTRACT

A display device includes: a display panel including first and second substrates spaced from and opposite to each other, and has a touch sensor switch. The touch sensor switch includes a first touch electrode provided on a surface of the first substrate facing the second substrate, and a second touch electrode provided on a surface of the second substrate facing the first substrate and spaced from and faces the first touch electrode. The first and second touch electrodes contact with each other when the touch panel is deformed by an external pressure. The first touch electrode covers a surface of a concave and convex area where grooves are formed to be spaced from each other, and on the surface on which the first touch electrode is provided, an application film is provided to expose a surface of a top face of a convex part of the concave and convex area.

7 Claims, 55 Drawing Sheets

FIG.7
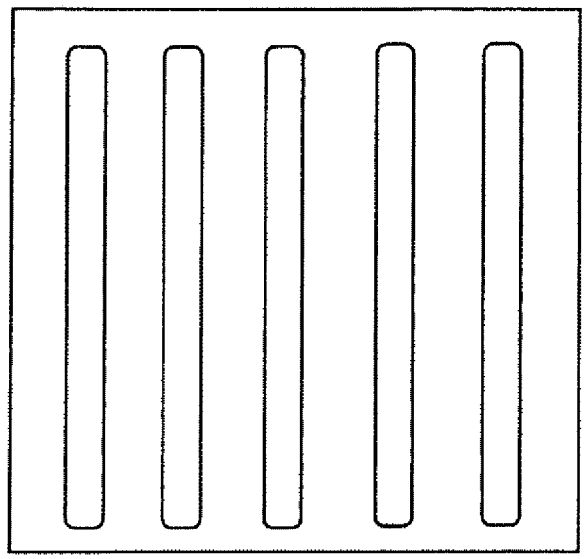
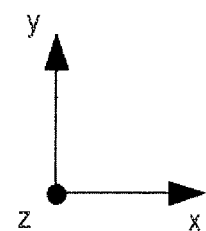

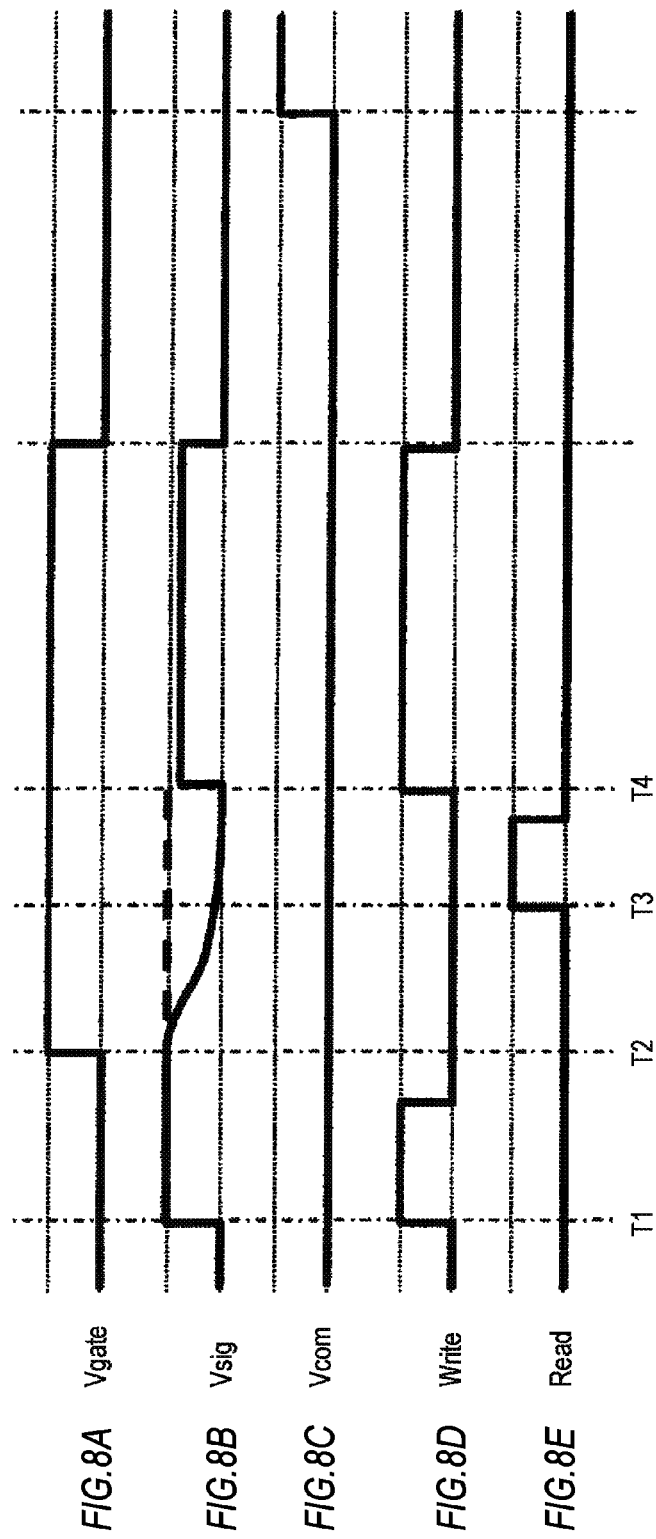

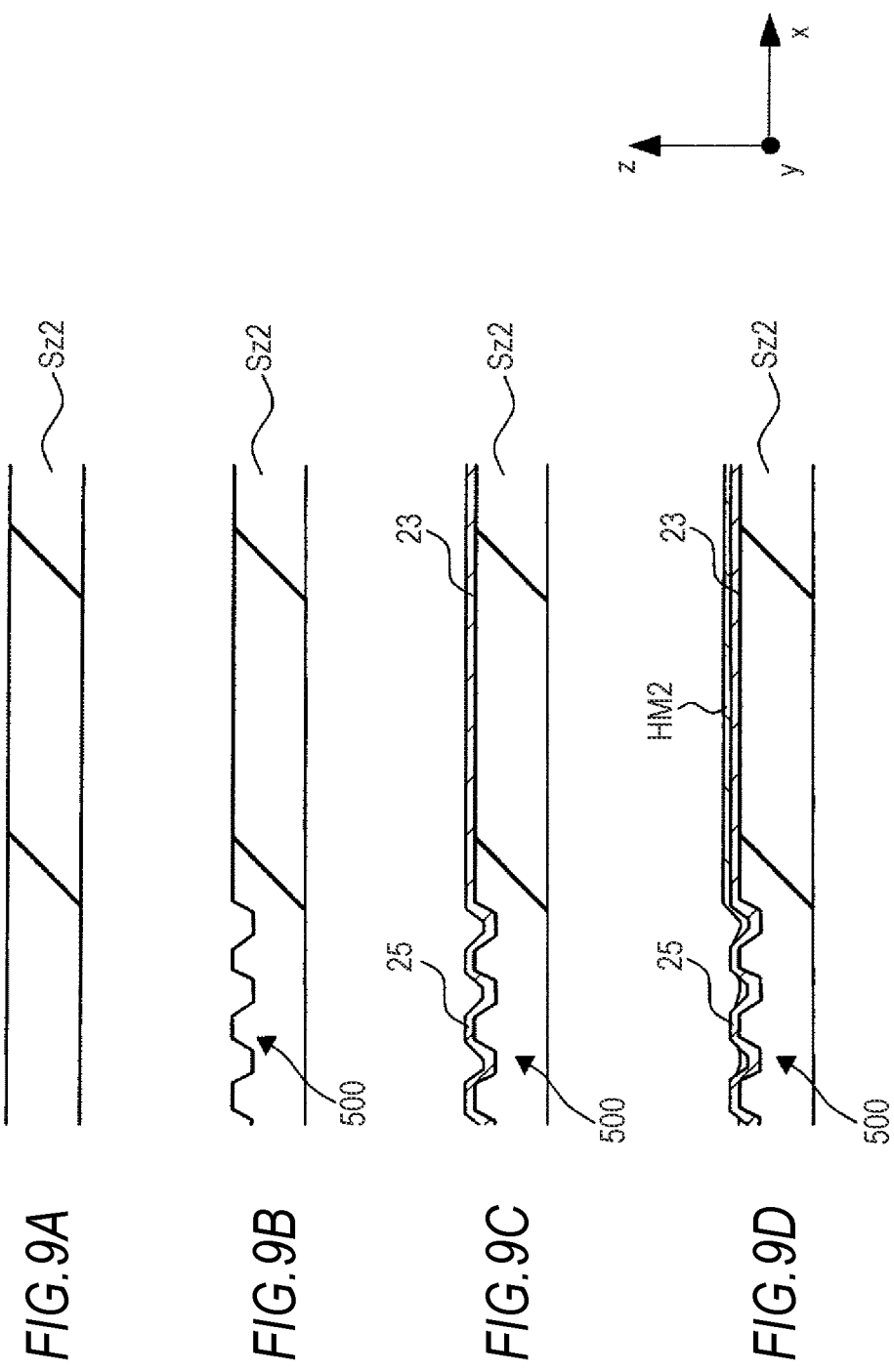

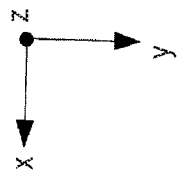
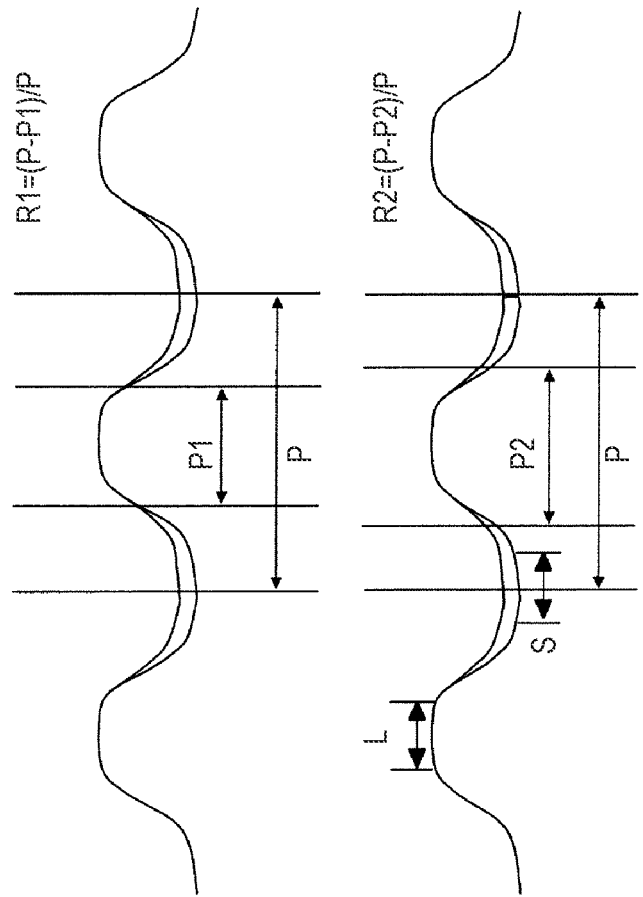
FIG.11A
FIG.11B

FIG.12
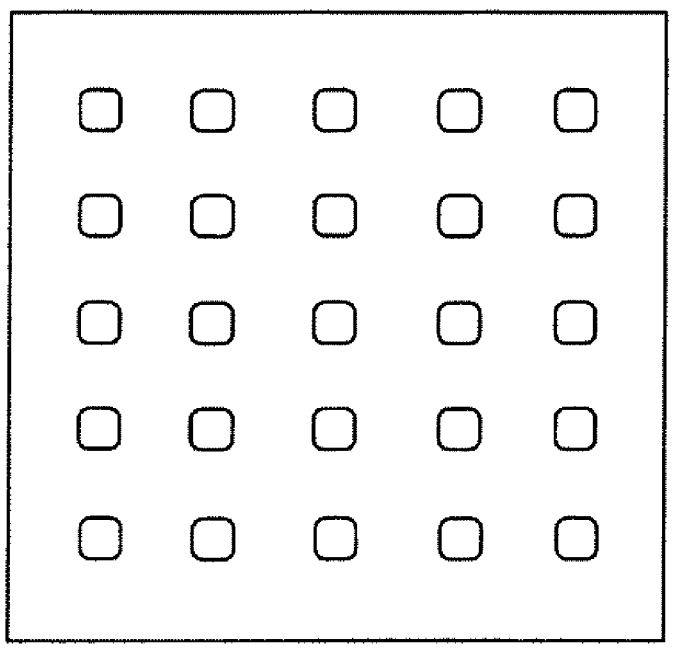
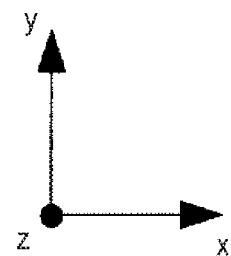

FIG.13
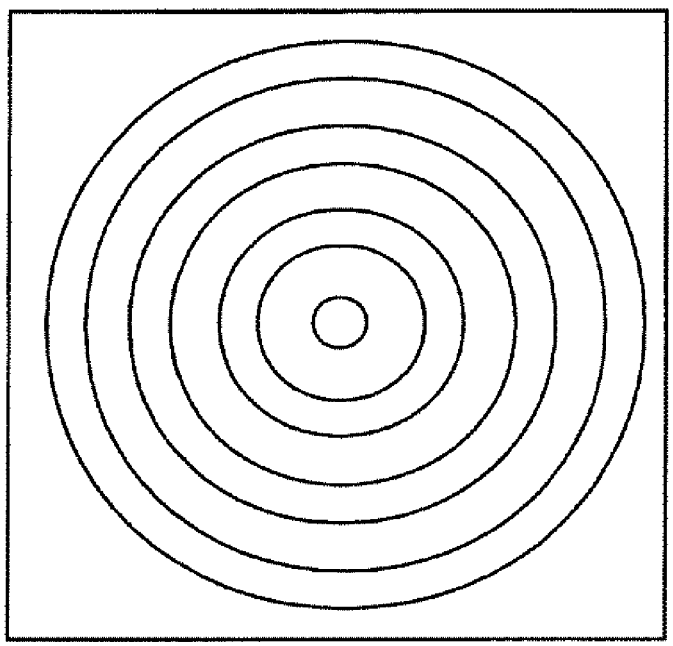
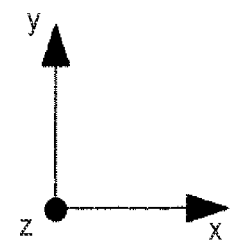

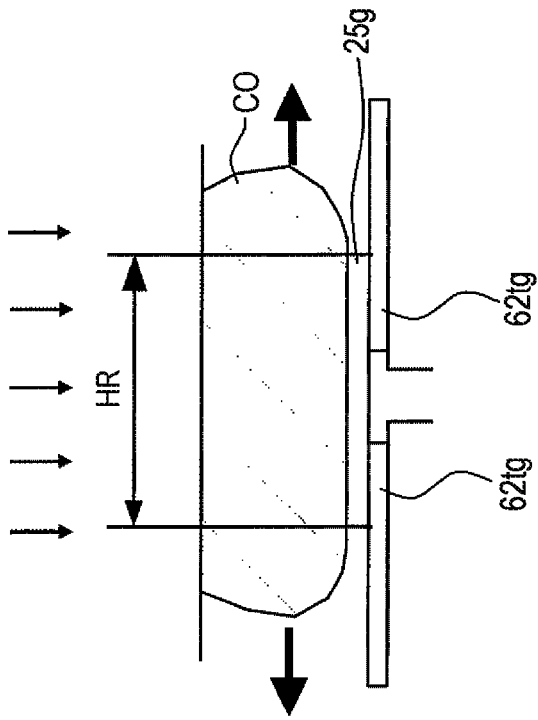
FIG.26B (AFTER EXTERNAL PRESSURE IS APPLIED)
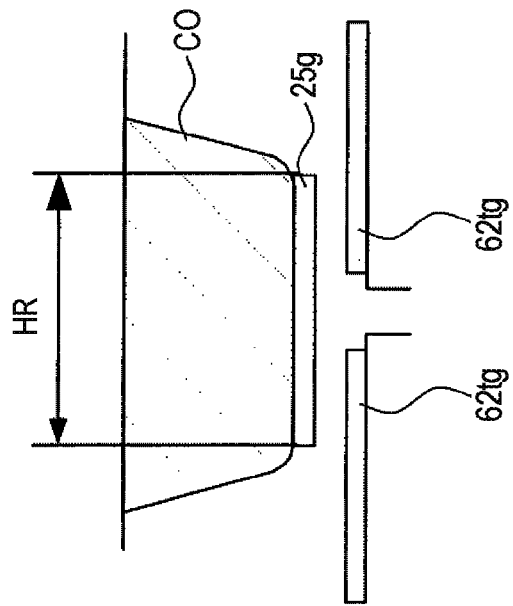
FIG.26A (BEFORE EXTERNAL PRESSURE IS APPLIED)

FIG.28

| TAPER ANGLE θ (°) | PRESSURE (Pa) | DISPLACEMENT (m) |
|---|---|---|
| 90 | 1.00E+09 | 1.050E-04 |
| 78 | 1.11E+09 | 1.050E-04 |
| 68 | 1.22E+09 | 6.480E-05 |
| 59 | 1.37E+09 | 7.000E-05 |
| 51 | 1.54E+09 | 7.730E-05 |
| 45 | 1.75E+09 | 8.480E-05 |

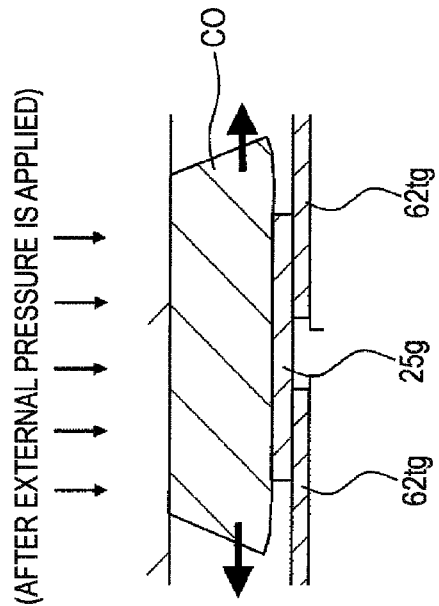
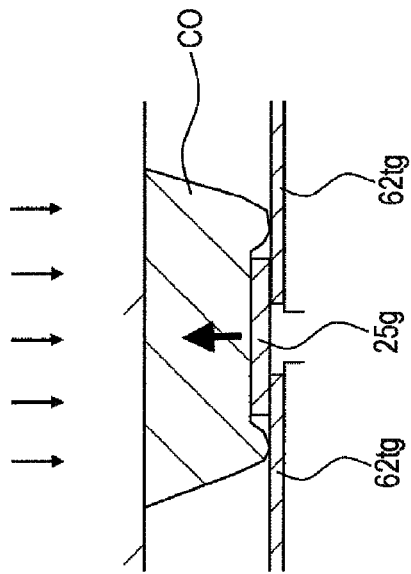
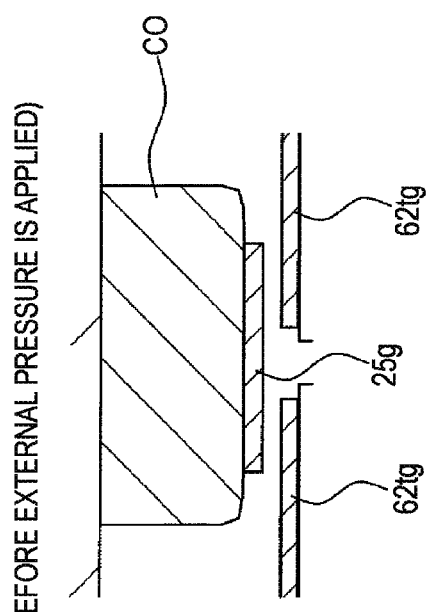
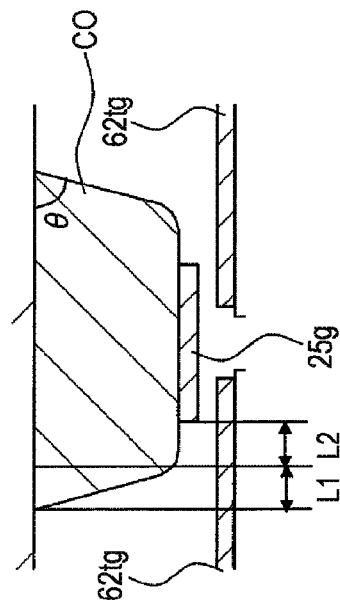
FIG.29A
FIG.29B

FIG.31
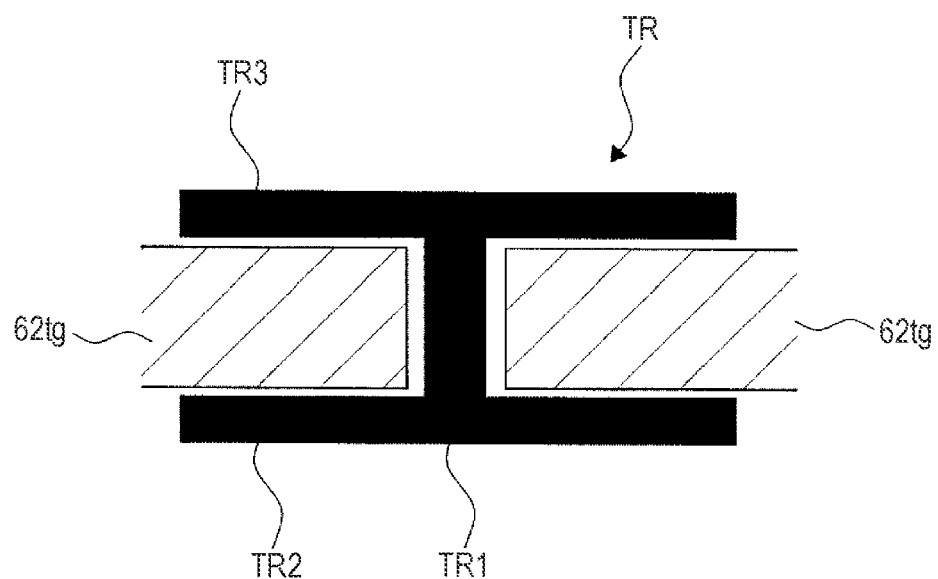
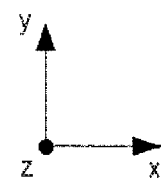

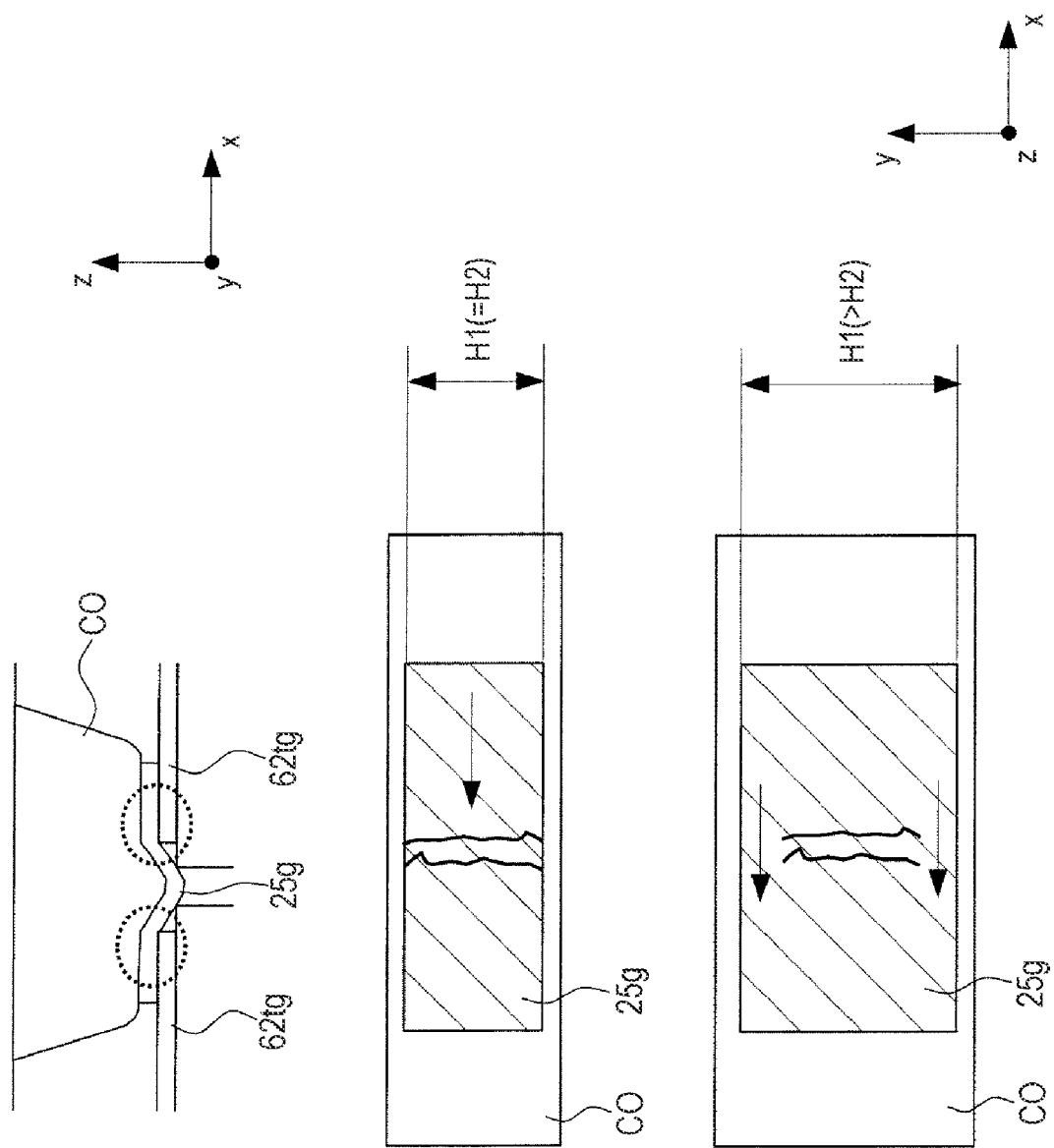

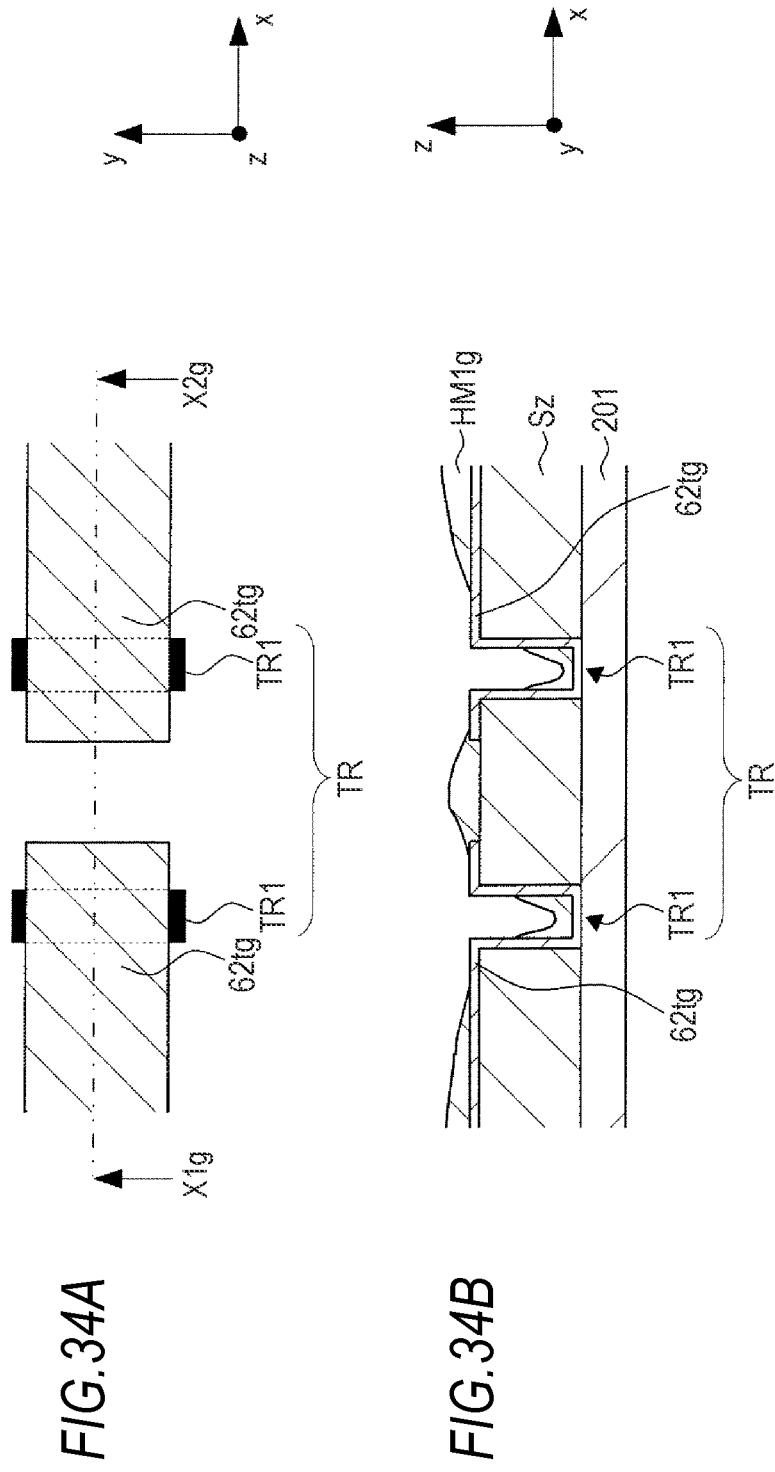

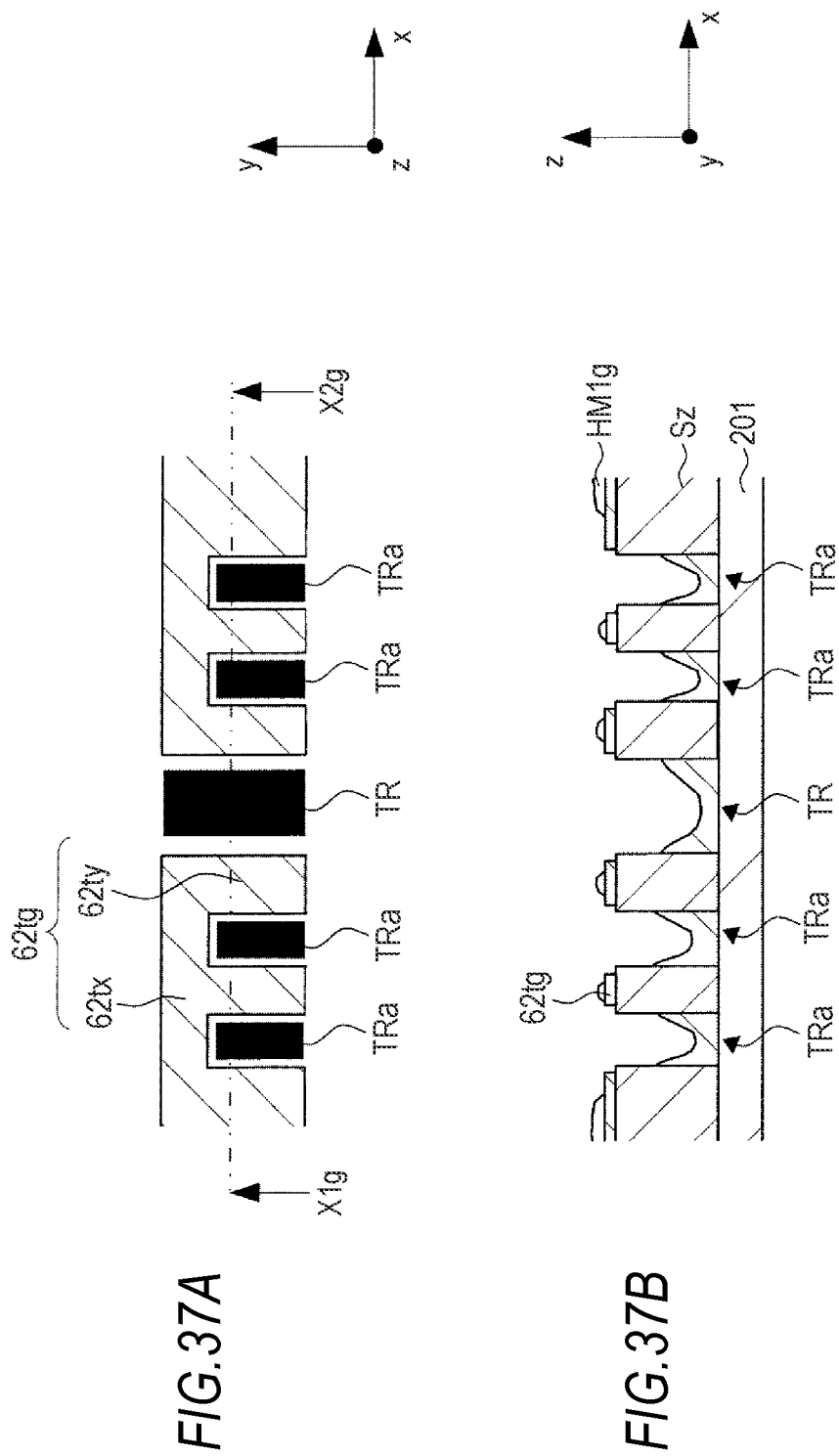

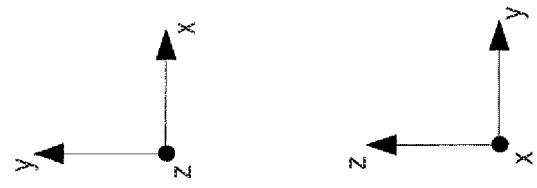
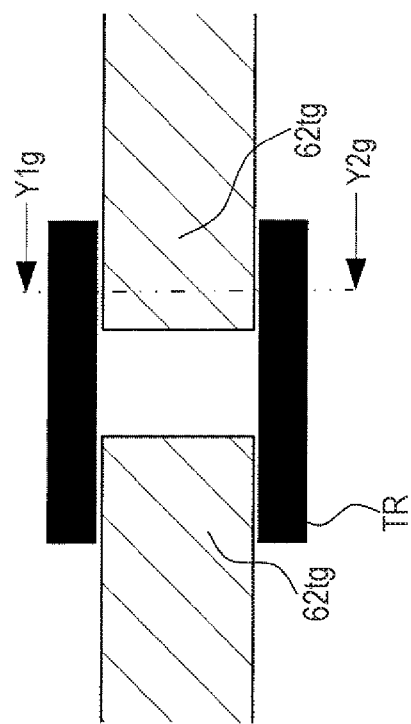
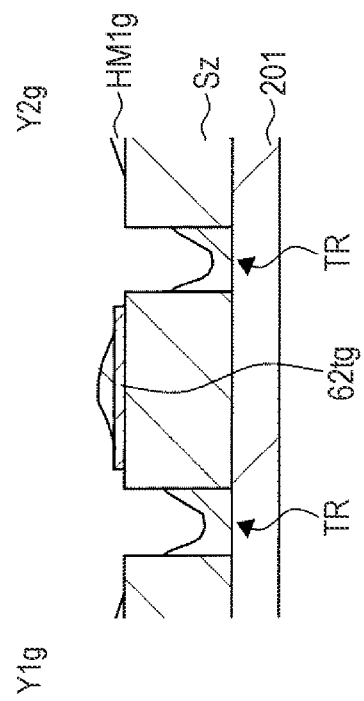
FIG.39A
FIG.39B

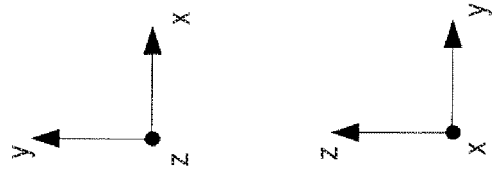
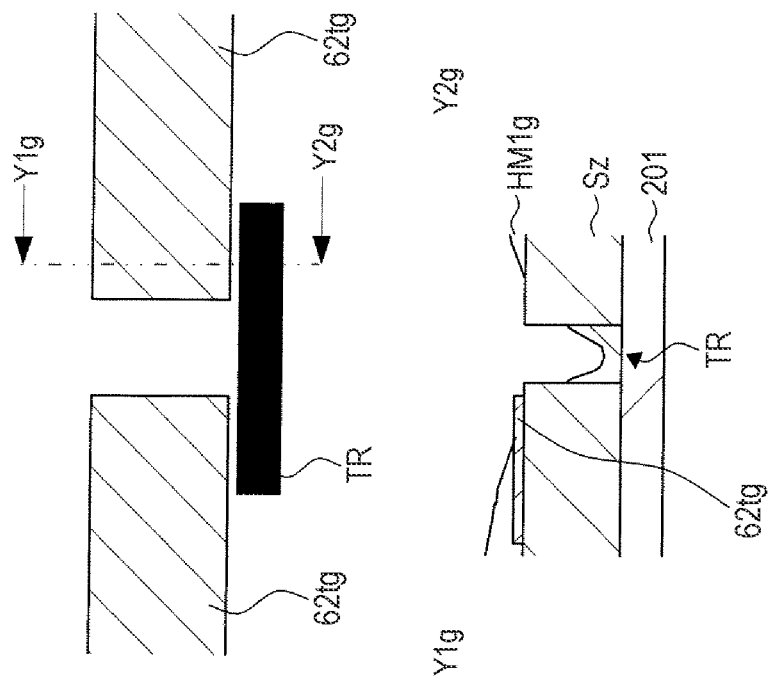
FIG. 40A
FIG. 40B

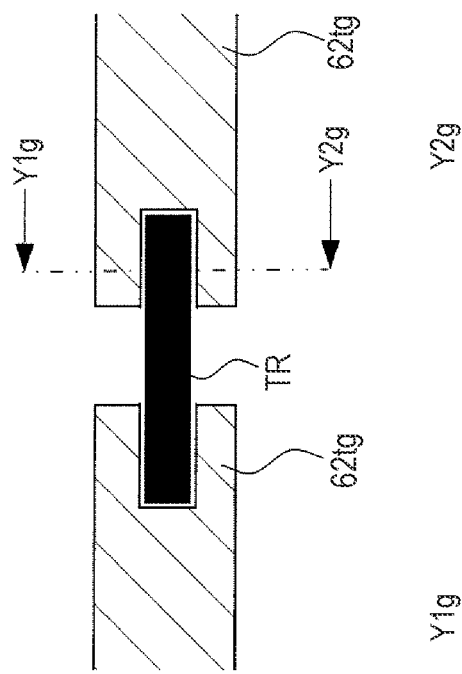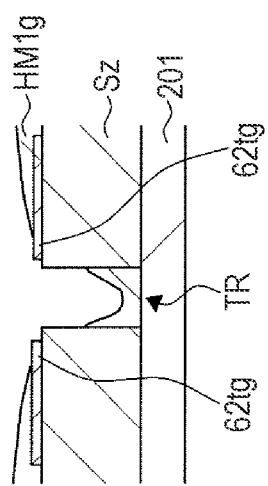
FIG. 41A
FIG. 41B

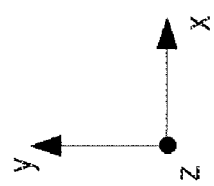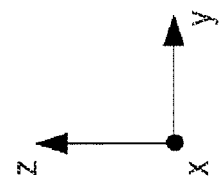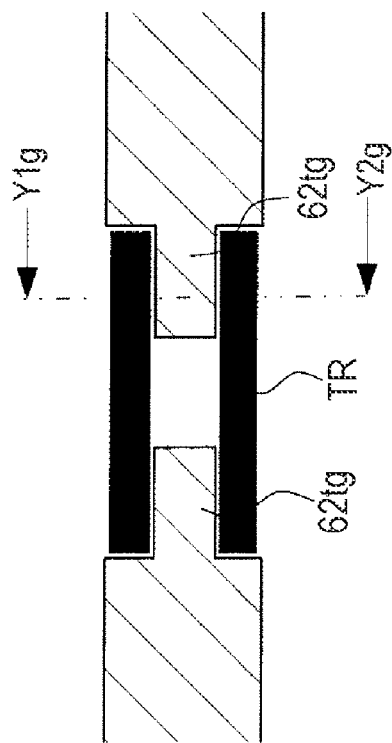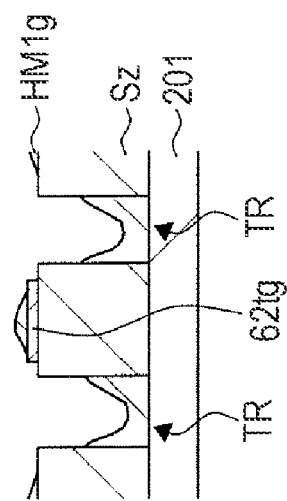
FIG. 42A
FIG. 42B

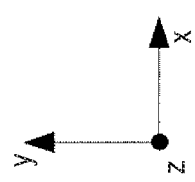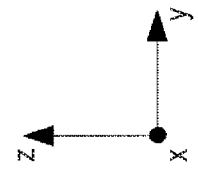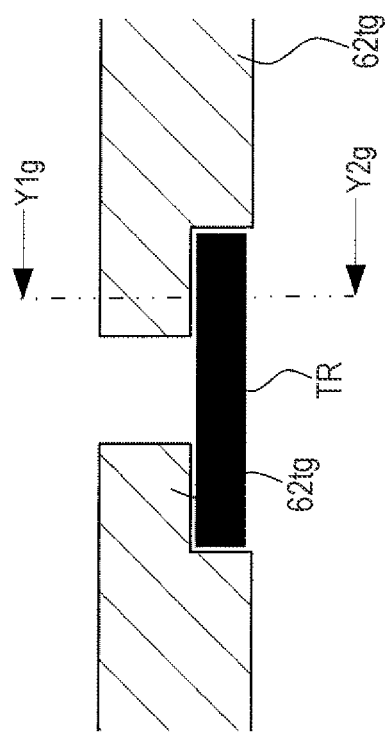
FIG.43A
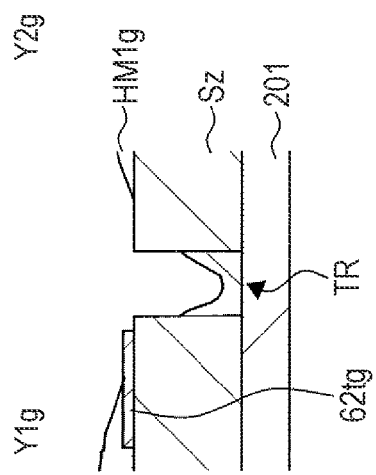
FIG.43B

LIQUID CRYSTAL DISPLAY DEVICE, MANUFACTURING METHOD OF LIQUID CRYSTAL DISPLAY DEVICE, DISPLAY DEVICE AND INFORMATION INPUT APPARATUS

BACKGROUND OF THE INVENTION

1. Field of the Invention

The present invention relates to a liquid crystal display device, a manufacturing method of a liquid crystal display device, a display device and an information input apparatus. Particularly, the invention relates to a liquid crystal display device, a manufacturing method of a liquid crystal display device, a display device and an information input apparatus, in which a touch sensor switch is provided on a pair of substrates opposite to each other.

2. Description of the Related Art

A display device, such as a liquid crystal display device or an organic EL display device, has merits such as low thickness, lightweight and low power consumption. Thus, the display device is often used in a mobile electronic equipment, such as a cellular phone or a digital camera.

In the display device as stated above, the liquid crystal display device includes, as a display panel, a liquid crystal panel in which a liquid crystal layer is sealed between a pair of substrates. For example, the liquid crystal panel is of a transmission type, modulates an illumination light emitted by an illumination device, such as a backlight, provided on the back of the liquid crystal panel and allows it to pass through. Then, an image is displayed on the front of the liquid crystal panel by the modulated illumination light.

For example, the liquid crystal panel is of an active matrix type, and includes a TFT array substrate on which plural thin film transistors (TFTs) functioning as pixel switching elements are formed. In the liquid crystal panel, an opposite substrate is disposed so as to be opposite to the TFT array substrate, and the liquid crystal layer is provided in a space between the TFT array substrate and the opposite substrate. In the active matrix type liquid crystal panel, a voltage is applied to the liquid crystal layer by inputting an image signal to a pixel electrode through the pixel switching element, and the transmittance for the light passing through the pixel is controlled, so that the image is displayed.

In the display device as stated above, in order to enable a user to input operation data by using an image, such as an icon, displayed on the screen of the display panel, there is a case where a touch panel is provided as an information input device on the display panel.

However, when the touch panel is externally disposed on the display panel, the whole thickness becomes large, and there is a case where the merit of low thickness is lost. Besides, since there is a case where the transmitted light is reduced in the display area by the touch panel or the light interferes, the quality of the display image can deteriorate. Further, disadvantages such as reduction in manufacture efficiency and increase in manufacture cost can occur.

Thus, a display device is proposed in which the display panel has a built-in touch panel function.

For example, a liquid crystal display device is proposed in which the liquid crystal panel has a built-in resistive film type touch sensor.

Here, the touch sensor includes a touch sensor switch in which a touch electrode is provided on each of a pair of substrates constituting the liquid crystal panel, and when the liquid crystal panel is pressed and is deformed, the pair of touch electrodes are electrically connected to each other. In the liquid crystal panel, the touch electrode is provided on a convex part protruding convexly, so that the touch electrodes formed on both the substrates are electrically connected to each other by a small external pressure (see, for example, JP-A-2001-75074 (patent document 1), JP-A-2007-52368 (patent document 2) and JP-A-2007-95044 (patent document 3)).

In the liquid crystal panel, a liquid crystal orientation film is provided in order to orient liquid crystal molecules in the liquid crystal payer. With respect to the liquid crystal orientation film, it is proposed that a surface portion of the touch electrode is removed, and the surface portion is exposed.

SUMMARY OF THE INVENTION

When the liquid crystal orientation film is removed from the surface portion of the touch electrode, a solvent is sprayed onto the portion from a fine nozzle used in an inkjet system and the portion is dissolved (see, for example, patent document 2).

However, in the above method, since it is difficult to obtain a sufficient throughput, the manufacture efficiency can deteriorate.

Besides, since it is difficult to sufficiently remove the liquid crystal orientation film from the surface portion of the touch electrode, yield can decrease.

Besides, since it is necessary to newly introduce the above instrument, the manufacture cost can increase.

Further, in the above method, since there is a case where the periphery of an area where the surface is exposed is also dissolved, it is necessary to provide a margin. Thus, in the liquid crystal panel, a portion occupied by the touch sensor is increased, and the aperture ratio of the liquid crystal panel can decrease. Thus, the brightness of a display image is reduced and the image quality can deteriorate.

In the display device, with reduction in thickness of the display panel, members, such as electrodes or the like, may be damaged due to an external pressure, and reliability of the device may be degraded.

In particular, in a liquid crystal panel having a touch sensor switch, when a touch electrode is provided on a convex part, such a problem conspicuously occurs since the touch electrode is rigid. For example, the touch electrode may be disconnected and the touch panel function may be damaged. Further, a conductive foreign substance when the touch electrode is crushed may be diffused into the liquid crystal cell, so the touch electrodes may be short-circuited.

In order to resolve such a problem, the surface of the convex part on which the touch electrode is provided may increase in area. In this case, however, the aperture ratio of the liquid crystal panel decreases, which may cause deterioration in quality of a display image.

As described above, in the display device, deterioration in image quality due to the decrease in the aperture ratio, or degradation in reliability of the device may occur.

Thus, it is desirable to provide a liquid crystal display device, a manufacturing method of a liquid crystal display device, a display device and an information input device, in which manufacture efficiency, yield and image quality can be improved, and manufacture cost can be reduced.

According to an embodiment of the present invention, there is provided a liquid crystal display device including a liquid crystal panel which includes a first substrate, a second substrate opposite to and spaced from the first substrate, and a liquid crystal layer provided in a space between the first substrate and the second substrate, and has a built-in touch sensor switch in a display area to display an image, the touch sensor switch includes a first touch electrode provided on a surface of the first substrate facing the second substrate, a second touch electrode which is provided on a surface of the second substrate facing the first substrate and is spaced from and faces the first touch electrode, the first touch electrode and the second touch electrode contact with each other when the liquid crystal panel is deformed by an external pressure, liquid crystal molecules in the liquid crystal layer are oriented by a first liquid crystal orientation film provided on the surface of the first substrate facing the second substrate, and a second liquid crystal orientation film provided on the surface of the second substrate facing the first substrate, the first touch electrode is provided on the surface of the first substrate facing the second substrate so as to cover a surface of a concave and convex area where plural grooves are formed to be spaced from each other, and the first liquid crystal orientation film is formed to expose a surface of a top face of a convex part of the concave and convex area in the first touch electrode by applying an orientation material onto the surface on which the first touch electrode is formed.

According to another embodiment of the invention, there is provided a manufacturing method of a liquid crystal display device including the step of forming a liquid crystal panel which includes a first substrate, a second substrate opposite to and spaced from the first substrate, and a liquid crystal layer provided in a space between the first substrate and the second substrate, the liquid crystal panel forming step includes the steps of forming step of forming a touch sensor switch in a display area to display an image in the liquid crystal panel, forming a first liquid crystal orientation film on a surface of the first substrate facing the second substrate, and forming a second liquid crystal orientation film on a surface of the second substrate facing the first substrate, the touch sensor switch forming step includes the steps of forming a first touch electrode on the surface of the first substrate facing the second substrate, and forming a second touch electrode, which is spaced from and faces the first touch electrode, on the surface of the second substrate facing the first substrate, in the first touch electrode forming step, the first touch electrode is formed on the surface of the first substrate facing the second substrate so as to cover a surface of a concave and convex area where plural grooves are formed to be spaced from each other, and in the first liquid crystal orientation film forming step, the first liquid crystal orientation film is formed to expose a surface of a top face of a convex part of the concave and convex area in the first touch electrode by applying an orientation material onto the surface on which the first touch electrode is formed.

According to still another embodiment of the invention, there is provided a display device including a display panel which includes a first substrate and a second substrate spaced from and opposite to the first substrate, and has a touch sensor switch, the touch sensor switch includes a first touch electrode provided on a surface of the first substrate facing the second substrate and a second touch electrode which is provided on a surface of the second substrate facing the first substrate and is spaced from and faces the first touch electrode, the first touch electrode and the second touch electrode contact with each other when the touch panel is deformed by an external pressure, the first touch electrode is provided on the surface of the first substrate facing the second substrate so as to cover a surface of a concave and convex area where plural grooves are formed to be spaced from each other, and an application film is formed on the surface on which the first touch electrode is formed so as to expose a surface of a top face of a convex part of the concave and convex area in the first touch electrode.

According to yet another embodiment of the invention, there is provided an information input device including a touch panel which includes a first substrate and a second substrate spaced from and opposite to the first substrate and has a touch sensor switch, the touch sensor switch includes a first touch electrode provided on a surface of the first substrate facing the second substrate and a second touch electrode which is provided on a surface of the second substrate facing the first substrate and is spaced from and faces the first touch electrode, the first touch electrode and the second touch electrode contact with each other when the touch panel is deformed by an external pressure, the first touch electrode is provided on the surface of the first substrate facing the second substrate so as to cover a surface of a concave and convex area where plural grooves are formed to be spaced from each other, and an application film is formed on the surface on which the first touch electrode is formed so as to expose a surface of a top face of a convex part of the concave and convex area in the first touch electrode.

In the embodiments of the invention, the first touch electrode is formed so as to cover the surface of the concave and convex area where the plural grooves are formed to be spaced from each other. Then, the first liquid crystal orientation film is formed to expose the surface of the top face of the convex part of the concave and convex area in the first touch electrode by applying the orientation material onto the surface where the first touch electrode is formed.

According to still yet another embodiment of the invention, there is provided a liquid crystal display device including a liquid crystal panel which includes a first substrate, a second substrate arranged to be opposite and spaced from the first substrate, a liquid crystal layer provided in a space between the first substrate and the second substrate, and a built-in touch sensor switch in a display area to display an image. The touch sensor switch includes a first touch electrode provided on a surface of the first substrate facing the second substrate, and a second touch electrode provided on a surface of the second substrate facing the first substrate to face and be spaced from the first touch electrode. The first touch electrode and the second touch electrode come into contact with each other when the liquid crystal panel is deformed by an external pressure. Liquid crystal molecules of the liquid crystal layer are oriented by a first liquid crystal orientation film provided on the surface of the first substrate facing the second substrate and a second liquid crystal orientation film provided on the surface of the second substrate facing the first substrate. An under layer having a concave groove is provided between the first touch electrode and the first substrate. When an application liquid containing an orientation material is applied onto the surface on which the first touch electrode is formed, the application liquid enters the concave groove, and the first liquid crystal orientation film is formed such that a top face of the first touch electrode is exposed while not being covered therewith.

According to further another embodiment of the invention, there is provided a manufacturing method of a liquid crystal display device including the step of: forming a liquid crystal panel having a first substrate, a second substrate arranged to be opposite and spaced from the first substrate, and a liquid crystal layer provided in a space between the first substrate and the second substrate. The liquid crystal panel forming step includes the steps of forming a touch sensor switch in a display area of the liquid crystal panel to display an image, forming a first liquid crystal orientation film on a surface of the first substrate facing the second substrate, and forming a second liquid crystal orientation film on a surface of the second substrate facing the first substrate. The touch sensor switch forming step includes the steps of forming a first touch electrode on the surface of the first substrate facing the second substrate, and forming a second touch electrode on the surface of the second substrate facing the first substrate to face and be spaced from the first touch electrode. In the first touch electrode forming step, an under layer having a concave groove is provided on the first substrate, and the first touch electrode is formed on the under layer. In the first liquid crystal orientation film forming step, an application liquid containing an orientation material is applied onto the surface on which the first touch electrode is formed, the application liquid enters the concave groove, and the first liquid crystal orientation film is formed such that a top face of the first touch electrode is exposed while being not covered therewith.

According to still further another embodiment of the invention, there is provided a display device including a display panel which includes a first substrate, a second substrate arranged to be opposite and spaced from the first substrate, and a built-in touch sensor switch provided in a display area to display an image. The touch sensor switch includes a first touch electrode provided on a surface of the first substrate facing the second substrate, and a second touch electrode provided on a surface of the second substrate facing the first substrate to face and be spaced from the first touch electrode. The first touch electrode and the second touch electrode come into contact with each other when the display panel is deformed by an external pressure. An under layer having a concave groove is provided between the first touch electrode and the first substrate, and when an application liquid is applied to the surface of the first touch electrode, the application liquid enters the concave groove, and the first touch electrode is formed such that a top face of the first touch electrode is exposed while being not covered with an application film.

According to yet further another embodiment of the invention, there is provided an information input device including a touch panel which includes a first substrate, a second substrate arranged to be opposite and spaced from the first substrate, and a touch sensor switch. The touch sensor switch includes a first touch electrode provided on a surface of the first substrate facing the second substrate, and a second touch electrode provided on a surface of the second substrate facing the first substrate to face and be spaced from the first touch electrode. The first touch electrode and the second touch electrode come into contact with each other when the touch panel is deformed by an external pressure. An under layer having a concave groove is provided between the first touch electrode and the first substrate, and when an application liquid is applied to the surface of the first touch electrode, the application liquid enters the concave groove, and the first touch electrode is formed such that a top face of the first touch electrode is exposed while being not covered with an application film.

According to the embodiments of the invention, the liquid crystal display device, the manufacturing method of the liquid crystal display device, the display device, and the information input device can be provided in which the manufacture efficiency, yield, and image quality can be improved and the manufacture cost can be reduced.

BRIEF DESCRIPTION OF THE DRAWINGS

FIG. 7 is an enlarged view showing the portion of the concave and convex area in Embodiment 1 of the invention.

FIGS. 8A to 8E are waveform views of control signals supplied to respective parts by a control section when the liquid crystal display device of Embodiment 1 of the invention is operated.

FIGS. 9A to 9D are sectional views showing a process of forming a portion of the concave and convex area in the liquid crystal display device of Embodiment 1 of the invention.

FIGS. 11A and 11B are views showing a relation between the width (μm) and height (μm) of the convex part and the coverage (%) of the liquid crystal orientation film in the liquid crystal display device of Embodiment 1 of the invention.

FIG. 12 is an enlarged view showing a portion of a concave and convex area in a modified example of Embodiment 1 of the invention.

FIG. 13 is an enlarged view showing a portion of a concave and convex area in a modified example of Embodiment 1 of the invention.

FIGS. 26A and 26*b* are sectional views of a liquid crystal display device according to Embodiment 7 of the invention when a detection target object comes into contact with a display area of the liquid crystal panel.

FIG. 28 is a view showing a relation between a tapered angle and a displacement (m) in Embodiment 7 of the invention.

FIGS. 29A and 29B are sectional views showing a case where a convex part is deformed depending on a tapered angle in Embodiment 7 of the invention.

FIG. 31 is a view showing touch electrodes formed on a TFT array substrate in a modified example of Embodiment 7 of the invention.

FIGS. 33A to 33C are views illustrating the advantages of modified example 3 of Embodiment 7 of the invention.

FIGS. 34A and 34B are views showing touch electrodes formed on a TFT array substrate in a modified example of Embodiment 7 of the invention.

FIGS. 37A and 37B are views showing touch electrodes formed on a TFT array substrate in a modified example of Embodiment 7 of the invention.

FIGS. 39A and 39B are views showing touch electrodes formed on a TFT array substrate in a modified example of Embodiment 7 of the invention.

FIGS. 40A and 40B are views showing touch electrodes formed on a TFT array substrate in a modified example of Embodiment 7 of the invention.

FIGS. 41A and 41B are views showing touch electrodes formed on a TFT array substrate in a modified example of Embodiment 7 of the invention.

FIGS. 42A and 42B are views showing touch electrodes formed on a TFT array substrate in a modified example of Embodiment 7 of the invention.

FIGS. 43A and 43B are views showing touch electrodes formed on a TFT array substrate in a modified example of Embodiment 7 of the invention.

DESCRIPTION OF THE PREFERRED EMBODIMENTS

Embodiments of the present invention will be described.
The description will be made in order of the following.
1. Embodiment 1 (concave and convex area on an opposite substrate)
2. Embodiment 2 (concave and convex area on a TFT array substrate
3. Embodiment 3 (concave and convex area on an elastic member of an opposite substrate)
4. Embodiment 4 (concave and convex area on an elastic member of a TFT array substrate)
5. Embodiment 5 (concave and convex area on a concave area of an opposite substrate)
6. Embodiment 6 (concave and convex area on a concave area of a TFT array substrate).
7. Embodiment 7 (concave groove in a TFT array substrate)
8. Embodiment 8 (concave groove in a TFT array substrate (in the case of an FFS system))
9. Others <1. Embodiment 1>
(Structure of Liquid Crystal Display Device)

Figure 1:
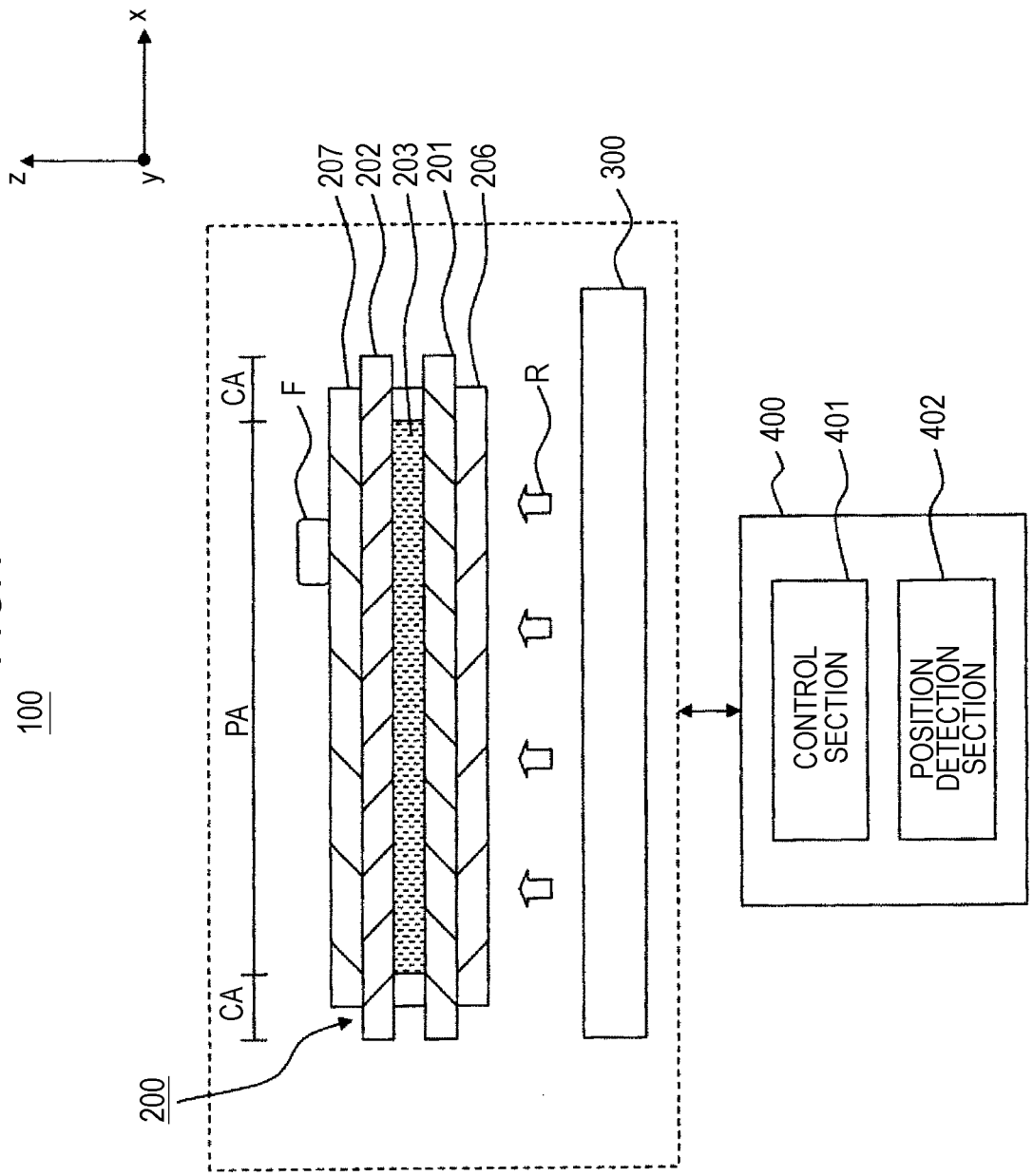
FIG. 1 is a sectional view showing a structure of a liquid crystal display device of Embodiment 1 of the invention.

FIG. 1 is a sectional view showing a structure of a liquid crystal display device 100 of Embodiment 1 of the invention.

As shown in FIG. 1, the liquid crystal display device 100 of this embodiment includes a liquid crystal panel 200, a backlight 300, and a data processing section 400. The respective parts will be described in sequence.

For example, the liquid crystal panel 200 is of an active matrix type, and includes, as shown in FIG. 1, a TFT array substrate 201, an opposite substrate 202 and a liquid crystal layer 203. In the liquid crystal panel 200, the TFT array substrate 201 and the opposite substrate 202 are spaced from and opposite to each other. The liquid crystal layer 203 is provided to be sandwiched between the TFT array substrate 201 and the opposite substrate 202.

As shown in FIG. 1, in the liquid crystal panel 200, a first polarizing plate 206 is disposed on a surface of the TFT array substrate 201 opposite to a surface thereof facing the opposite substrate 202. A second polarizing plate 207 is disposed on a surface of the opposite substrate 202 opposite to a surface thereof facing the TFT array 201.

In the liquid crystal panel 200, the backlight 300 is disposed at a side of the TFT array substrate 201, and an illumination light R emitted from the backlight 300 is irradiated to the surface of the TFT array substrate 201 opposite to the surface thereof facing the opposite substrate 202.

The liquid crystal panel 200 includes a display area PA in which plural pixels (not shown) are disposed. In this display area PA, the illumination light R emitted by the backlight 300 disposed at the back side of the liquid crystal panel 200 is received through the first polarizing plate 206 from the back side, and the illumination light R received from the back side is modulated in the display area PA.

Here, plural TFTs are provided as pixel switching elements (not shown) on the TFT array substrate 201 so as to correspond to the pixels, and the pixel switching elements are controlled, so that the illumination light received from the back is modulated. The modulated illumination light R outgoes to the front side through the second polarizing plate 207, and an image is displayed in the display area PA. For example, a color image is displayed on the front side of the liquid crystal panel 200. That is, the liquid crystal panel 200 is of a transmission type.

Besides, although the details will be described later, in this embodiment, the liquid crystal panel 200 includes a resistive film type touch sensor (not shown). The touch sensor is disposed on the front of the liquid crystal panel 200 opposite to the back at which the backlight 300 is disposed and outputs a signal having a potential which varies according to a contact position of a detection target object F such as a finger of a user. That is, the liquid crystal panel 200 functions as a touch panel, and by this, the liquid crystal display device 100 functions as an information input device.

As shown in FIG. 1, the backlight 300 faces the back of the liquid crystal panel 200, and emits the illumination light R to the display area PA of the liquid crystal panel 200.

Specifically, the backlight 300 is disposed to be positioned at the side of the TFT array 201 in the liquid crystal panel 200. The illumination light R is irradiated to the surface of the TFT array substrate 201 opposite to the surface thereof facing the opposite substrate 202. That is, the backlight 300 illuminates the illumination light R from the side of the TFT array substrate 201 toward the side of the opposite substrate 202. Here, the backlight 300 emits the illumination light R along a normal line direction z of the surface of the liquid crystal panel 200.

As shown in FIG. 1, the data processing section 400 includes a control section 401 and a position detection section 402. The data processing section 400 includes a computer, and the computer operates as respective parts by a program.

The control section 401 of the data processing section 400 controls the operation of the liquid crystal panel 200 and the backlight 300. The control section 401 supplies a control signal to the liquid crystal panel 200, and controls the operation of the plural pixel switching elements (not shown) provided in the liquid crystal panel 200. For example, line sequential driving is executed. Besides, the control section 401 supplies a control signal to the backlight 300 to control the operation of the backlight 300, and the illumination light R is irradiated from the backlight 300. As stated above, the control section 401 controls the operation of the liquid crystal panel 200 and the backlight 300, and displays an image in the display area PA of the liquid crystal panel 200.

In addition to this, the control section 401 supplies a control signal to the liquid crystal panel 200 to control the operation of the resistive film type touch sensor provided in the liquid crystal panel 200, and collects data.

The position detection section 402 of the data processing section 400 detects the position with which the detection target object F such as the finger of the human body contacts on the front side of the liquid crystal panel 200. In this embodiment, the position detection section 402 detects the position based on the data obtained by the resistive film type touch sensor provided in the liquid crystal panel 200.

(Whole Structure of the Liquid Crystal Panel)

The whole structure of the liquid crystal panel 200 will be described.

Figure 2:
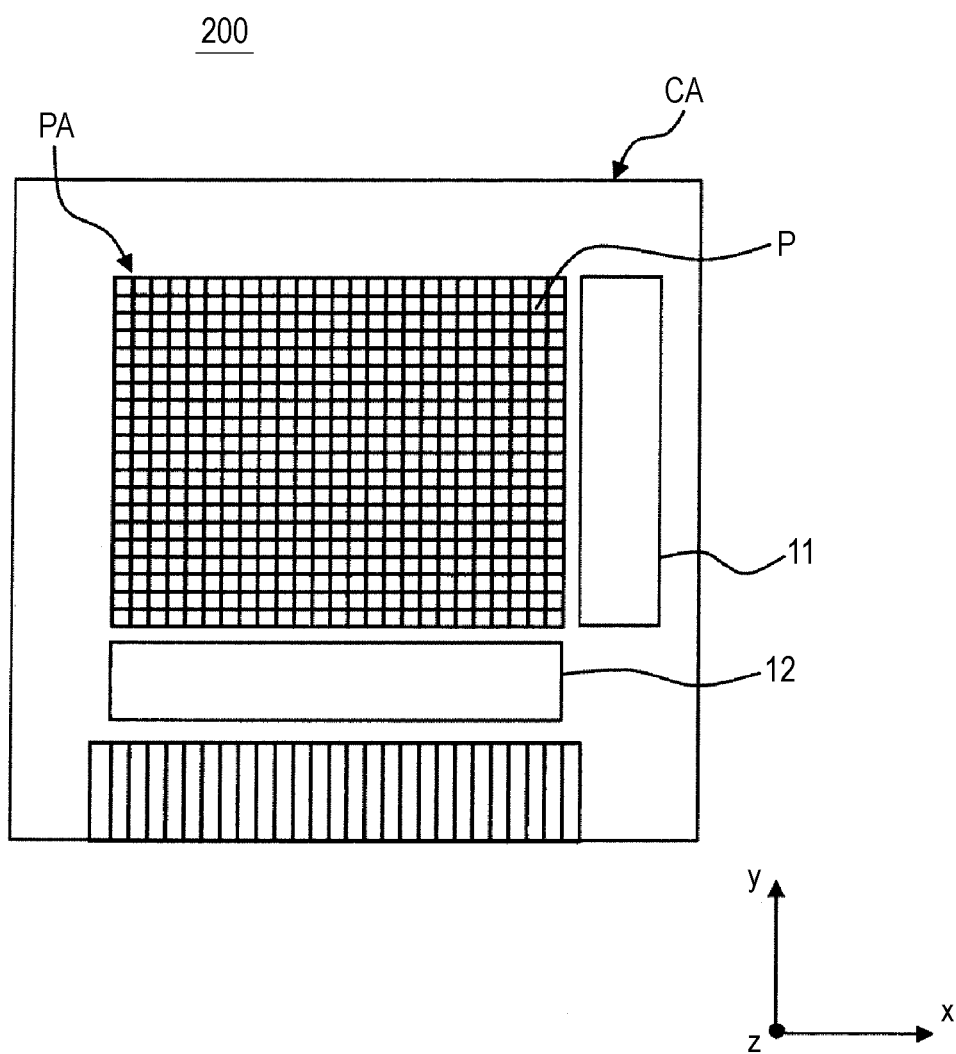
FIG. 2 is a plan view showing a liquid crystal panel of Embodiment 1 of the invention.

FIG. 2 is a plan view showing the liquid crystal panel 200 of Embodiment 1.

As shown in FIG. 2, the liquid crystal panel 200 includes the display area PA and a circumferential area CA.

In the liquid crystal panel 200, as shown in FIG. 2, plural pixels P are disposed in the display area PA along the surface.

Specifically, in the display area PA, the plural pixels P are disposed in a horizontal direction x and a vertical direction y and are arranged in matrix form, and an image is displayed. Although the details will be described later, the pixels P include the pixel switching elements (not shown). Plural touch sensor switches (not shown) constituting the touch sensor are provided to correspond to the plural pixels P.

In the liquid crystal panel 200, as shown in FIG. 2, the circumferential area CA is positioned so as to surround the circumference of the display area PA. As shown in FIG. 2, a vertical drive circuit 11 and a horizontal drive circuit 12 are formed in this circumferential area CA. The respective circuits are constructed of, for example, semiconductor elements formed similarly to the pixel switching elements (not shown).

The vertical drive circuit 11 and the horizontal drive circuit 12 drive the pixel switching elements provided to correspond to the pixels P, and perform image display in the display area PA.

Besides, in addition to this, the vertical drive circuit 11 and the horizontal drive circuit 12 drive the touch sensor (not shown) provided in the display area PA, and performs data acquisition. Then, based on the data obtained by the touch sensor, the position detection section 402 detects the position where the detection target object, such as the finger of the user, contacts with the display area PA of the liquid crystal panel 200.

(Detailed Structure of the Liquid Crystal Panel)

The Detailed structure of the liquid crystal panel 200 will be described.

Figure 3:
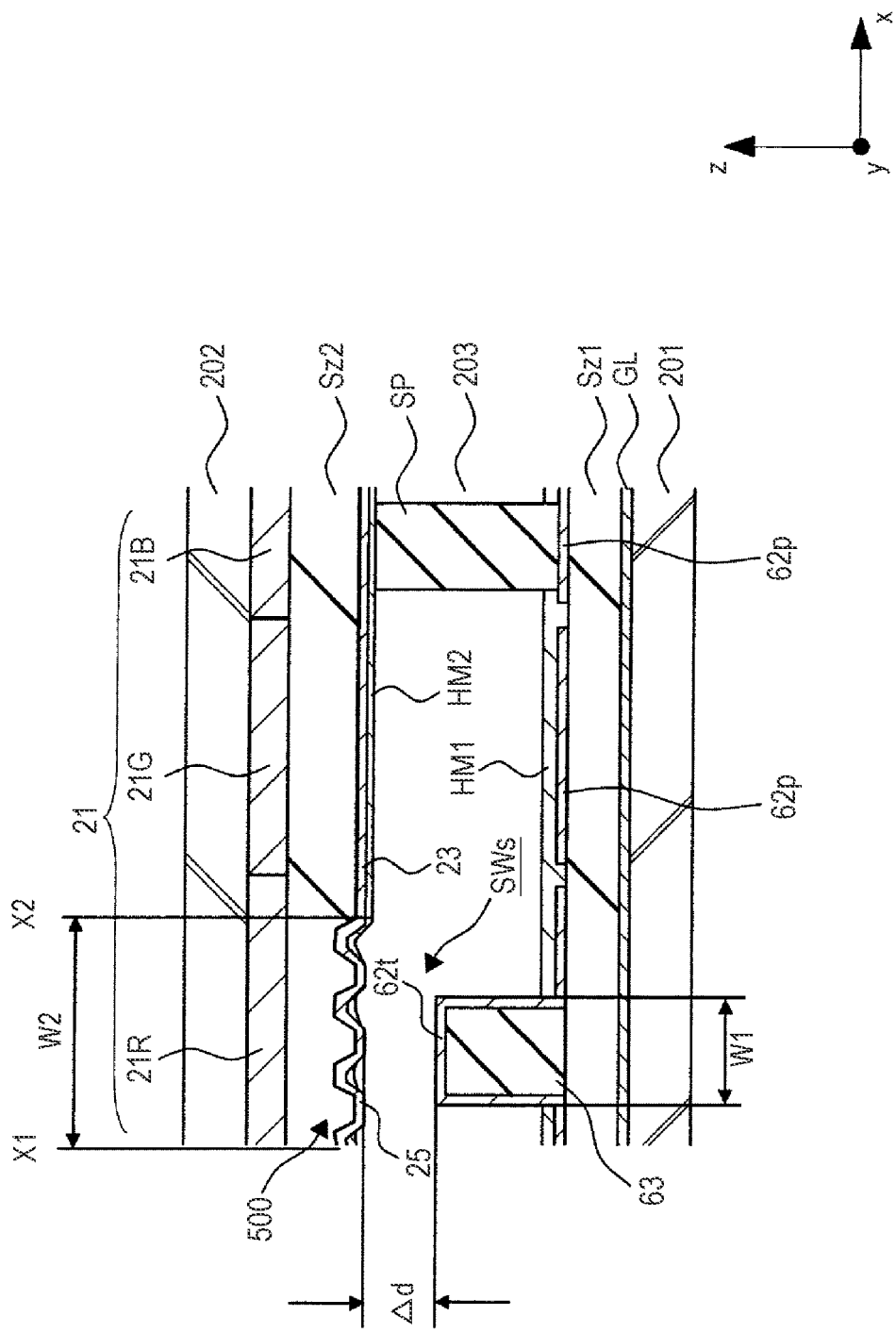
FIG. 3 is a view showing a main part of the liquid crystal panel of Embodiment 1.
Figure 4:
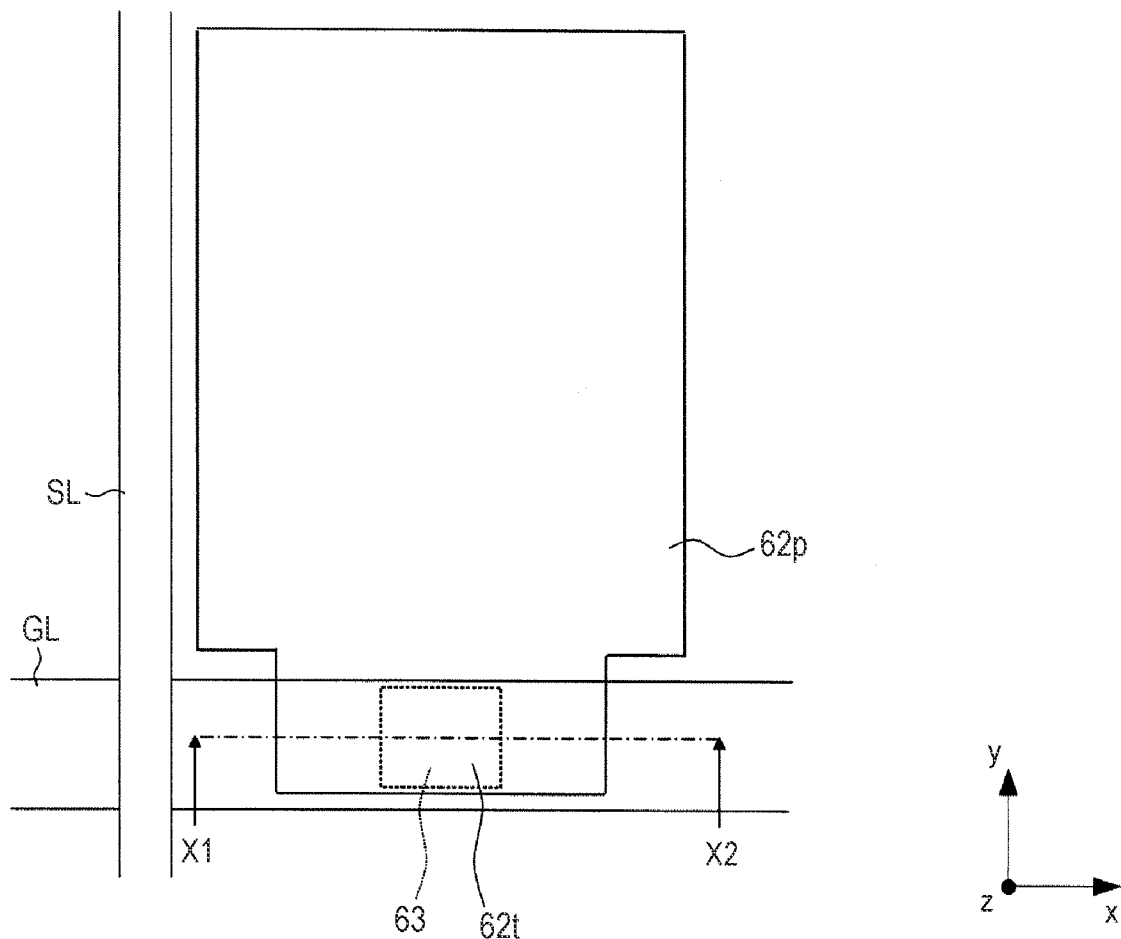
FIG. 4 is a view showing the main part of the liquid crystal panel of Embodiment 1.
Figure 5:
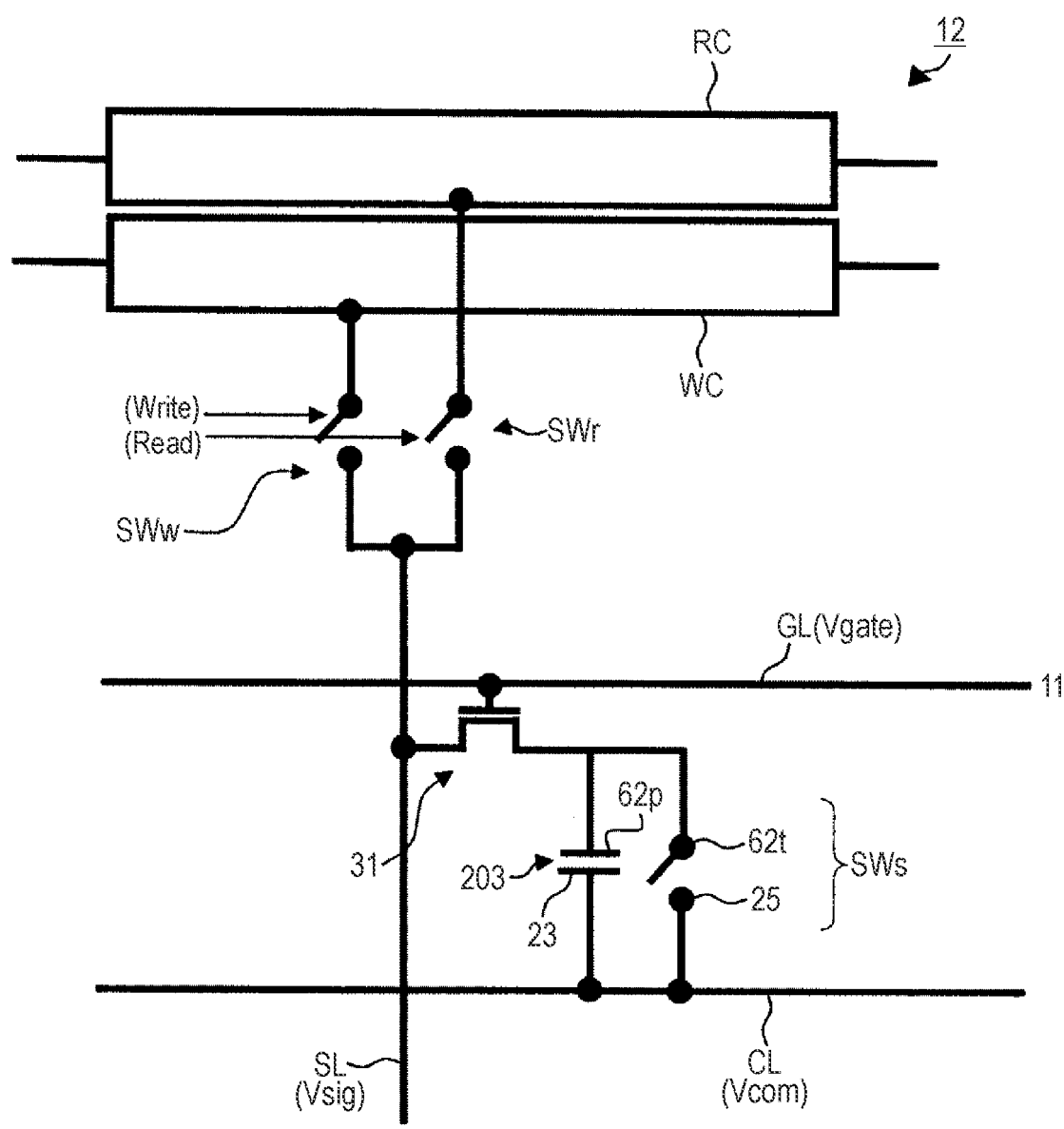
FIG. 5 is a view showing the main part of the liquid crystal panel of Embodiment 1.

FIG. 3 to FIG. 5 are views showing the main part of the liquid crystal panel 200 of Embodiment 1.

Here, FIG. 3 is a sectional view schematically showing the outline of the pixel P provided in the display area PA of the liquid crystal panel 200 of Embodiment 1 of the invention.

Besides, FIG. 4 is a top view schematically showing the pixel P provided in the display area PA of the liquid crystal panel 200 of Embodiment 1 of the invention. FIG. 4 shows a part of plural sub-pixels constituting the pixel P, and FIG. 3 corresponds to an X1-X2 portion of FIG. 4. For convenience of illustration, the respective members are shown while omission, scale change and the like are suitably performed.

FIG. 5 is a circuit diagram showing the outline of the liquid crystal panel 200 of Embodiment 1 of the invention.

As shown in FIG. 3, in the liquid crystal panel 200, a column spacer SP intervenes between the TFT array substrate 201 and the opposite substrate 202, and is bonded by a seal member (not shown). The liquid crystal layer 203 is sealed between the TFT array substrate 201 and the opposite substrate 202.

In this embodiment, as shown in FIG. 3, the liquid crystal panel 200 has a built-in touch sensor switch SWs. As shown in FIG. 3, the touch sensor switch SWs includes a pair of touch electrodes 62*t* and 25.

In the liquid crystal panel 200, the TFT array substrate 201 is an insulator substrate transparent to light, and is made of, for example, glass. In the TFT array substrate 201, as shown in FIG. 3, a pixel electrode 62*p*, the one touch electrode 62*t* constituting the touch sensor switch SWs, a gate line GL and a liquid crystal orientation film HM1 are formed on the side facing the opposite substrate 202.

In the liquid crystal panel 200, similarly to the TFT array substrate 201, the opposite substrate 202 is an insulator substrate transparent to light, and is made of, for example, glass. In this opposite substrate 202, as shown in FIG. 3, a color filter layer 21, a common electrode 23, the touch electrode 25 and a liquid crystal orientation film HM2 are formed on the side facing the TFT array substrate 201. Here, as shown in FIG. 3, the color filter layer 21 includes a red filter layer 21R, a green filter layer 21G and a blue filter layer 21B which form a set.

In addition to the members shown in FIG. 3, as shown in FIG. 4, the liquid crystal panel 200 includes a signal line SL. Besides, as shown in FIG. 5, the liquid crystal panel includes a pixel switching element 31. Although not shown in FIG. 3, the signal line SL and the pixel switching element 31 are provided on the TFT array substrate 201 constituting the liquid crystal panel 200.

The respective parts provided on the TFT array substrate 201 will be described.

In the TFT array substrate 201, as shown in FIG. 3, the pixel electrode 62*p* and the touch electrode 62*t* are provided on the surface of the TFT array substrate 201 facing the opposite substrate 202. Here, the pixel electrode 62*p* and the touch electrode 62*t* are provided through an inter-layer insulating film Sz1. Each of the pixel electrode 62*p* and the touch electrode 62*t* is a so-called transparent electrode, and is made by using, for example, ITO.

As shown in FIG. 3, the touch electrode 62*t* is provided above the gate line GL. For example, the touch electrode 62*t* is provided to correspond to the red filter layer 21R constituting the color filter layer 21. That is, the touch electrode 62*t* is formed to correspond to one sub-pixel of three sub-pixels constituting the pixel P. The touch electrode 62*t* faces the one touch electrode 25 provided on the opposite substrate 202 through the liquid crystal layer 203.

Besides, as shown in FIG. 4, the touch electrode 62*t* is formed to be united with the pixel electrode 62*p*. That is, the touch electrode 62*t* is electrically connected to the pixel electrode 62*p*.

As shown in FIG. 5, the touch electrode 62*t* is electrically connected to the pixel switching element 31.

In this embodiment, as shown in FIG. 3, the touch electrode 62*t* is provided to cover a top face of an elastic member 63.

As shown in FIG. 3, the elastic member 63 is provided above the gate line GL through the inter-layer insulating film Sz1. The elastic member 63 is provided on the inter-layer insulating film Sz1 so as to protrude convexly in the direction toward the opposite substrate 202. For example, the elastic member 63 is formed by pattern-processing a photosensitive acryl resin film. Here, as shown in FIG. 3, in the state where the touch electrode 62*t* is covered, the elastic member 63 is formed so that its height is lower than the column spacer SP to keep the cell gap.

As shown in FIG. 4, the pixel electrode 62*p* is formed of a rectangular pattern so as to correspond to each of plural areas obtained by dividing the xy plane by the gate lines GL and the signal lines SL. The green filter layer 21G and the blue filter layer 21B, other than the red filter layer 21R, constituting the color filter layer 21 are also formed to have the same plane shape as this. That is, the pixel electrode 62*p* is formed so as to correspond to each of the three sub-pixels constituting the pixel P.

Here, as shown in FIG. 3, the pixel electrode 62*p* faces the common electrode 23 through the liquid crystal layer 203. Besides, as shown in FIG. 5, the pixel electrode 62*p* is electrically connected to the pixel switching element 31, and applies a potential to the liquid crystal layer 203 when the pixel switching element 31 is in an ON state.

In the TFT array substrate 201, although not shown in FIG. 3, the pixel switching element 31 is provided on the surface of the TFT array substrate 201 facing the opposite substrate 202 and in the inter-layer insulating film Sz1.

Here, as shown in FIG. 5, the pixel switching element 31 is a transistor, and is, for example, a TFT using poly silicon. As shown in FIG. 5, in this switching element 31, its gate is electrically connected to the gate line GL. Its drain is electrically connected to the signal line SL. Its source is connected to the pixel electrode 62*p* and the touch electrode 62*t*.

In the TFT array substrate 201, as shown in FIG. 3, the gate line GL is provided on the surface of the TFT array substrate 201 facing the opposite substrate 202.

As shown in FIG. 4 and FIG. 5, the gate line GL is provided to extend in the x direction on the xy plane. The gate line GL is formed by using, for example, a metal material such as molybdenum. As shown in FIG. 5, the gate line GL is electrically connected to the gate of the pixel switching element 31. In addition to this, as shown in FIG. 5, the gate line GL is electrically connected to the vertical drive circuit 11, and supplies a scanning signal Vgate from the vertical drive circuit 11 to the gate of the pixel switching element 31.

In the TFT array substrate 201, although not shown in FIG. 3, the signal line SL is provided on the surface of the TFT array substrate 201 facing the opposite substrate 202 and in the inter-layer insulating film Sz1.

As shown in FIG. 4 and FIG. 5, the signal line SL is provided to extend in the y direction on the xy plane. As shown in FIG. 5, the signal line SL is electrically connected to the drain of the pixel switching element 31. In addition to this, as shown in FIG. 5, the signal line SL is electrically connected to the horizontal drive circuit 12.

In this embodiment, as shown in FIG. 5, the horizontal drive circuit 12 includes a writing circuit WC and a reading circuit RC. A switch SWw intervenes between the signal line SL and the writing circuit WC, and when the switch SWw becomes in an ON state, the signal line is electrically connected to the writing circuit WC. Besides, a switch SWr intervenes between the signal line SL and the reading circuit RC, and when the switch SWr becomes in an ON state, the signal line is electrically connected to the reading circuit RC. Although the details will be described later, the two switches SWw and SWr operate in a differential manner, and the operation is controlled so that they do not become in the ON state simultaneously. Thus, when the switch SWw is brought into the ON state, the signal line SL is electrically connected to the writing circuit WC, and a write signal (WRITE) is supplied from the writing circuit WC. When the switch SWr becomes in the ON state, the signal line SL is electrically connected to the reading circuit RC, and a read signal (READ) is supplied from the reading circuit RC.

In the TFT array substrate 201, as shown in FIG. 3, the liquid crystal orientation film HM1 is provided on the surface of the TFT array substrate 201 facing the opposite substrate 202 through the pixel electrode 62*p* and the touch electrode 62*t*. The liquid crystal orientation film HM1 is formed of, for example, polyimide.

In this embodiment, the liquid crystal orientation film HM1 is formed so that the surface of the touch electrode 62*t* is exposed.

The respective parts provided on the opposite substrate 202 will be described.

In the opposite substrate 202, as shown in FIG. 3, the color filter layer 21 is formed on the surface of the opposite substrate 202 facing the TFT array substrate 201. Here, the color filter layer 21 includes three primary color filters of the red filter layer 21R, the green filter layer 21G and the blue filter layer 21B, which form one set, and is provided for each pixel P, and each color is formed to be arranged in the x direction. The color filter layer 21 is formed by using, for example, polyimide resin including a coloring agent such as a pigment or dye. In the color filter layer 21, the white light irradiated from the backlight 300 is colored and is emitted.

In the opposite substrate 202, as shown in FIG. 3, the common electrode 23 is formed on the surface of the opposite substrate 202 facing the TFT array substrate 201. Here, the common electrode 23 is formed to cover an inter-layer insulating film Sz2 formed on the color filter layer 21. The common electrode 23 is a so-called transparent electrode, and is formed by using, for example, ITO.

Then, as shown in FIG. 5, the common electrode 23 is electrically connected to a Vcom line CL, and a common potential is applied. That is, the common electrode 23 is opposite to each of the plural pixel electrodes 62p formed to correspond to the plural pixels P in the display area PA, and functions as the electrode common to the respective pixels P.

In the opposite substrate 202, as shown in FIG. 3, the touch electrode 25 is formed on the surface of the opposite substrate 202 facing the TFT array substrate 201. Here, as shown in FIG. 3, similarly to the common electrode 23, the touch electrode 25 covers the inter-layer insulating film Sz2, and is formed to be integral with and to have the same layer as the common electrode 23. That is, similarly to the common electrode 23, the touch electrode 25 is a so-called transparent electrode, and is formed by using, for example, ITO. As shown in FIG. 3, when the liquid crystal panel 200 is deformed by an external pressure, the touch electrode 25 contacts with the opposite touch electrode 62t and is electrically connected thereto.

Besides, as shown in FIG. 5, similarly to the common electrode 23, the touch electrode 25 is electrically connected to the Vcom line CL, and the common potential is applied.

In this embodiment, as shown in FIG. 3, the touch electrode 25 is provided so as to cover the surface of a concave and convex area 500.

As shown in FIG. 3, the concave and convex area 500 is formed on the surface of the opposite substrate 202 facing the TFT array substrate 201 and on the surface of the inter-layer insulating film Sz2. As shown in FIG. 3, the concave and convex area 500 is provided so that a width W2 is larger than a width W1 of the elastic member 63 provided on the TFT array substrate 201. A specified sensor gap Δd is provided between the concave and convex area 500 and the touch electrode 62t provided on the elastic member 63 in the TFT array substrate 201.

Figure 6:
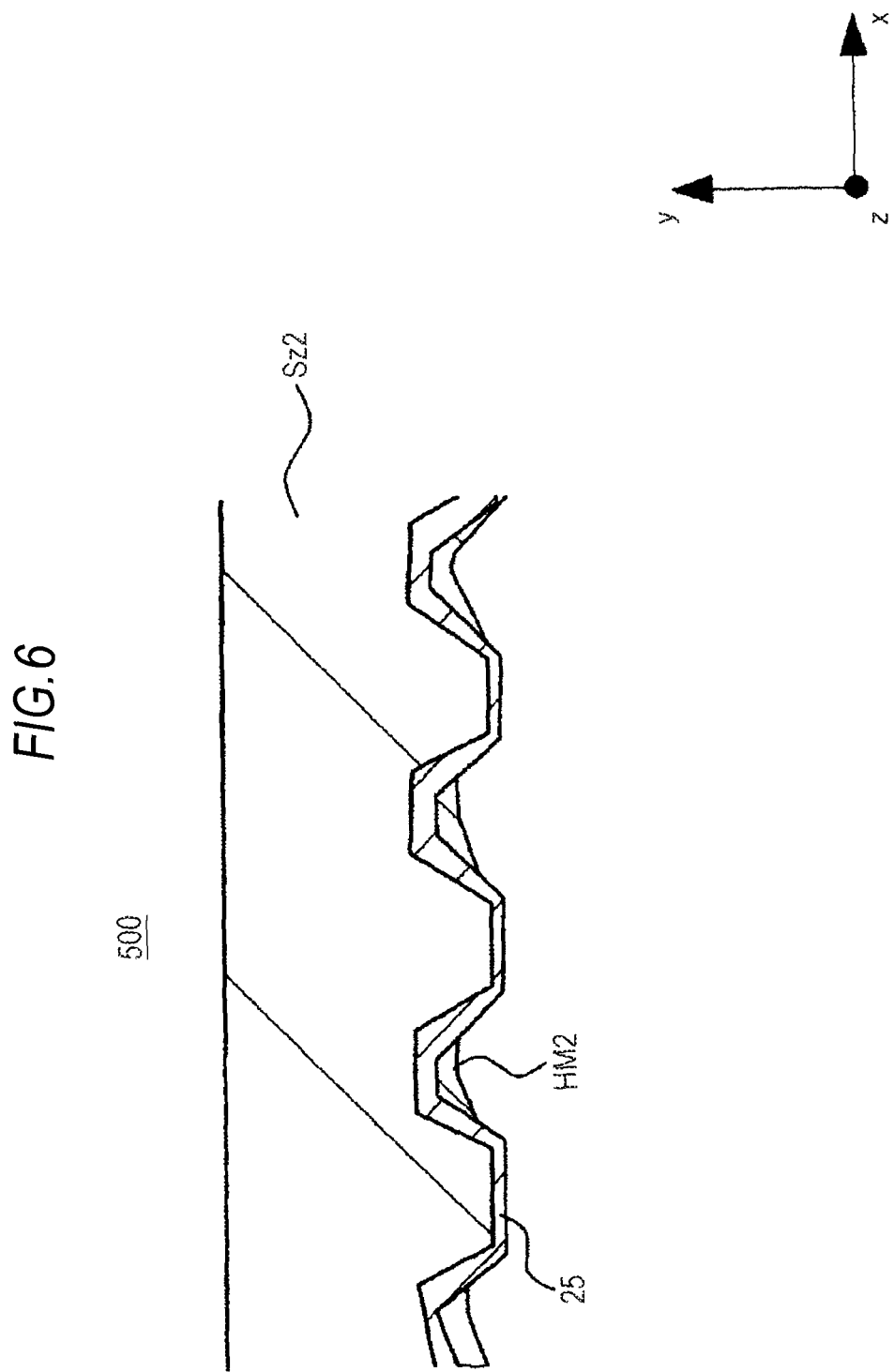
FIG. 6 is an enlarged view showing a portion of a concave and convex area in Embodiment 1 of the invention.

FIG. 6 and FIG. 7 are enlarged views showing a portion of the concave and convex area 500 in Embodiment 1 of the invention.

FIG. 6 is an enlarged sectional view showing the portion of the concave and convex area 500. FIG. 7 is an enlarged top view showing the portion of the concave and convex area 500.

As shown in FIG. 6 and FIG. 7, in the concave and convex area 500, plural grooves are formed to be spaced from each other on the surface of the inter-layer insulating film Sz2.

Here, as shown in FIG. 7, for example, the plural grooves extend in the y direction, and the plural grooves are arranged to be spaced from each other in the x direction.

In the opposite substrate 202, as shown in FIG. 3, the liquid crystal orientation film HM2 is provided on the common electrode 23. Here, the liquid crystal orientation film HM2 is provided so as to cover the whole surface of the common electrode 23. The liquid crystal orientation film HM2 is formed by applying an orientation material onto the surface on which the common electrode 23 and the touch electrode 25 are formed. The liquid crystal orientation film HM2 is formed by using, for example, polyimide.

Although the details will be described later, since a convex part and a concave part are alternately provided in the concave and convex area 500, the orientation material is not formed on the top face of the convex part, and accordingly, the liquid crystal orientation film HM2 is not formed on the top face, and is formed so that the surface thereof is exposed.

The liquid crystal layer 203 will be described.

As shown in FIG. 3, the liquid crystal layer 203 is sandwiched between the TFT array substrate 201 and the opposite substrate 202.

Here, in the liquid crystal layer 203, liquid crystal molecules (not shown) are oriented by the liquid crystal orientation film HM1 formed on the TFT array substrate 201 and the liquid crystal orientation film HM2 formed on the opposite substrate 202. For example, the liquid crystal layer 203 is formed so that the liquid crystal molecules are vertically oriented. That is, the liquid crystal layer 203 is formed so that the liquid crystal display mode becomes a VA (Vertical Align) mode.

In addition to this, the liquid crystal layer 203 may be formed to correspond to a TN (Twisted Nematic) mode or an ECB (Electrically Controlled Birefringence) mode.
(Operation)

Hereinafter, in the liquid crystal display device 100, the operation of detecting the position where the detection target object F, such as the finger of the user, contacts with the display area PA of the liquid crystal panel 200 will be described.

FIGS. 8A to 8E are waveform views of control signals supplied to the respective parts by the control section 401 when the liquid crystal display device 100 of Embodiment 1 of the invention is operated.

FIG. 8A shows the scanning signal (Vgate) supplied to the gate line GL. FIG. 8B shows a data signal (Vsig) supplied to the signal line SL. FIG. 8C is a waveform view of a common voltage (Vcom) supplied to the Vcom line CL. FIG. 8D shows the write signal (Write) supplied to the switch SWw. FIG. 8E show the read signal (Read) supplied to the switch SWr.

First, at T1, as shown in FIGS. 8B and 8D, each of the data signal (Vsig) and the write signal (Write) becomes a high level from a low level. Thus, the switch SWw is turned on by the write signal (Write) of the high level, and the data signal (Vsig) of the high level is supplied from the writing circuit WC to the signal line SL through the switch SWw (see FIG. 5).

Next, at T2, as shown in FIG. 8D, the write signal (Write) becomes the low level, the switch SWw is turned off, and the signal line SL becomes in a floating state. In this state, at T2, as shown in FIG. 8A, the scanning signal (Vgate) becomes the high level from the low level. Thus, the gate of the pixel switching element 31 becomes in the ON state, a channel is formed in the pixel switching element 31, and a discharge path of electric charge of the data signal (Vsig) is generated (see FIG. 5).

At this time, when the touch sensor switch SWs is brought into the ON state, the electric charge of the signal line SL in the floating state is discharged to the large-capacity Vcom line CL. Thus, as indicated by a solid line in FIG. 8B, the potential of the data signal (Vsig) is significantly reduced.

On the other hand, when the touch sensor switch SWs is in the OFF state, as indicated by a broken line in FIG. 8B, the potential of the data signal (Vsig) is almost kept and is little changed.

Next, at T3, as shown in FIG. 8E, the read signal (Read) becomes the high level from the low level. Thus, the switch SWr is turned on by the high level read signal (Read), and the data signal (Vsig) is read from the signal line SL to the reading circuit RC through the switch SWr (see FIG. 5).

Here, when the touch sensor switch SWs is in the ON state, as indicated by the solid line in FIG. 8B, the data signal (Vsig) of the low potential is read. On the other hand, when the touch sensor switch SWs is in the OFF state, as indicated by the broken line in FIG. 8B, the data signal (Vsig) of the high potential is read.

Then, at this time, the position detection section 402 (see FIG. 1) of the data processing section 400 performs position detection based on the potential of the read data signal (Vsig).

Specifically, the position detection section 402 performs a comparison process between the potential of the read data signal (Vsig) and the reference potential, and when the former potential is larger than the reference potential, it is determined that the touch sensor switch SWs is in the OFF state. On the other hand, when the potential of the read data signal (Vsig) is smaller than the reference potential, it is determined that the touch sensor switch SWs is in the ON state. Then, the position detection section 402 detects, as the position with which the detection target object F such as the finger contacts, the position of the pixel P where it is determined that the touch sensor switch SWs is in the ON state.

That is, the position detection section 402 detects the position with which the detection target object F, such as the finger, contacts in the liquid crystal panel 200 based on the potential changed between the case where the touch sensor switch SWs is in the ON state and the case where it is in the OFF state.

Next, at T4, as shown in FIG. 8E, the read signal (Read) is brought into the low level, and the switch SWr is brought into the OFF state. Then, the write signal (Write) is changed from the low level to the high level, the switch SWw is brought into the ON state, and the high-level data signal (Vsig) is applied to the signal line SL. Thereafter, the potential of the common voltage Vcom is inverted, and the control of the display is continued.

(Manufacturing Method)

Hereinafter, a method of forming the portion of the concave and convex area 500 as the main part of the liquid crystal display device 100 will be described.

FIGS. 9A to 9D are sectional views showing a process of forming the portion of the concave and convex area 500 in the liquid crystal display device 100 of Embodiment 1 of the invention. FIGS. 9A to 9D show a main part and the illustration of some members is omitted.

First, as shown in FIG. 9A, the inter-layer insulating film Sz2 is formed.

Here, for example, the inter-layer insulating film Sz2 is formed by applying a photosensitive resin (not shown). For example, after a positive photosensitive acryl resin is applied, a pre-bake process is performed, so that the inter-layer insulating film Sz2 is formed.

Next, as shown in FIG. 9B, grooves are formed in the inter-layer insulating film Sz2.

Here, the inter-layer insulating film Sz2 made of the photosensitive resin is pattern-processed by a photolithography technique, so that the grooves are, and the concave and convex area 500 is provided.

Specifically, an exposure process is performed using a photo mask on which a mask pattern is formed. In this exposure process, exposure light is irradiated to portions where the grooves are to be formed. Here, the exposure amount is suitably adjusted, and the irradiation of the exposure light is performed.

After the exposure process is performed, a development process is performed. Thereafter, a remaining solvent in the inter-layer insulating film Sz2 and a low molecular non-polymerized component are volatilized by performing a bake process. By doing so, as shown in FIG. 9B, the grooves are formed on the surface of the inter-layer insulating film Sz2.

Incidentally, in the above exposure process, in addition to the case where one photo mask is used to perform the formation, the exposure process may be performed by suitably combining plural photo masks. Besides, in addition to the grooves, although not shown, a contact hole may be formed separately by the same process.

Next, as shown in FIG. 9C, the touch electrode 25 is formed.

Here, the touch electrode 25 is formed by forming a film of transparent conductive material on the surface of the inter-layer insulating film Sz2 where the grooves are formed. For example, a film of ITO is formed by a sputtering method, so that the touch electrode 25 is formed.

In addition to this, as shown in FIG. 9C, the common electrode 23 is also formed by the same process.

Next, as shown in FIG. 9D, the liquid crystal orientation film HM2 is formed.

Here, the liquid crystal orientation film HM2 is formed by applying an orientation material onto the touch electrode 25 and the common electrode 23 and by forming a film. For example, an application liquid in which the orientation material is dissolved is applied by a spin coat method. Then, after the solvent in the application film is volatilized by a pre-bake process, the remaining solvent is removed by a main bake process. By this, the liquid crystal orientation film HM2 of, for example, polyimide is formed. The liquid crystal orientation film HM2 may be formed by offset printing or the like in addition to the spin coat method.

As shown in FIG. 9D, since the convex part and the concave part are alternately provided on the surface of the concave and convex area 500, the film of the orientation material is not formed on the top face of the convex part. Specifically, an application liquid in which the orientation material is dissolved enters the concave part of the concave and convex area 500 so as not to cover the top face of the convex part. Thus, in the concave and convex area 500, the liquid crystal orientation film HM2 is not formed on the surface of the top face of the convex part, and the surface of the touch electrode 25 is exposed.

Thereafter, an alignment process is performed. The alignment process is performed by, for example, a rubbing process. In addition to this, the alignment process such as a photo-alignment process, an ion beam alignment process, or a grating alignment process may be performed. Incidentally, for example, when the liquid crystal orientation film HM2 induces vertical orientation and the liquid crystal panel 200 is brought into the vertical orientation mode, it is not necessary to separately perform the alignment process.

As shown in FIG. 3, the opposite substrate 202 on which the respective parts are formed and the TFT array substrate 201 are bonded to each other. Thereafter, a liquid crystal material is injected between the TFT array substrate 201 and the opposite substrate 202 to provide the liquid crystal layer 203, and the liquid crystal panel 200 is completed.

(Conclusion)

As described above, in this embodiment, the touch electrode 25 to constitute the touch sensor switch SWs is provided to cover the surface of the concave and convex area 500 in which the plural grooves are formed to be spaced from each other. The liquid crystal orientation film HM2 is formed by applying the orientation material onto the surface on which the touch electrode 25 is formed, and the surface of the top face of the convex part of the concave and convex area 500 is exposed in the touch electrode 25. As stated above, in this embodiment, since the touch electrode 25 is formed along the surface of the concave and convex area 500, the surface of the top face of the convex part can be exposed without separately performing the process of removing the liquid crystal orientation film HM2 in this portion.

Thus, in this embodiment, the manufacture efficiency and yield can be improved. Besides, since it is not necessary to introduce a new equipment such as an inkjet equipment, the increase in manufacture cost can be prevented. Besides, in this embodiment, since the touch electrode 25 provided on the opposite substrate 202 and the touch electrode 62t provided on the TFT array substrate 201 can be appropriately electrically connected to each other at the time of contact, the reliability of the device can be improved.

Besides, in this embodiment, it is preferable that in the state where the touch electrode 25 is covered, the concave and convex area 500 is formed such that the width L of the convex part is 0.5 to 5.0 μm, and the width S of the concave part is 0.5 to 5.0 μm. Besides, it is preferable that the distance (height) H between the top face of the convex part and the bottom face of the concave part is 0.5 to 2.0 μm. By doing so, it can be appropriately realized that the surface of the top face of the convex part of the concave and convex area 500 in the touch electrode 25 is not covered with the liquid crystal orientation film HM2 but is exposed.

FIGS. 10A to 10C and FIGS. 11A and 11B are views showing a relation between the width L (μm) and height H (μm) of the convex part and the coverage (%) of the liquid crystal orientation film in the liquid crystal display device 100 of Embodiment 1 of the invention.

Figure 10A:
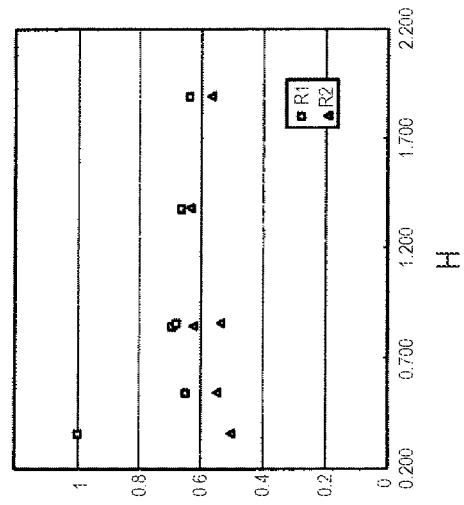
FIGS. 10A to 10C are views showing a relation between width L (μm) and height H (μm) of a convex part and a coverage (%) of a liquid crystal orientation film in the liquid crystal display device of Embodiment 1 of the invention.
Figure 10B:
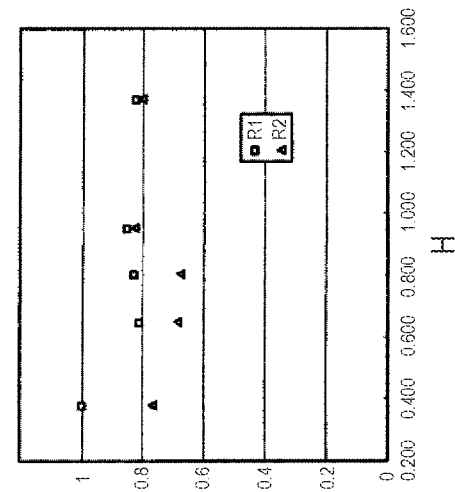
Figure 10C:
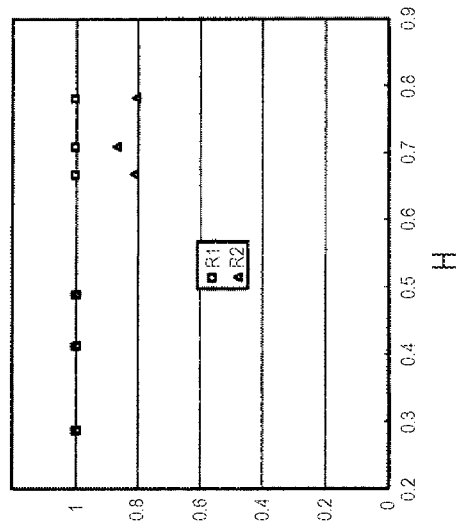

In FIGS. 10A to 10C, the horizontal axis indicates the height H (μm) and the vertical axis indicates the coverage (%/100) of the liquid crystal orientation film. FIGS. 10A, 10B and 10C respectively show the results of cases where the width L (μm) of the convex part is 0.3 μm, 0.8 μm and 1.2 μm. Incidentally, the width S of the concave part is also formed to be equal to the width L of the convex part.

On the other hand, FIGS. 11A and 11B are views showing two coverages R1 and R2 shown in FIGS. 10A to 10C. As shown in FIGS. 11A and 11B, the coverage R1 is represented by the following numerical expression (1), and the coverage R2 is represented by the following numerical expression (2). Here, as shown in FIGS. 11A and 11B, P denotes a pitch P between the plural concave parts. Besides, as shown in FIG. 11A, P1 denotes a width of the convex part where the liquid crystal orientation film HM2 is not covered. Besides, as shown in FIG. 11B, P2 denotes a width of a portion of the convex part where the film thickness becomes half of the film thickness of the liquid crystal orientation film HM2 provided on the bottom face of the concave part.

$$R1=(P-P1)/P \quad (1)$$

$$R2=(p-p2)/p \quad (2)$$

As is understood from the results of FIG. 10A to 10C, when the width L of the convex part is 0.5 μm or more, and the height H thereof is 0.5 μm or more, the liquid crystal orientation film HM2 is not covered on the whole surface.

When the width and the height exceed the upper limit values, such a disadvantage that the orientation film remains on the convex part can occur. The results as stated above can be obtained when the liquid viscosity of the application liquid is within the range of 1 to 500 mPa·s while its center value is 30 mPa·s.

Thus, it is preferable that the concave and convex area 500 is formed within the above numerical value range.

Incidentally, in the above, although the description is made on the case where the concave and convex area 500 is formed as shown in FIG. 7, no limitation is made to this.

FIG. 12 and FIG. 13 are enlarged views showing a portion of the concave and convex area 500 in modified examples of Embodiment 1 of the invention. FIG. 12 and FIG. 13 are top views.

As shown in FIG. 12, in the concave and convex area 500, plural grooves may be formed to be arranged in matrix form in the x direction and y direction.

Besides, as shown in FIG. 13, in the concave and convex area 500, plural grooves may be formed circularly.

In addition to this, in the above, the description is made on the case where the concave and convex area 500 is provided by processing the surface of the inter-layer insulating film Sz2 by the photolithography technique and by forming the grooves on the surface, no limitation is made to this.

Figure 14:
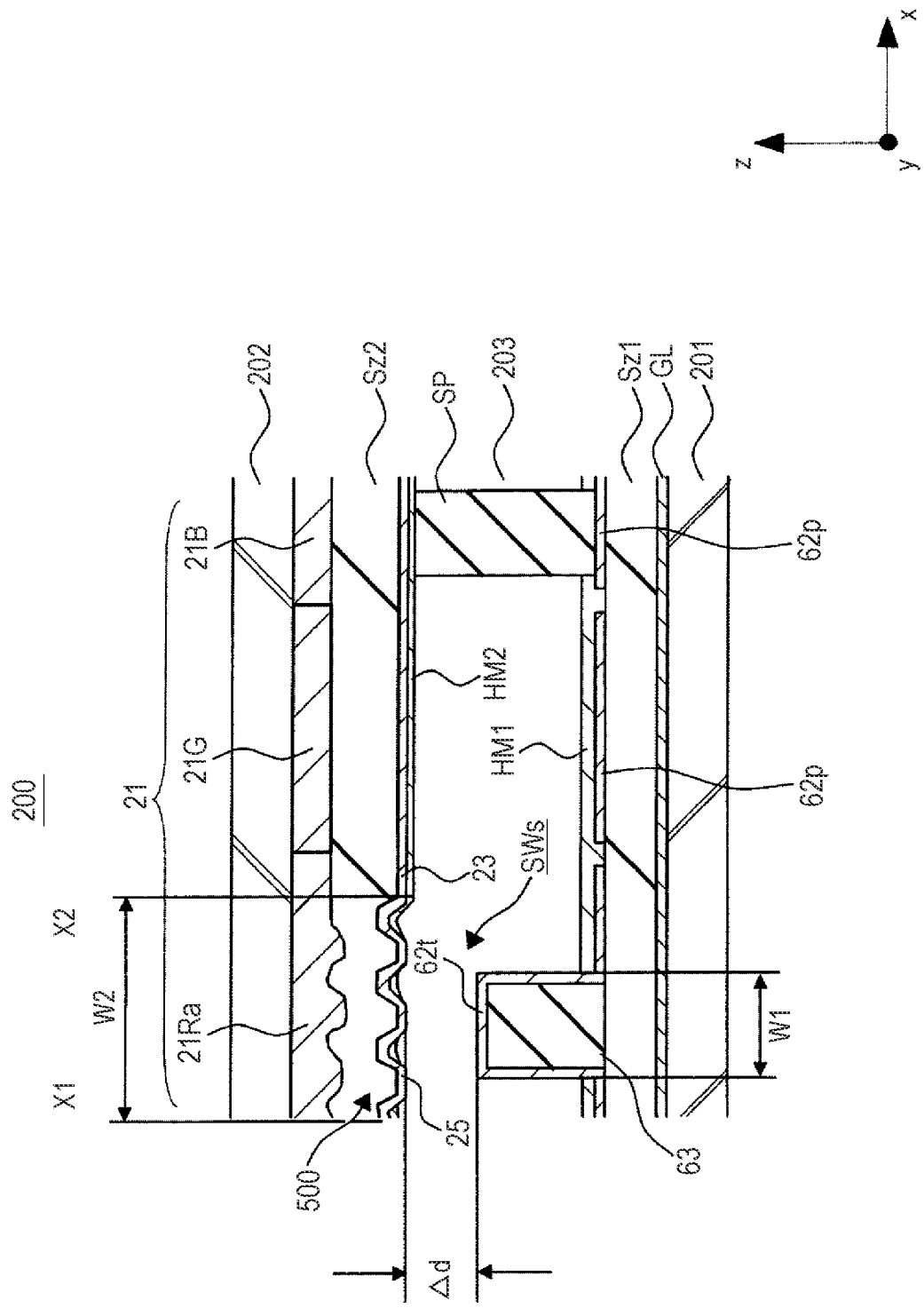
FIG. 14 is a view showing a main part of a liquid crystal panel in a modified example of Embodiment 1 of the invention.

FIG. 14 is a view showing the main part of a liquid crystal panel 200 in a modified example of Embodiment 1 of the invention. Here, FIG. 14 is a sectional view schematically showing the outline of a pixel P provided in a display area PA.

As shown in FIG. 14, a concave and convex area 500 may be provided in such a way that in a color filter layer 21, the surface of a red color filter layer 21Ra is processed by the photolithography technique to form grooves on the surface.

<2. Embodiment 2>

Hereinafter, Embodiment 2 of the invention will be described.

(Detailed Structure of Liquid Crystal Panel)

Figure 15:
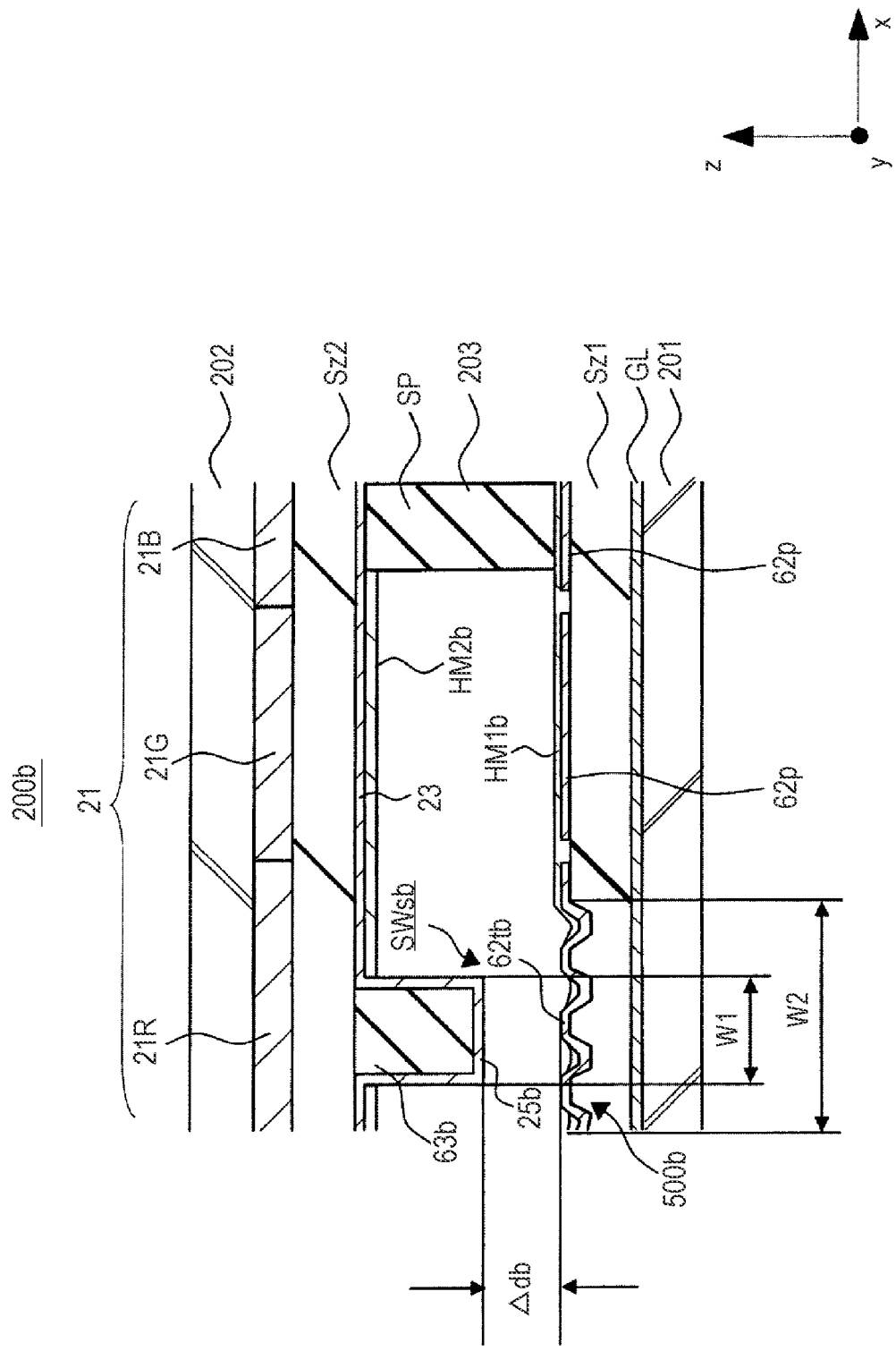
FIG. 15 is a view showing a main part of a liquid crystal panel of Embodiment 2 of the invention.

FIG. 15 is a view showing the main part of a liquid crystal panel 200b of Embodiment 2 of the invention. Here, FIG. 15 is a sectional view schematically showing the outline of a pixel P provided in a display area PA of a liquid crystal panel 200b of Embodiment 2 of the invention.

As shown in FIG. 15, in this embodiment, a structure of a touch sensor switch SWsb is different from that of Embodiment 1. Specifically, as is understood by comparing FIG. 15 with FIG. 3, a touch electrode 25b formed on an opposite substrate 202 is different from that of Embodiment 1. Besides, a touch electrode 62tb formed on a TFT array substrate 201 is different from that of Embodiment 1. This embodiment is similar to Embodiment 1 except for this point and points relevant thereto. Thus, the description of duplicate portions is omitted.

In the opposite substrate 202, as shown in FIG. 15, the touch electrode 25b is provided to cover a top face of an elastic member 63b.

As shown in FIG. 15, the elastic member 63b is provided on an inter-layer insulating film Sz2. The elastic member 63b is provided on the inter-layer insulating film Sz2 so as to protrude convexly in a direction toward the TFT array substrate 201. For example, the elastic member 63b is formed by pattern-processing a photosensitive acryl resin film. Here, as shown in FIG. 15, the elastic member 63b is formed so that its height is lower than a column spacer SP.

Then, as shown in FIG. 15, in the opposite substrate 202, a liquid crystal orientation film HM2 is provided to cover a surface other than the area where the elastic member 63b is provided. Here, the liquid crystal orientation film HM2 is formed by applying an orientation material onto the surface on which a common electrode 23 and a touch electrode 25b are formed. Since the elastic member 63b protrudes convexly from the surface of the opposite substrate 202, the orientation material is not applied to a portion positioned at its top face, and the surface of the touch electrode 25b is exposed.

In the TFT array substrate 201, as shown in FIG. 15, the touch electrode 62tb is formed to cover the surface of a concave and convex area 500b.

As shown in FIG. 15, the concave and convex area 500b is formed on a surface of the TFT array substrate 201 facing the opposite substrate 202 and on a surface of an inter-layer insulating film Sz1. As shown in FIG. 15, the concave and convex area 500b is provided so that its width W2b is wider than a width W1b of the elastic member 63b provided on the opposite substrate 202. Then, a specified sensor gap Δdb is provided between the concave and convex area 500b and the touch electrode 25b provided on the elastic member 63b of the opposite substrate 202.

Similarly to Embodiment 1, plural grooves are provided in the concave and convex area 500b, and the touch electrode 62tb is formed along the surface thereof. That is, a convex part and a concave part are alternately provided on the surface of the concave and convex area 500b.

As shown in FIG. 15, a liquid crystal orientation film HM1b is provided on the concave and convex area 500b. Here, the liquid crystal orientation film HM1b is formed by applying an orientation material onto a surface on which a pixel electrode 62p and a touch electrode 62t are formed. Since the convex part and the concave part are alternately provided on the surface of the concave and convex area 500b, similarly to the case of Embodiment 1, a film of the orientation material is not formed at a top face of the convex part. Thus, the surface of the touch electrode 62tb is exposed in the portion positioned at the top face of the convex part of the concave and convex area 500b.

(Conclusion)

As described above, in this embodiment, the touch electrode 62tb constituting the touch sensor switch SWsb is provided to cover the surface of the concave and convex area 500b where the plural grooves are formed to be spaced from each other. The liquid crystal orientation film HM1b is formed by applying the orientation material onto the surface on which the touch electrode 62tb is formed, and the surface of the top face of the convex part of the concave and convex area 500b is exposed in the touch electrode 62tb.

In this embodiment, the touch electrode 62tb is formed along the surface of the concave and convex area 500b, so that the surface of the touch electrode 62tb positioned at the top face of the convex part can be exposed in the concave and convex area 500b. That is, in this embodiment, it is not necessary to separately perform a process of removing the liquid crystal orientation film HM1b of this portion.

Thus, in this embodiment, similarly to Embodiment 1, the manufacture efficiency and yield can be improved, and the increase in manufacture cost can be prevented. Besides, the reliability of the device can be improved.

Incidentally, in the above, although the description is made on the case where the concave and convex area 500b is provided by processing the surface of the inter-layer insulating film Sz1 by the photolithography technique and by forming the grooves on the surface, no limitation is made to this.

Figure 16:
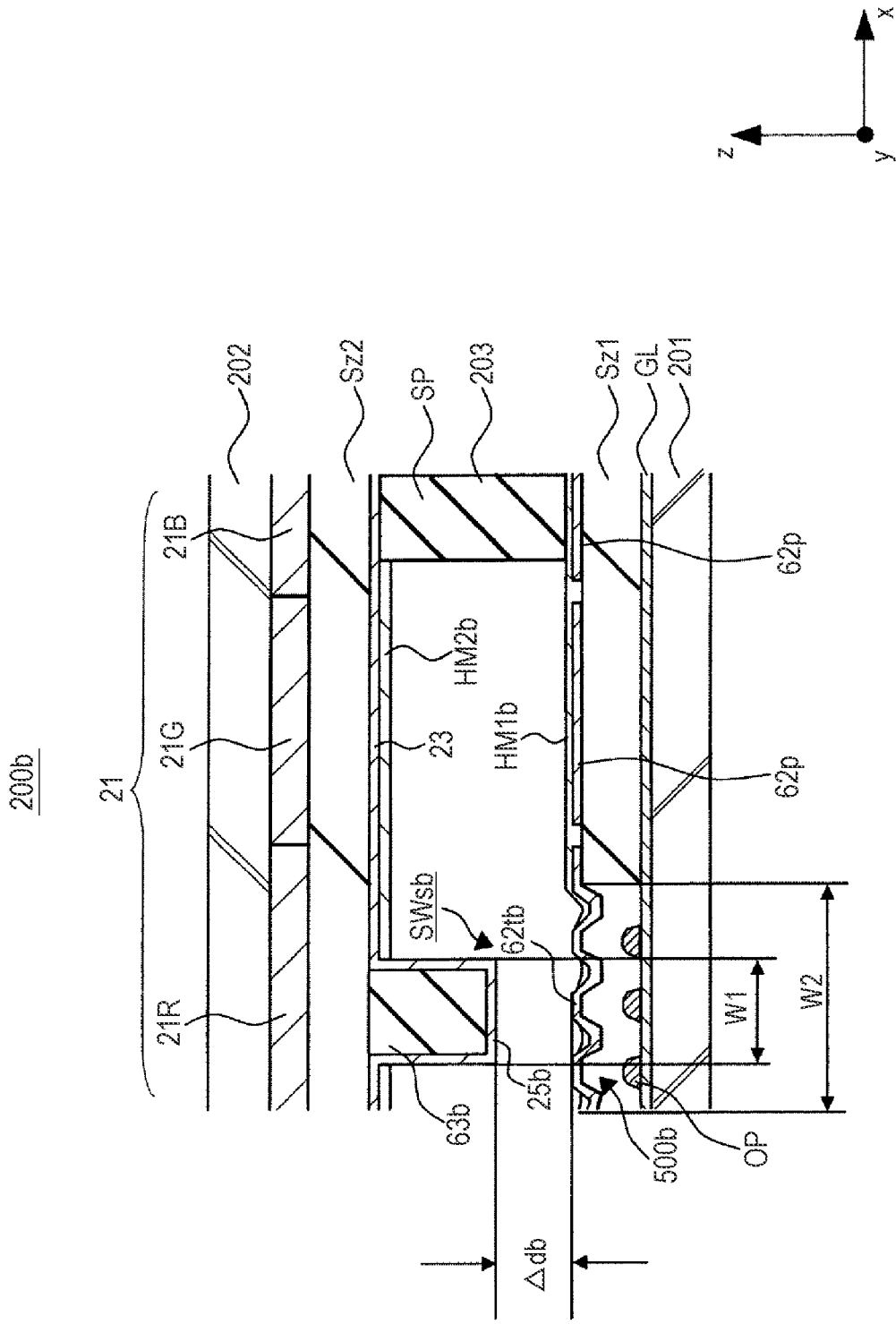
FIG. 16 is a view showing a main part of a liquid crystal panel of a modified example of Embodiment 2 of the invention.

FIG. 16 is a view showing a main part of a liquid crystal panel 200b in a modified example of Embodiment 2 of the invention. Here, FIG. 16 is a sectional view schematically showing the outline of a pixel P provided in a display area PA.

As shown in FIG. 16, plural under layers OP protruding convexly are provided on a surface of a TFT array substrate 201. A concave and convex area 500b may be provided by forming an inter-layer insulating film Sz1 so as to cover the plural under layers OP.

<3. Embodiment 3>

Hereinafter, Embodiment 3 of the invention will be described.

(Detailed Structure of Liquid Crystal Panel)

Figure 17:
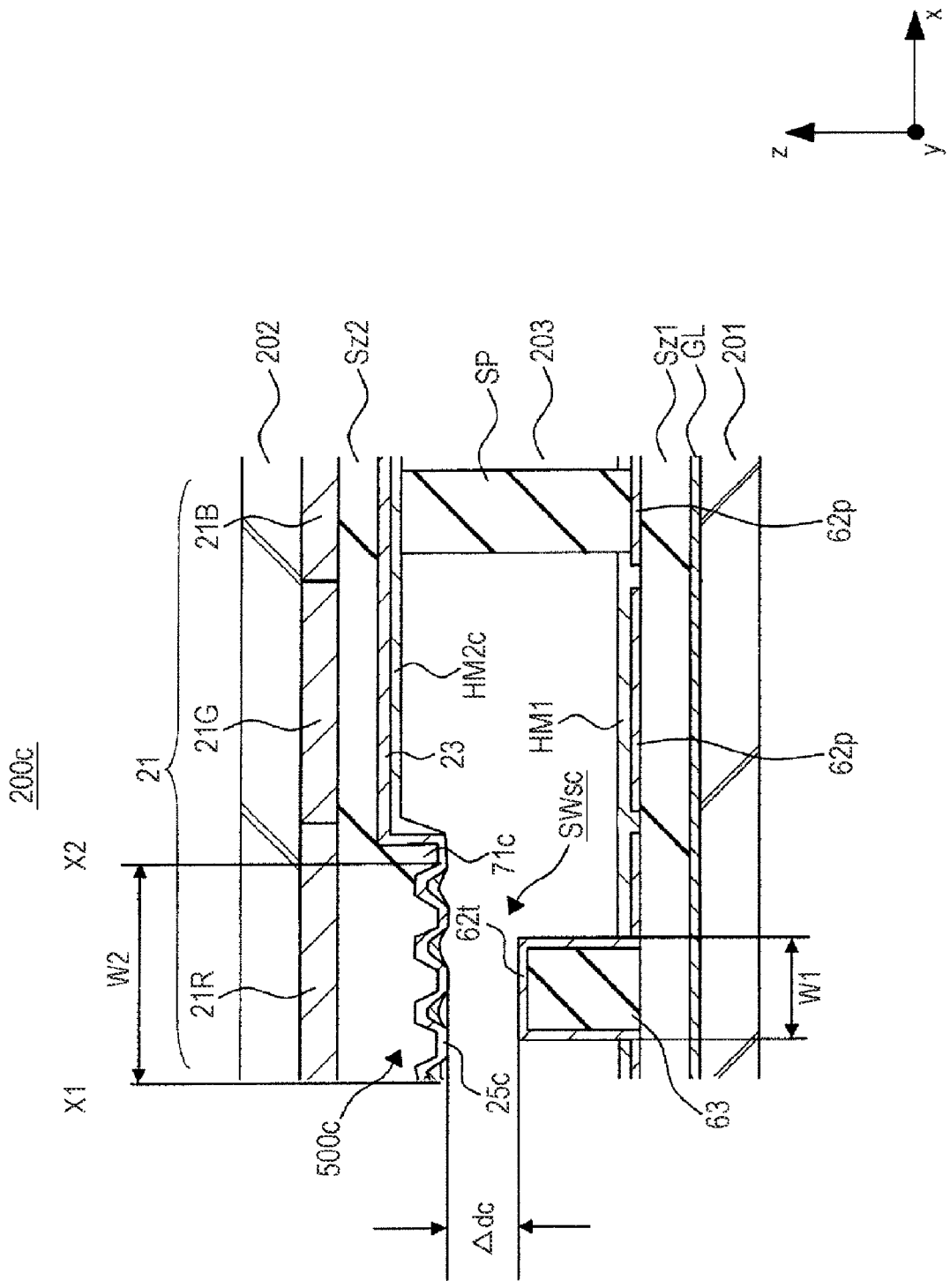
FIG. 17 is a view showing a main part of a liquid crystal panel of Embodiment 3 of the invention.

FIG. 17 is view showing a main part of a liquid crystal panel 200c of Embodiment 3 of the invention. Here, FIG. 17 is a sectional view schematically showing the outline of a pixel P provided in a display area PA in the liquid crystal panel 200c of this embodiment.

As shown in FIG. 17, in this embodiment, a structure of a touch sensor switch SWsc is different from that of Embodiment 1. Specifically, as is understood by comparing FIG. 17 with FIG. 3, a portion of a touch electrode 25c formed on an opposite substrate 202 is different from that of Embodiment 1. This embodiment is similar to Embodiment 1 except for this point and points relevant thereto. Thus, the description of duplicate portions is omitted.

As shown in FIG. 17, the touch electrode 25c is provided on the opposite substrate 202 so as to cover the surface of a concave and convex area 500c.

In this embodiment, as shown in FIG. 17, the concave and convex area 500c is formed on a top face of an elastic member 71c formed to protrude convexly from a surface of an inter-layer insulating film Sz2. For example, the elastic member 71c is formed using the same material as the inter-layer insulating film Sz2. By this, the concave and convex area 500c is formed so that a specified sensor gap Δdc is provided between itself and a touch electrode 62t provided on a TFT array substrate 201.

Then, as shown in FIG. 17, a liquid crystal orientation film HM2c is formed by applying an orientation material onto a surface on which the touch electrode 25c is formed. In the liquid crystal orientation film. HM2c, since a convex part and a concave part are alternately provided on the surface of the concave and convex area 500c, a film of the orientation material is not formed at a top face of the convex part, and the surface of the touch electrode 25c positioned at the top face of the convex part is exposed.

(Conclusion)

As described above, in this embodiment, similarly to Embodiment 1, the touch electrode 25c is formed along the surface of the concave and convex area 500c. Thus, in this embodiment, the surface of the touch electrode 62td can be exposed on the top face of the convex part without separately performing a process of removing the liquid crystal orientation film HM2c of this portion. Thus, in this embodiment, similarly to the other embodiments, the manufacture efficiency and yield can be improved, and the increase in manufacture cost can be prevented. Besides, the reliability of the device can be improved.

Particularly, in this embodiment, the concave and convex area 500c is formed on the top face of the elastic member 71c formed to protrude convexly from the surface of the inter-layer insulating film Sz2. Thus, in this embodiment, the application liquid applied to form the liquid crystal orientation film HM2c hardly covers the top face of the concave and convex area 500c. Thus, in this embodiment, the above effects can be more appropriately obtained.

<4. Embodiment 4>

Hereinafter, Embodiment 4 of the invention will be described.

(Detailed Structure of Liquid Crystal Panel)

Figure 18:
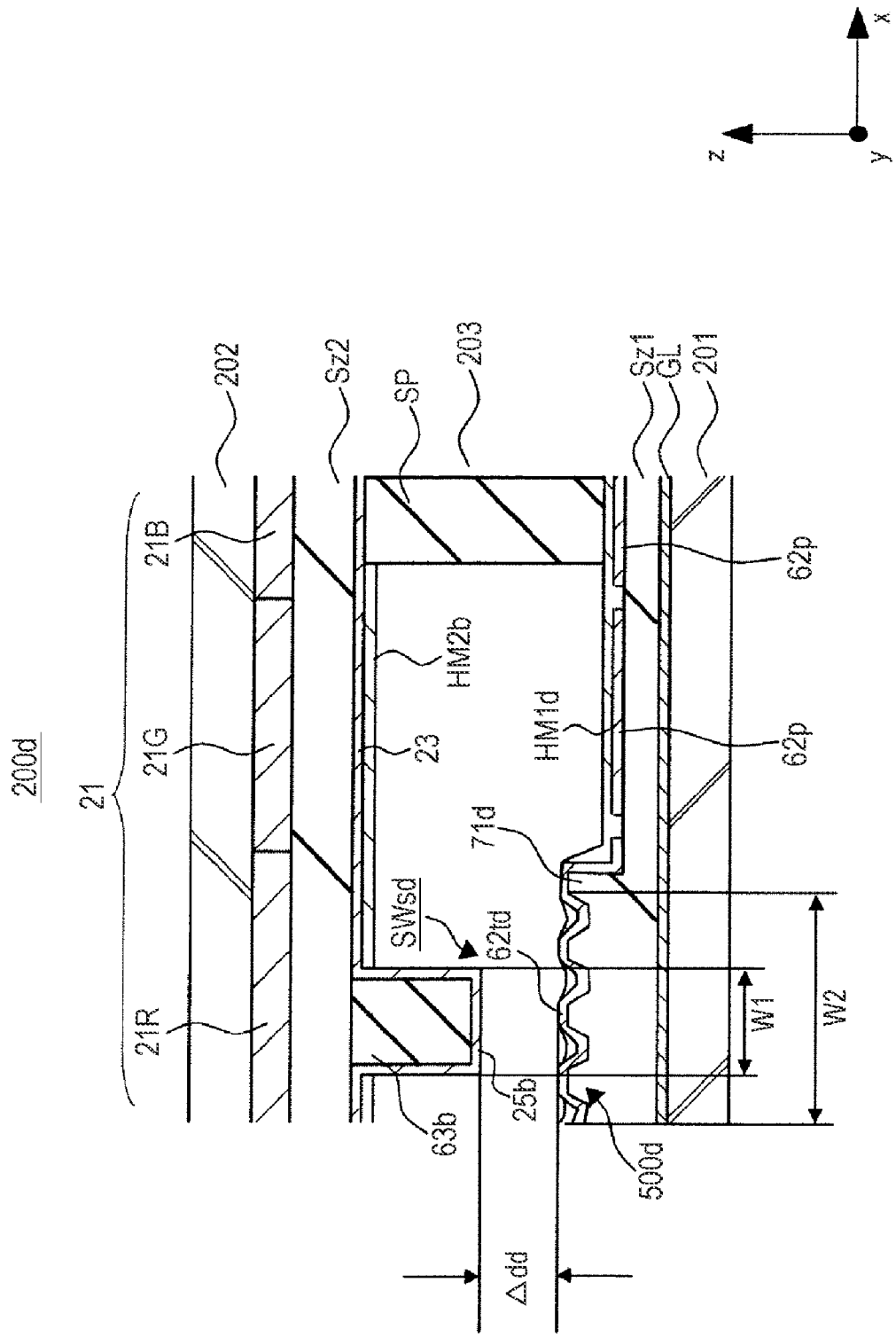
FIG. 18 is a view showing a main part of a liquid crystal panel of Embodiment 4 of the invention.

FIG. 18 is a view showing a main part of a liquid crystal panel 200d of Embodiment 4 of the invention. Here, FIG. 18 is a sectional view schematically showing the outline of a pixel P provided in a display area PA in the liquid crystal panel 200d of this embodiment.

As shown in FIG. 18, in this embodiment, a structure of a touch sensor switch SWsd is different from that of Embodiment 2. Specifically, as is understood by comparing FIG. 18 with FIG. 15, a portion of a touch electrode 62td formed on a TFT array substrate 201 is different from that of Embodiment 2. This embodiment is similar to Embodiment 2 except for this point and points relevant thereto. Thus, the description of duplicate portions is omitted.

As shown in FIG. 18, in the TFT array substrate 201, the touch electrode 62td is provided to cover the surface of a concave and convex area 500d.

In this embodiment, as shown in FIG. 18, the concave and convex area 500d is formed on a top face of an elastic member 71d formed to protrude convexly from a surface of an inter-layer insulating film Sz1. For example, the elastic member 71d is formed using the same material as the inter-layer insulating film Sz1. By this, the concave and convex area 500d is formed so that a specified sensor gap Add is provided between itself and a touch electrode 25b provided on an opposite substrate 202.

Then, as shown in FIG. 18, a liquid crystal orientation film HM1d is formed by applying an orientation material onto a surface on which the touch electrode 62td is formed. In the liquid crystal orientation film HM1d, since a convex part and a concave part are alternately provided on the surface of the concave and convex area 500d, a film of the orientation material is not formed at a top face of the convex part, and the surface of the touch electrode 62td positioned at the top face of the convex part is exposed.

(Conclusion)

As described above, in this embodiment, similarly to Embodiment 2, the touch electrode 62td is formed on the surface of the concave and convex area 500d. Thus, in this embodiment, the surface of the touch electrode 62td can be exposed on the top face of the convex part without separately performing a process of removing the liquid crystal orientation film HM1d of this portion. Thus, in this embodiment, similarly to the other embodiments, the manufacture efficiency and yield can be improved, and the increase in manufacture cost can be prevented. Besides, the reliability of the device can be improved.

Particularly, in this embodiment, the concave and convex area 500d is formed on the top face of the elastic member 71d formed to protrude convexly from the surface of the inter-layer insulating film Sz1. Thus, in this embodiment, the application liquid applied to form the liquid crystal orientation film HM1d hardly covers the top face of the concave and convex area 500d. Thus, in this embodiment, the above effects can be more appropriately obtained.

<5. Embodiment 5>

Hereinafter, Embodiment 5 of the invention will be described.

(Detailed Structure of Liquid Crystal Panel)

Figure 19:
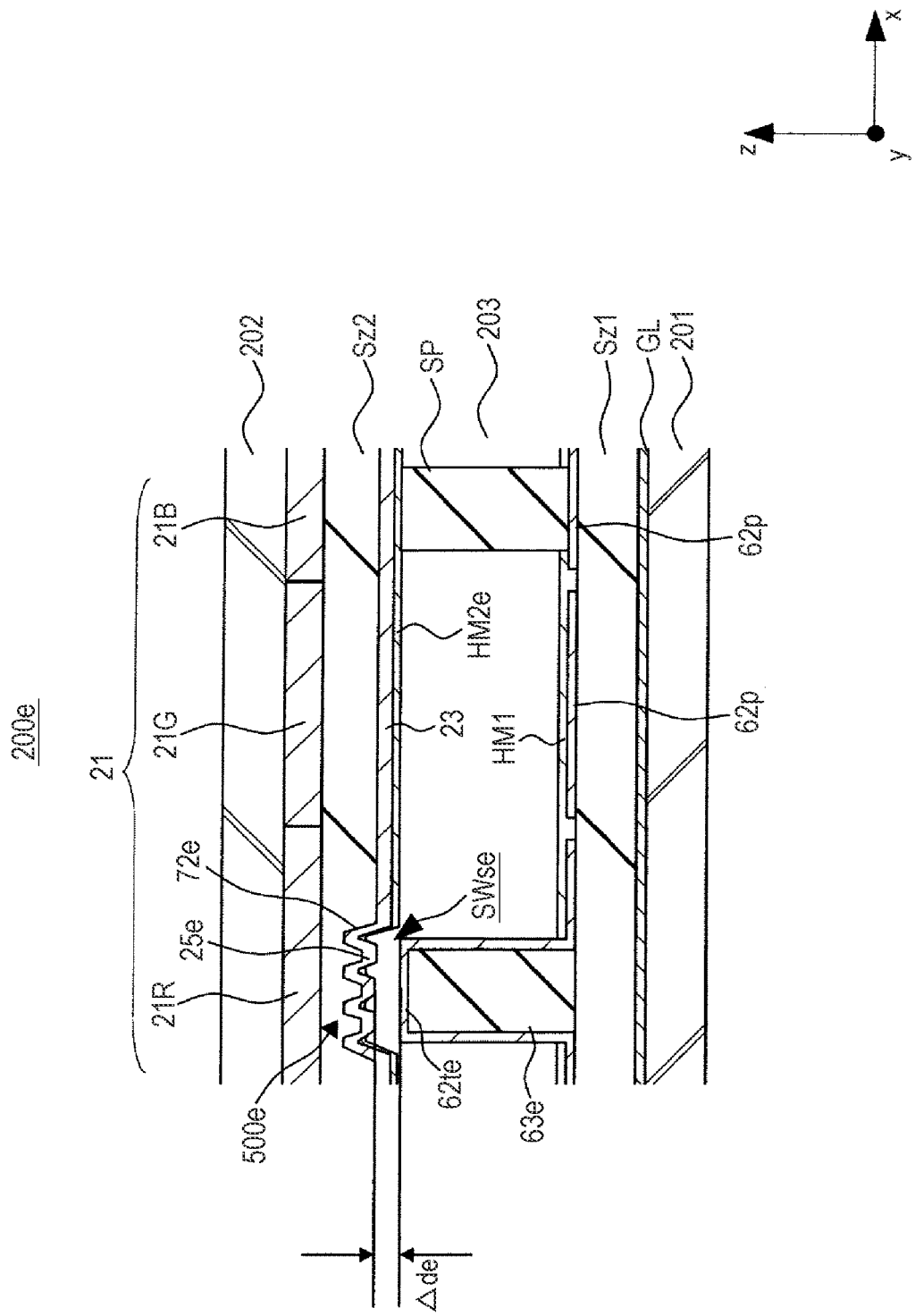
FIG. 19 is a view showing a main part of a liquid crystal panel of Embodiment 5 of the invention.

FIG. 19 is a view showing a main part of a liquid crystal panel 200e of Embodiment 5 of the invention. Here, FIG. 19 is a sectional view schematically showing the outline of a pixel P provided in a display area PA of the liquid crystal panel 200e of this embodiment.

As shown in FIG. 19, in this embodiment, a structure of a touch sensor switch SWse is different from that of Embodiment 1. Specifically, as is understood by comparing FIG. 19 with FIG. 3, a touch electrode 25e formed on an opposite substrate 202 is different from that of Embodiment 1. Besides, a touch electrode 62te formed on a TFT array substrate 201 is different from that of Embodiment 1. This embodiment is similar to Embodiment 1 except for this point and points relevant thereto. Thus, the description of duplicate portions is omitted.

As in the case of Embodiment 1, in the opposite substrate 202, as shown in FIG. 19, the touch electrode 25e is formed on an inter-layer insulating film Sz2 so as to be integral with and to have the same layer as a common electrode 23. Here, as shown in FIG. 19, the touch electrode 25e is provided to cover the surface of a concave and convex area 500e.

In this embodiment, as shown in FIG. 19, the concave and convex area 500e is formed on a bottom face of a concave area 72e provided on the surface of the inter-layer insulating film Sz2. That is, the inter-layer insulating film Sz2 is formed so that the height of the surface of the concave and convex area 500e on which the touch electrode 25e is formed is lower than the surface of an area other than the concave and convex area 500e.

For example, in the inter-layer insulating film Sz2 made of a photosensitive material, a portion where the concave and convex area 500e is to be formed is removed by a photolithography technique, so that the concave and convex area 500e is provided. Further, the concave and convex area 500e may be formed by, for example, a nanoimprint method.

Then, as shown in FIG. 19, a liquid crystal orientation film HM2e is formed by applying an orientation material onto a surface on which the common electrode 23 and the touch electrode 25e are formed. In this embodiment, similarly to Embodiment 1, since a convex part and a concave part are alternately provided on the surface of the concave and convex area 500e, a film of the orientation material is not formed on the top face of the convex part. Thus, the surface of the touch electrode 25e positioned on the convex part is exposed.

In the TFT array substrate 201, as shown in FIG. 19, the touch electrode 62te is provided to cover a top face of an elastic member 63e.

As shown in FIG. 19, the elastic member 63e is provided on an inter-layer insulating film Sz1 so as to protrude convexly in a direction toward the opposite substrate 202.

In this embodiment, the elastic member 63e is formed so that its height is equal to a column spacer SP in the state where the touch electrode 62te is covered.

(Conclusion)

As described above, in this embodiment, similarly to Embodiment 1, the touch electrode 25e is formed along the surface of the concave and convex area 500e. Thus, in this embodiment, the surface of the touch electrode 25e can be exposed on the top face of the convex part without separately performing a process of removing the liquid crystal orientation film HM2e of this portion. Thus, in this embodiment, the manufacture efficiency and yield can be improved, and the increase in manufacture cost can be prevented. Besides, the reliability of the device can be improved.

Particularly, in this embodiment, since the height of the concave and convex area 500e can be adjusted at high precision by adjusting the exposure amount in the photolithography technique, a variation of a sensor gap Δde can be suppressed. That is, it becomes unnecessary to specify a sensor gap Δde by adjusting the height of the elastic member 63e by an application condition (number of rotations, etc.) in a spin coat method. Thus, in this embodiment, the above effects can be more appropriately obtained.

Incidentally, in the above, as shown in FIG. 19, the description is made on the case where the elastic member 63e and the column spacer SP are separately formed, no limitation is made to this.

Figure 20:
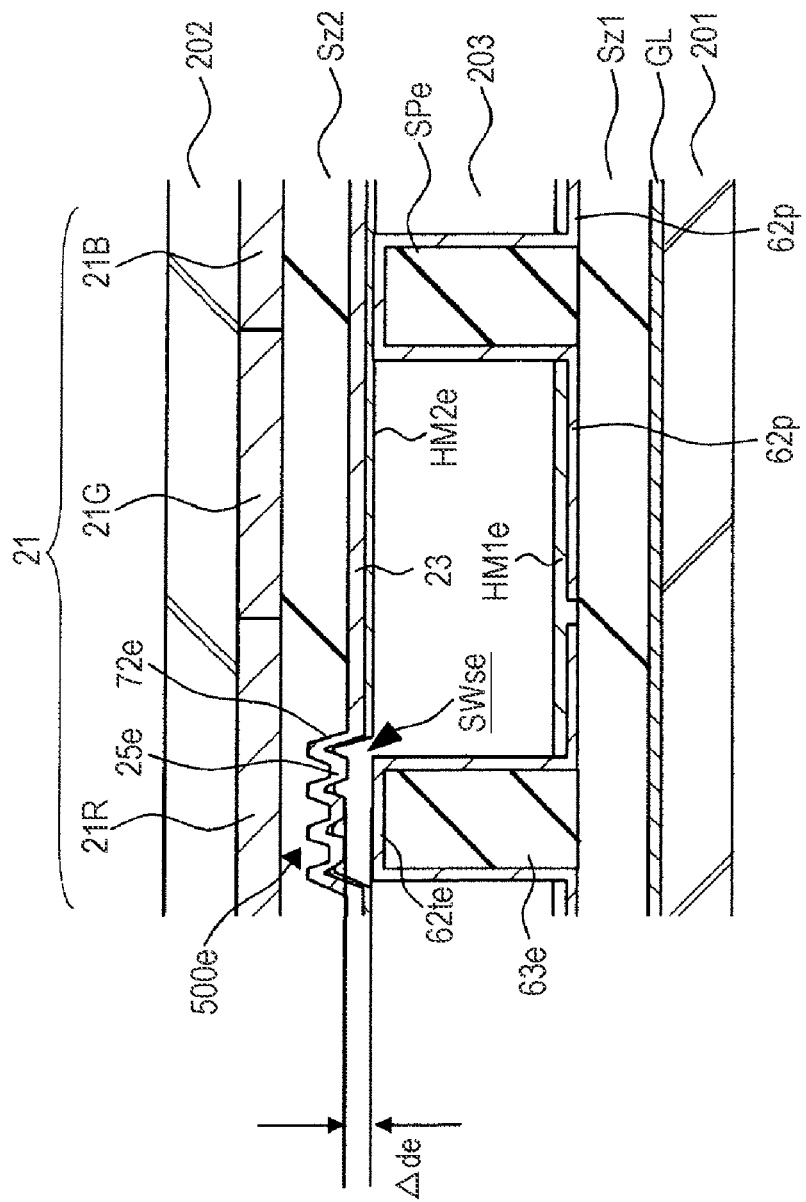
FIG. 20 is a view showing a main part of a liquid crystal panel of a modified example of Embodiment 5 of the invention.

FIG. 20 is a view showing a main part of a liquid crystal panel 200eb in a modified example of Embodiment 5. Here, FIG. 20 is a sectional view schematically showing the outline of a pixel P provided in a display area PA.

As shown in FIG. 20, an elastic member 63e and a column spacer SPe may be formed in a same process.

Specifically, after a photosensitive resin film (not shown) is provided on an inter-layer insulating film Sz1, the photosensitive resin film is pattern-processed into the elastic member 63e and the column spacer SPe by the photolithography technique. Thereafter, a touch electrode 62te and a pixel electrode 62p are formed, and then, a liquid crystal orientation film HM1e is formed.

By doing so, the number of steps can be reduced, and the above effects can be appropriately obtained.

<6. Embodiment 6>

Hereinafter, Embodiment 6 of the invention will be described.

(Detailed Structure of Liquid Crystal Panel)

Figure 21:
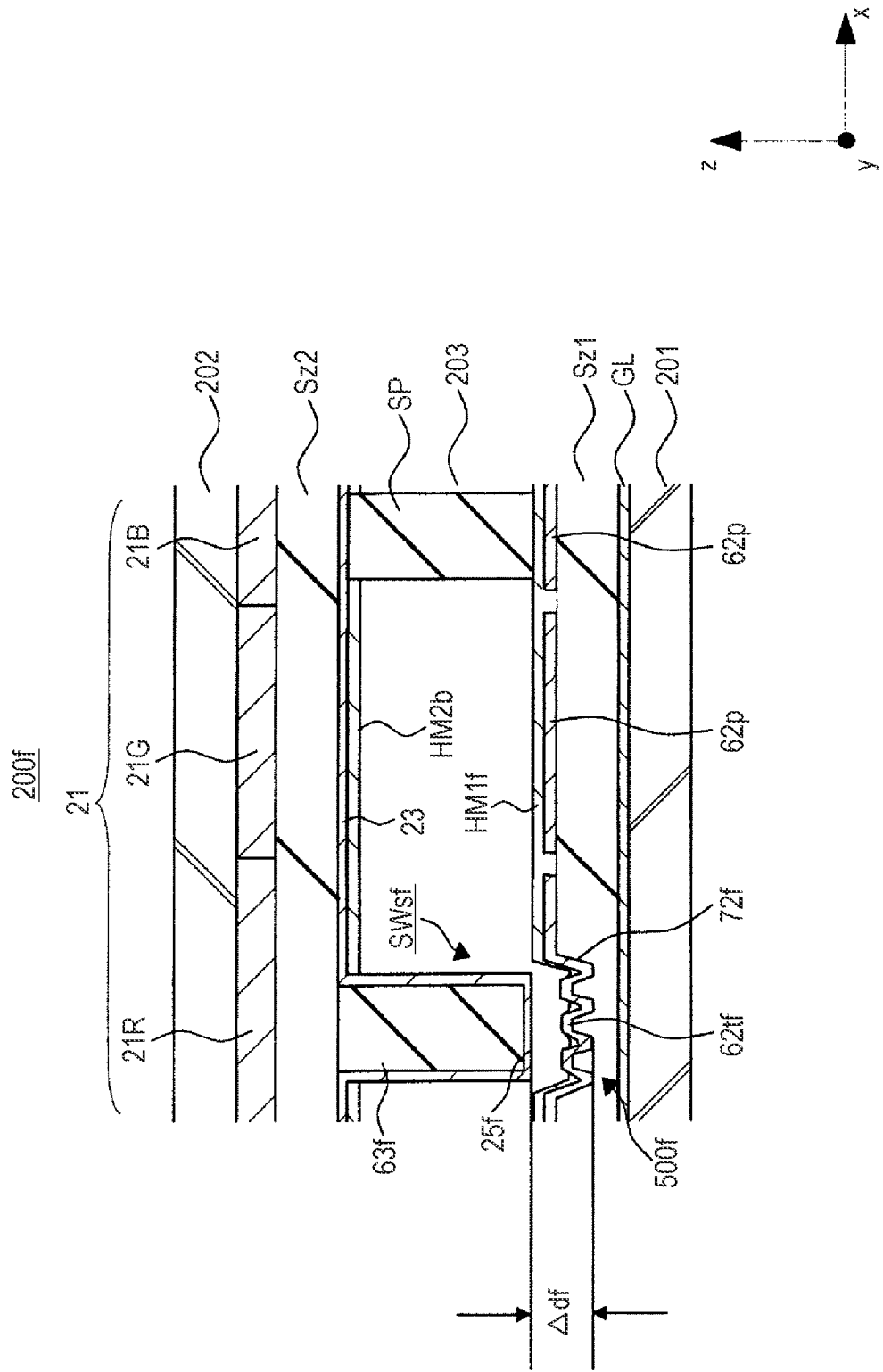
FIG. 21 is a view showing a main part of a liquid crystal panel of Embodiment 6 of the invention.

FIG. 21 is a view showing a main part of a liquid crystal panel 200f of Embodiment 6. Here, FIG. 21 is a sectional view schematically showing a pixel P provided in a display area PA in a liquid crystal panel 200f of this embodiment.

As shown in FIG. 21, in this embodiment, a structure of a touch sensor switch SWsf is different from that of Embodiment 2. Specifically, as is understood by comparing FIG. 21 with FIG. 15, a touch electrode 25f formed on an opposite substrate 202 is different from that of Embodiment 2. Besides, a touch electrode 62tf formed on a TFT array substrate 201 is different from that of Embodiment 2. This embodiment is similar to Embodiment 2 except for this point and points relevant thereto. Thus, the description of duplicate portions is omitted.

In the opposite substrate 202, as shown in FIG. 21, similarly to Embodiment 2, the touch electrode 25f is formed to be integral with and to have the same laser as a common electrode 23 on an inter-layer insulating film Sz2. Here, as shown in FIG. 21, the touch electrode 25f is provided to cover a top face of an elastic member 63f.

As shown in FIG. 21, the elastic member 63f is provided on the inter-layer insulating film Sz2 so as to protrude convexly in a direction toward the TFT array substrate 201.

In this embodiment, the elastic member 63f is formed so that its height is equal to a column spacer SP in the state where the touch electrode 25f is covered.

In the TFT array substrate 201, as shown in FIG. 21, the touch electrode 62tf is provided to cover the surface of a concave and convex area 500f.

In this embodiment, as shown in FIG. 21, the concave and convex area 500f is formed on a bottom face of a concave area 72f provided on the surface of the inter-layer insulating film Sz1. That is, the inter-layer insulating film Sz1 is formed so that the height of the surface of the concave and convex area 500f where the touch electrode 62tf is formed is lower than the surface of an area other than the concave and convex area 500f.

For example, in the inter-layer insulating film Sz1 made of a photosensitive material, a portion where the concave and convex area 500f is to be formed is removed by a photolithography technique, so that the concave and convex area 500f is provided. In addition to this, the concave and convex area 500f may be formed by, for example, a nanoinprint method.

Then, as shown in FIG. 21, a liquid crystal orientation film HM1f is formed by applying an orientation material onto the surface on which a pixel electrode 62p and the touch electrode 62tf are formed. In this embodiment, similarly to Embodiment 2, since a convex part and a concave part are alternately provided on the surface of the concave and convex area 500f, a film of the orientation material is not formed on a top face of the convex part. Thus, the surface of the touch electrode 62tf positioned on the convex part is exposed.

(Conclusion)

As described above, in this embodiment, similarly to Embodiment 2, the touch electrode 62tf is formed along the surface of the concave and convex area 500f. Thus, in this embodiment, the surface of the touch electrode 62tf can be exposed on the top face of the convex part without separately performing a process of removing the liquid crystal orientation film HM1f of this portion. Thus, in this embodiment, the manufacture efficiency and yield can be improved, and the increase in manufacture cost can be prevented. Besides, the reliability of the device can be improved.

Particularly, in this embodiment, similarly to Embodiment 5, since the height of the concave and convex area 500f can be adjusted at high precision by adjusting the exposure amount in the photolithography technique, a variation of a sensor gap Δdf can be suppressed. That is, it becomes unnecessary to specify the sensor gap Δdf by adjusting the height of the elastic member 63f by an application condition (number of rotations, etc.) in a spin coat method. Thus, in this embodiment, the above effects can be more appropriately obtained.

Incidentally, in the above, as shown in FIG. 21, the description is made on the case where the elastic member 63f and the column spacer SP are separately formed, no limitation is made to this.

Figure 22:
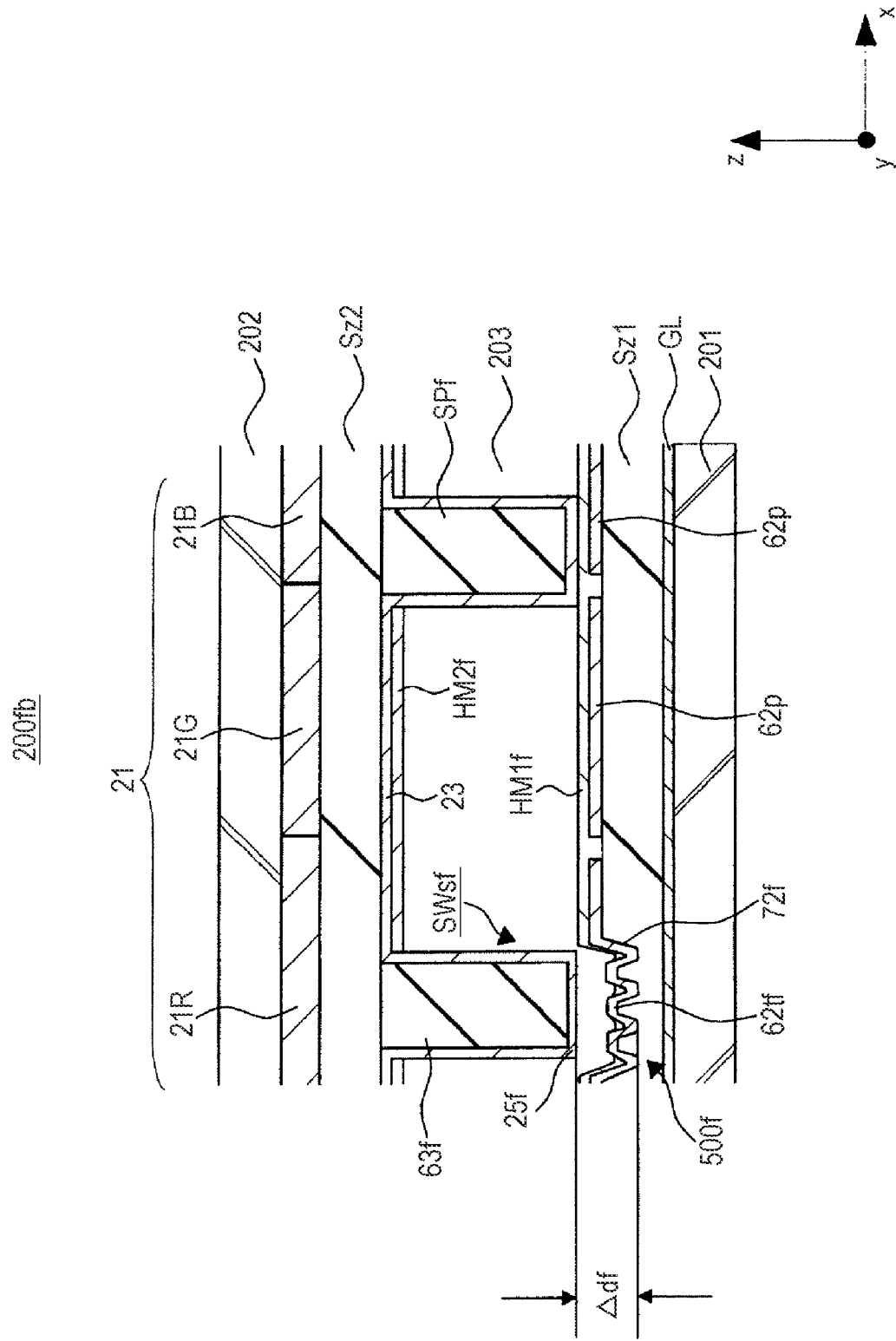
FIG. 22 is a view showing a main part of a liquid crystal panel of a modified example of Embodiment 6 of the invention.

FIG. 22 is a view showing a main part of a liquid crystal panel 200fb in a modified example of Embodiment 6. Here, FIG. 22 is a sectional view schematically showing the outline of a pixel P provided in a display area PA.

As shown in FIG. 22, an elastic member 63f and a column spacer SPf may be formed in a same process.

Specifically, after a photosensitive resin film (not shown) is provided on an inter-layer insulating film Sz2, the photosensitive resin film is pattern-processed into the elastic member 63f and the column spacer SPf by the photolithography technique. Thereafter, a touch electrode 25f and a common electrode 23 are formed, and then, a liquid crystal orientation film HM2f is formed.

By doing so, the number of steps can be reduced, and the effects can be appropriately obtained.

<7. Embodiment 7>

Hereinafter, Embodiment 7 of the invention will be described.

(Detailed Structure of Liquid Crystal Panel)

Figure 23:
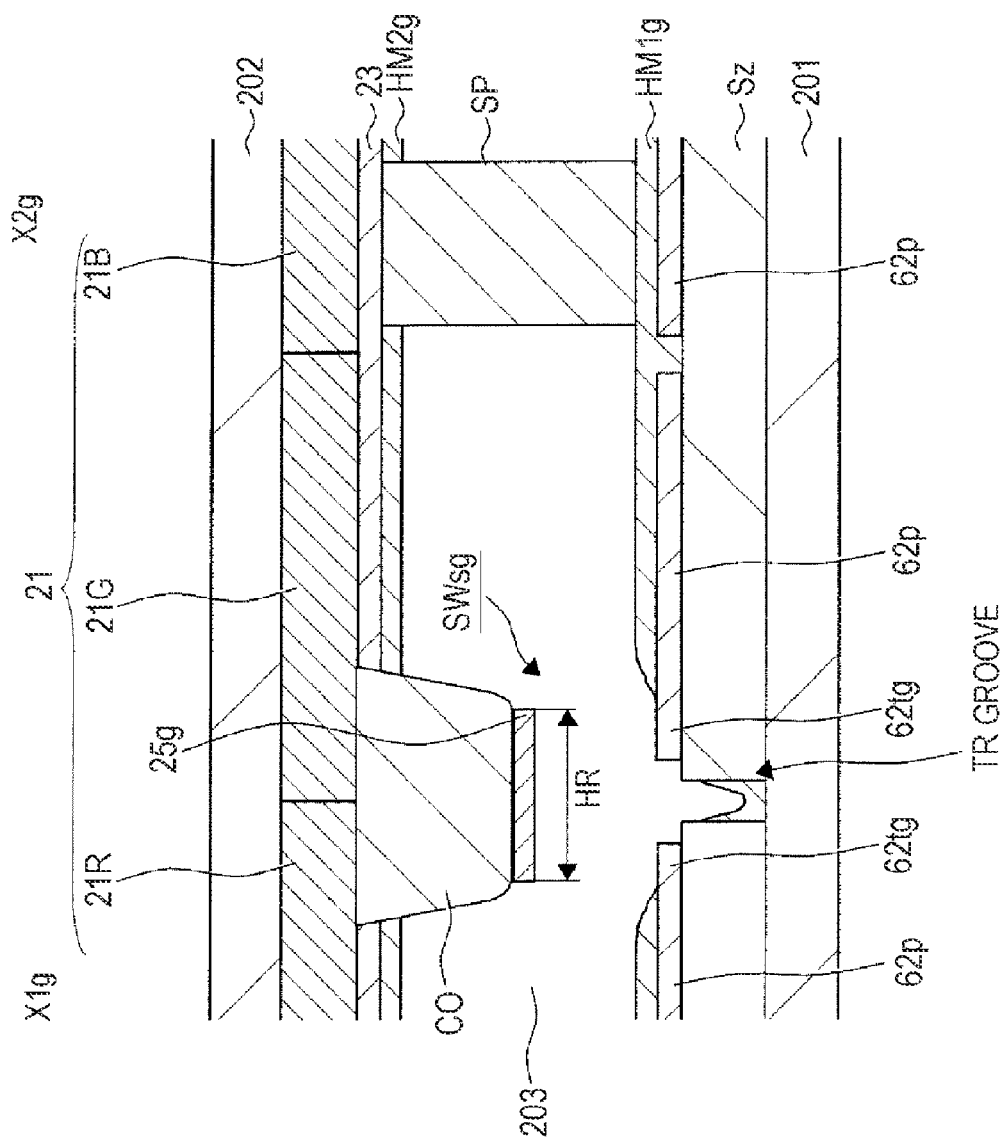
FIG. 23 is a view showing a main part of a liquid crystal panel according to Embodiment 7 of the invention.
Figure 24:
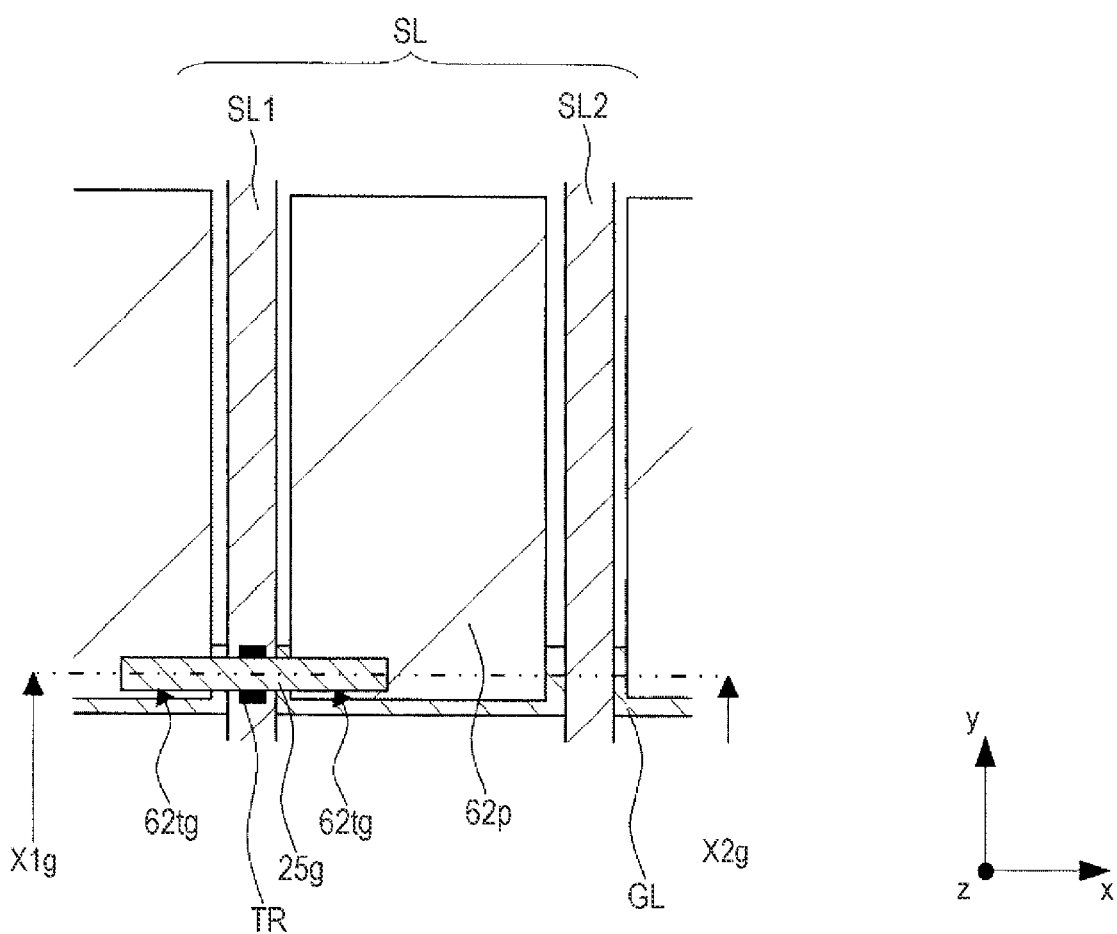
FIG. 24 is a view showing a main part of the liquid crystal panel according to Embodiment 7 of the invention.
Figure 25:
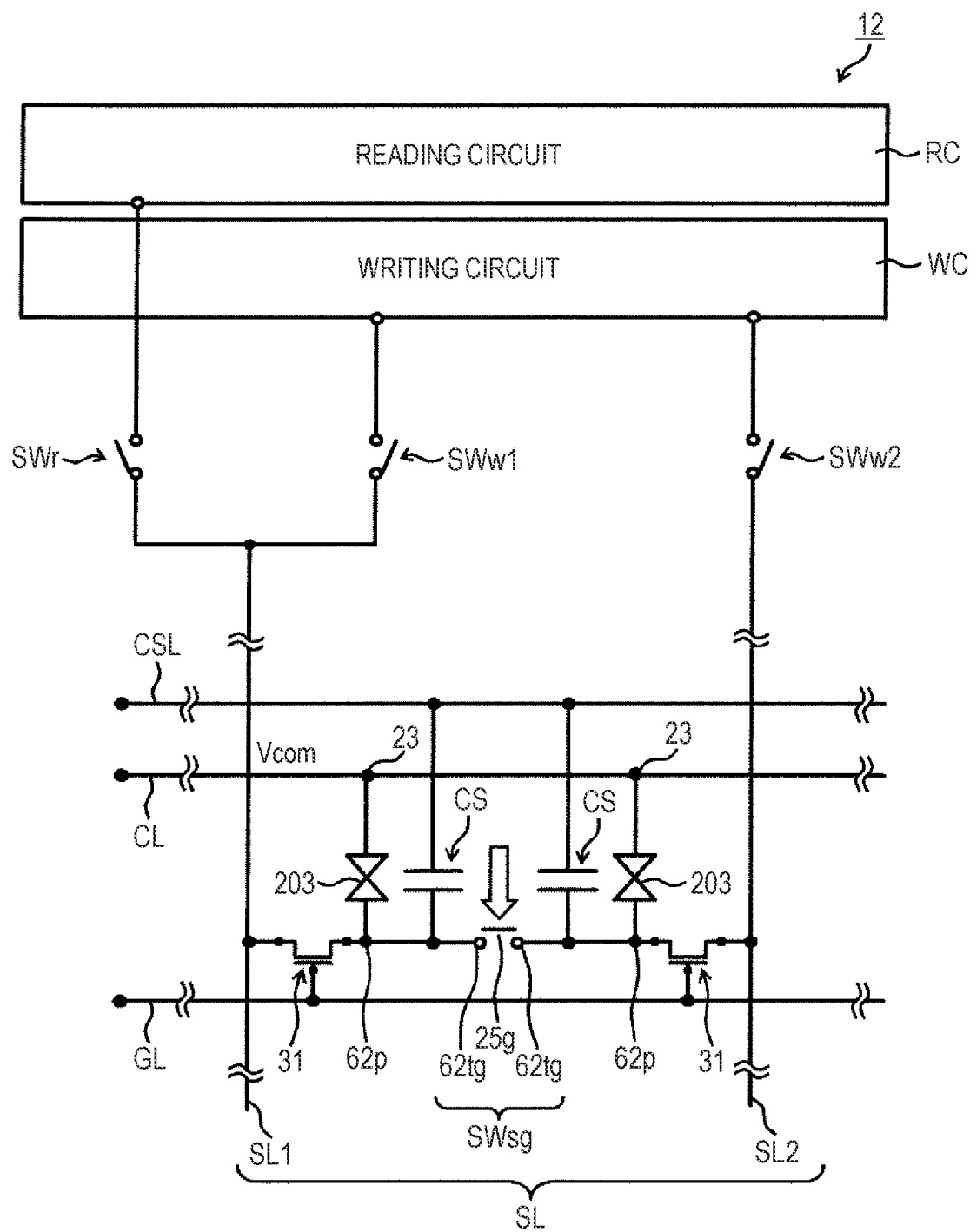
FIG. 25 is a view showing a main part of the liquid crystal panel according to Embodiment 7 of the invention.

FIGS. 23 to 25 are views showing a main part of a liquid crystal panel 200g according to Embodiment 7 of the invention.

FIG. 23 is a sectional view schematically showing the outline of a pixel P provided in a display area PA.

FIG. 24 is a top view schematically showing the outline of the pixel P provided in the display area PA. FIG. 23 corresponds to an X1g-X2g portion of FIG. 24. For convenience of illustration, the respective members are shown while omission, scale change and the like are suitably performed.

FIG. 25 is a circuit diagram showing the outline of the liquid crystal panel 200g. FIG. 25 shows a portion including adjacent pixels P.

As shown in FIGS. 23, 24, and 25, in this embodiment, a touch sensor switch SWsg has a structure different from Embodiment 2. This embodiment is similar to Embodiment 2 except for this point and points relevant thereto. Thus, the description of duplicate portions is omitted.

In this embodiment, as shown in FIG. 23, the liquid crystal panel 200g has a built-in touch sensor switch SWsg. As shown in FIG. 23, the touch sensor switch SWsg includes touch electrodes 62tg and 25g.

In a TFT array substrate 201 constituting the liquid crystal panel 200g, as shown in FIG. 23, in addition to a pixel electrode 62p, the one touch electrode 62tg constituting the touch sensor switch SWsg is formed on the side facing an opposite substrate 202.

In the opposite substrate 202 constituting the liquid crystal panel 200g, as shown in FIG. 23, in addition to a color filter layer 21 and a common electrode 23, the touch electrode 25g is formed on the side facing the TFT array substrate 201.

As shown in FIG. 24, the liquid crystal panel 200g includes a gate line GL and a signal line SL, in addition to the members shown in FIG. 23. As shown in FIG. 25, the liquid crystal panel 200g also includes a pixel switching element 31 and a storage capacitive element CS. The gate line GL, the signal line SL, the pixel switching element 31, and the storage capacitive element CS are not shown in FIGS. 23 and 24, but they are provided on the TFT array substrate 201 constituting the liquid crystal panel 200g.

(A) TFT Array Substrate 201

The respective parts provided in the TFT array substrate 201 will be described in detail.

In the TFT array substrate 201, as shown in FIG. 23, the pixel electrode 62p and the touch electrode 62tg are provided on the side of the TFT array substrate 201 facing the opposite substrate 202 through an inter-layer insulating film Sz. Each of the pixel electrode 62p and the touch electrode 62tg is a so-called transparent electrode and is formed by using, for example, ITO. The pixel electrode 62p and the touch electrode 62tg are integrally formed and electrically connected to each other.

As shown in FIG. 24, the pixel electrode 62p and the touch electrode 62tg are formed of a rectangular pattern so as to correspond to each of plural areas obtained by dividing the xy plane by the gate lines GL and the signal lines SL.

Specifically, as shown in FIG. 23, the pixel electrode 62p is provided so as to correspond to each of a red filter layer 21R, a green filter layer 21G, and a blue filter layer 21B constituting the color filter layer 21. That is, the pixel electrode 62p is formed so as to correspond to each of the three sub-pixels constituting the pixel P. As shown in FIG. 23, the pixel electrode 62p faces the common electrode 23 through a liquid crystal layer 203. As shown in FIG. 25, the pixel electrode 62p is electrically connected to one terminal of the pixel switching element 31 so as to apply a potential to the liquid crystal layer 203.

As shown in FIG. 23, the touch electrode 62tg is provided so as to correspond to each of the red filter layer 21R and the green filter layer 21G constituting the color filter layer 21. That is, the touch electrode 62tg is formed so as to correspond to each of the two sub-pixels from among the three sub-pixels constituting the pixel P. As shown in FIG. 23, each of the two touch electrodes 62tg faces the one touch electrode 25g provided on the opposite substrate 202 through the liquid crystal layer 203. As shown in FIG. 24, each of the touch electrodes 62tg is provided above the gate line GL. As shown in FIG. 25, the touch electrode 62tg is electrically connected to the source of the pixel switching element 31.

In the TFT array substrate 201, the pixel switching element 31 and the storage capacitive element CS shown in FIG. 25 are not shown in FIG. 23, but they are formed on the side of the TFT array substrate 201 facing the opposite substrate 202. Each of the pixel switching element 31 and the storage capacitive element CS is covered with the inter-layer insulating film Sz.

As shown in FIG. 25, the pixel switching element 31 is a transistor, and is, for example, a TFT using polysilicon. As shown in FIG. 25, the pixel switching element 31 which is a TFT has a gate electrically connected to the gate line GL. The drain of the pixel switching element 31 is electrically connected to the signal line SL. The source of the pixel switching element 31 is connected to the pixel electrode 62p and the touch electrode 62tg.

As shown in FIG. 25, the storage capacitive element CS has one electrode electrically connected to the source of the pixel switching element 31. As shown in FIG. 25, the other electrode of the storage capacitive element CS is electrically connected to a storage capacitor line CSL.

In the TFT array substrate 201, the gate line GL and the signal line SL shown in FIGS. 24 and 25 are not shown in FIG. 23, but they are provided on the side of the TFT array substrate 201 facing the opposite substrate 202. Each of the gate line GL and the signal line SL is covered with the inter-layer insulating film Sz.

As shown in FIGS. 24 and 25, the gate line GL is provided so as to extend in the x direction of the xy plane. As shown in FIG. 25, the gate line GL is electrically connected to the gate of the pixel switching element 31. In addition, the gate line GL is electrically connected to the vertical drive circuit 11 shown in FIG. 2, and supplies the scanning signal Vgate from the vertical drive circuit 11 to the gate of the pixel switching element 31.

As shown in FIGS. 24 and 25, the signal line SL is provided so as to extend in the y direction on the xy plane. As shown in FIG. 25, the signal line SL is electrically connected to the drain of the pixel switching element 31. In addition, as shown in FIG. 25, the signal line SL is electrically connected to the horizontal drive circuit 12.

In this embodiment, as shown in FIG. 25, the horizontal drive circuit 12 includes a writing circuit WC and a reading circuit RC. As shown in FIG. 25, the signal line SL includes a first signal line SL1 connected to both the writing circuit WC and the reading circuit RC, and a second signal line SL2 connected only to the writing circuit WC.

A switch SWw1 intervenes between the first signal line SL1 and the writing circuit WC, and when the switch SWw1 is brought into the ON state, the first signal line SL1 is electrically connected to the writing circuit WC. A switch SWr intervenes between the first signal line SL1 and the reading circuit RC, and when the switch SWr is brought into the ON state, the first signal line SL1 is electrically connected to the reading circuit RC. The first signal line SL1 is provided, for example, so as to be connected to the sub-pixel corresponding to the red filter layer 21R of the color filter layer 21.

The second signal line SL2 is electrically connected to the writing circuit WC through a switch SWw2 intervening therebetween. However, unlike the first signal line SL1, the second signal line SL2 is not electrically connected to the reading circuit RC. The second signal line SL2 is provided, for example, so as to be connected to the sub-pixel corresponding to the green filter layer 21G of the color filter layer 21.

Though not shown, in the pixel P, a third signal line (not shown) is provided so as to be connected to the sub-pixel corresponding to the blue filter layer 21B of the color filter layer 21. Similarly to the second signal line SL2, the third signal line is electrically connected to the writing circuit WC through a switch interposed therebetween.

In addition, in the TFT array substrate 201, as shown in FIG. 23, a liquid crystal orientation film HM1g is provided on the pixel electrode 62p. The liquid crystal orientation film HM1g is made of polyimide.

In this embodiment, the liquid crystal orientation film HM1g is formed such that the surface of the touch electrode 62tg is exposed.

Although details will be described below, as shown in FIGS. 23 and 24, in the inter-layer insulating film Sz, a concave groove TR is provided between a pair of adjacent touch electrodes 62tg. When the liquid crystal orientation film HM1g is formed on the pixel electrode 62p, since an application liquid enters the groove TR, the top face of the touch electrode 62tg around the groove TR is not covered with the application film. For this reason, as shown in FIG. 23, the liquid crystal orientation film HM1g is formed such that, while the pixel electrode 62p is covered with the liquid crystal orientation film HM1g, the surface of the touch electrode 62tg is exposed.

(B) Opposite Substrate 202

The respective parts provided in the opposite substrate 202 will be described in detail.

In the opposite substrate 202, as shown in FIG. 23, the color filter layer 21 is formed on the side of the opposite substrate 202 facing the TFT array substrate 201. The color filter layer 21 includes three primary color filters of the red filter layer 21R, the green filter layer 21G, and the blue filter layer 21B which form one set, and is provided for each pixel P, and each color is formed to be arranged in the x direction. The color filter layer 21 is formed by using, for example, polyimide resin containing a coloring agent, such as a pigment or a dye. In the color filter layer 21, white light irradiated from the backlight 300 is colored and emitted.

In the opposite substrate 202, as shown in FIG. 23, the common electrode 23 is formed on the side of the opposite substrate 202 facing the TFT array substrate 201. The common electrode 23 is formed so as to cover the color filter layer 21. The common electrode 23 is a so-called transparent electrode, and is formed by using, for example, ITO. As shown in FIG. 25, the common electrode 23 is electrically connected to a Vcom line CL, and a common potential is applied to the common electrode 23. That is, the common electrode 23 faces each of the plural pixel electrodes 62p formed so as to correspond to the plural pixels P in the display area PA, and functions as the electrode common to the respective pixels P.

As shown in FIG. 23 and FIG. 24, a liquid crystal orientation film HM2g is provided on the common electrode 23. The liquid crystal orientation film HM2g is provided so as to cover the entire surface of the common electrode 23. For example, the liquid crystal orientation film HM2g is formed by forming a film of polyimide by a spin coat method. Polyimide is not formed on the surface of the convex part CO, and the surface of the touch electrode 25g is exposed.

In the opposite substrate 202, as shown in FIG. 23, the touch electrode 25g is formed on the side of the opposite substrate 202 facing the TFT array substrate 201. As shown in FIG. 25, the touch electrode 25g comes into contact with the two adjacent touch electrodes 62tg on the TFT array substrate 201 so as to electrically connect the two touch electrodes 62tg to each other. That is, when the liquid crystal panel 200g is deformed by an external pressure, the touch electrode 25g comes into contact with the two touch electrodes 62tg facing the touch electrode 25g so as to electrically connect the two touch electrodes 62tg to each other.

In this embodiment, as shown in FIG. 23, the touch electrode 25g is provided on the convex part CO.

As shown in FIG. 23, the convex part CO is provided so as to protrude convexly in a direction toward the TFT array substrate 201 on the side of the opposite substrate 202 facing the TFT array substrate 201. As shown in FIG. 23, the convex part CO is formed so as to have a height lower than the column spacer SP to keep the cell gap.

As shown in FIG. 23, the convex part CO is formed so as to have a forward tapered shape. That is, the convex part CO is formed such that the width thereof in the x direction decreases in a direction from the opposite substrate 202 toward the TFT array substrate 201. The convex part CO is an elastic body, and is formed by using, for example, acrylic resin or novolac resin.

The convex part CO is formed such that a flat area HR along the xy plane is provided at the top face facing the TFT array substrate 201.

The touch electrode 25g is formed as an independent pattern on the flat area HR while not being formed in an area other than the flat area HR on the convex part CO.

(C) Liquid Crystal Layer 203

The liquid crystal layer 203 will be described.

As shown in FIG. 23, the liquid crystal layer 203 is sandwiched between the TFT array substrate 201 and the opposite substrate 202.

Liquid crystal molecules (not shown) of the liquid crystal layer 203 are oriented by the liquid crystal orientation film HM1g formed on the TFT array substrate 201 and the liquid crystal orientation film HM2g formed on the opposite substrate 202. For example, the liquid crystal layer 203 is formed such that the liquid crystal molecules are vertically oriented. That is, the liquid crystal layer 203 is formed such that the liquid crystal display mode is a VA (Vertical Align) mode. In addition, the liquid crystal layer 203 may be formed so as to correspond to a TN (Twisted Nematic) mode or an ECB (Electrically Controlled Birefringence) mode.

(Operation)

Hereinafter, in the liquid crystal display device 100, an operation to detect a position where a detection target object, such as a finger of a user or the like, comes into contact with the display area PA of the liquid crystal panel 200g will be described.

At the time of detection of a contact position, precharge is performed.

The control section 401 controls the respective parts so as to execute the following precharge.

Specifically, as shown in FIG. 25, a voltage (xVcom) having a polarity opposite to a voltage (Vcom) applied to the Vcom line CL is applied in advance to the first signal line SL1 through the switch SWw1. A voltage (Vcom) having the same polarity as the voltage (Vcom) applied to the Vcom line CL is applied in advance to the second signal line SL2 through the switch SWw2. Thereafter, the switch SWw1 on the side of the first signal line SL1 is brought into OFF state, such that the first signal line SL1 is electrically put into a floating state.

Next, a contact position where the detection target object comes into contact with the liquid crystal panel 200g is detected.

The control section 401 controls the respective parts so as to execute the following contact position detection operation.

Specifically, after the precharge is executed, a signal is supplied so as to change a gate voltage of the gate line GL to an activation level (in this example, high level), such that the pixel switching elements 31 respectively connected to the two touch electrodes 62tg are brought into the ON state. Then, the switch SWr connected to the first signal line SL1 is brought in the ON state, and a sensor signal is output from the first signal line SL1 to the reading circuit RC. The reading circuit RC detects the contact position on the basis of the sensor signal.

For example, when the detection target object comes into contact with the liquid crystal panel 200g, and the touch electrode 25g comes into contact with the two touch electrodes 62tg, as will be understood from the FIG. 25, the touch sensor switch SWsg is brought in the ON state. In this case, the two touch electrodes 62tg are electrically connected to each other and short-circuited. For this reason, between the first signal line SL1 and the second signal line SL2 precharged as described above, a current flows from the second signal line SL2 to the first signal line SL1 through the touch sensor switch SWsg. Therefore, the potential of the first signal line SL1 in the floating state changes.

When no external pressure is not applied to the liquid crystal panel 200g, the touch electrode 25g is not brought into contact with the two touch electrodes 62tg, and the touch sensor switch SWsg is in the OFF state, as shown in FIG. 25, unlike the above description, the two touch electrodes 62tg are not electrically short-circuited. For this reason, no current flows between the first signal line SL1 and the second signal line SL2, so the potential of the first signal line SL1 in the floating state does not change.

As described above, the potential of the first signal line SL1 differs depending on presence/absence of contact of the detection target object. For this reason, the position detection section 402 detects, on the basis of the position of the first signal line SL1, the contact position where the detection target object comes into contact with the liquid crystal panel 200g.

In the liquid crystal display device 100, in addition to the position detection operation, an image display operation is performed. The position detection operation and the image display operation are alternately and repeatedly executed.

At the time of image display, the scanning signal is supplied from the gate line GL to the gate of the pixel switching element 31 so as to control the switching operation of the pixel switching element 31. Then, the video signal is written from the writing circuit WC to the pixel electrode 62p through write switches SWw1 and SWw2, the signal line SL, and the pixel switching element 31 in that order, thereby executing image display.

FIGS. 26A and 26B are sectional views showing a case where the detection target object F comes into contact with the display area PA of the liquid crystal panel 200g in the liquid crystal display device according to Embodiment 7 of the invention. FIGS. 26A and 26B show a main part and the illustration of some members is omitted.

When the detection target object comes into contact with the side of the opposite substrate 202 opposite to the liquid crystal layer 203 and the opposite substrate 202 is pressed, as shown in FIGS. 26A and 26B, the opposite substrate 202 is deformed and moved toward the TFT array substrate 201. At this time, with the deformation of the opposite substrate 202, the touch electrode 25g provided on the side of the opposite substrate 202 facing the liquid crystal layer 203 is moved toward the TFT array substrate 201. Then, the touch electrode 25g comes into contact with the two touch electrodes 62tg provided on the TFT array substrate 201. In this way, the touch electrode 25g provided on the opposite substrate 202 comes into contact with the touch electrodes 62tg provided on the TFT array substrate 201, so the touch sensor switch SWsg is brought into the ON state.

That is, when a touch operation is made on the liquid crystal panel 200g with a pressing force equal to or larger than an operation start pressure, a sensor gap is reduced, the touch electrodes 25g and 62t on both substrates 201 and 202 come into contact with each other, and the touch sensor switch SWsg is brought into the ON state.

As shown in FIG. 26B, when the upper touch electrode 25g comes into contact with the two lower touch electrodes 62tg, the convex part CO is deformed by the pressure. For this reason, when the touch electrode 25g is provided other than the flat area HR on the convex part CO, the touch electrode 25g may be disconnected due to the deformation of the convex part CO.

In this embodiment, however, as shown in FIGS. 26A and 26B, the touch electrode 25g is formed as an independent pattern on the flat area HR while not being formed in an area other than the flat area HR on the convex part CO.

For this reason, in this embodiment, the touch electrode 25g formed on the convex part CO can be prevented from being disconnected.

(Manufacturing Method)

Hereinafter, a method of forming the liquid crystal orientation film HM1g which is a main part of the liquid crystal display device will be described.

Figure 27A:
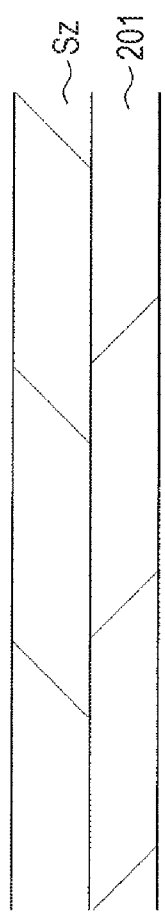
FIGS. 27A to 27C are sectional views showing a process of forming a liquid crystal orientation film in the liquid crystal display device according to Embodiment 7 of the invention.
Figure 27B:
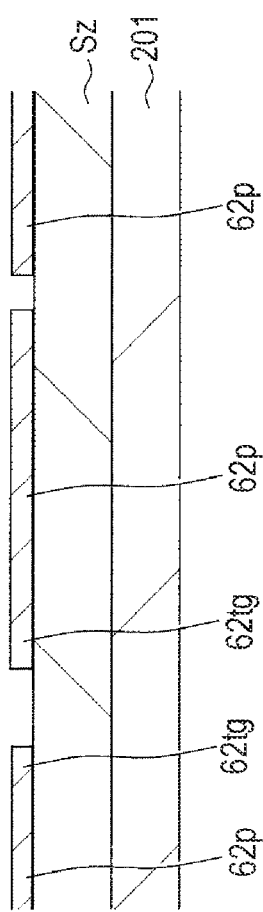
Figure 27C:
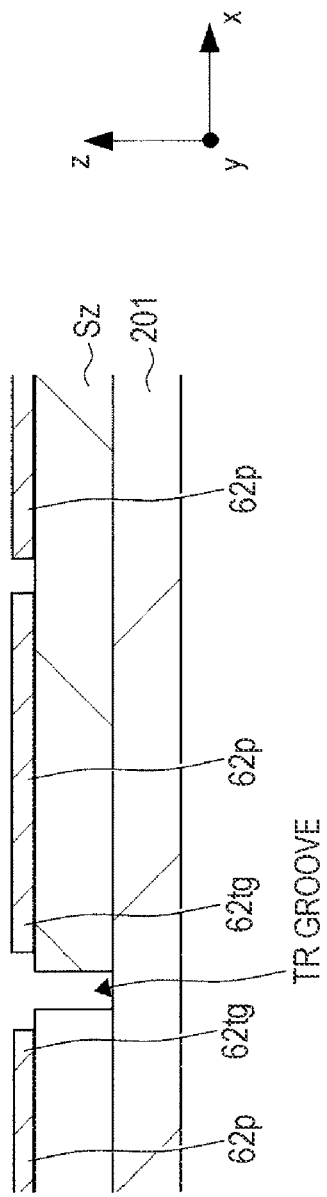

FIGS. 27A to 27C are sectional views showing a process of forming the liquid crystal orientation film HM1g in the liquid crystal display device 100 according to Embodiment 7 of the invention. FIGS. 27A to 27C show a main part and the illustration of some members is omitted.

First, as shown in FIG. 27A, the inter-layer insulating film Sz is formed.

The inter-layer insulating film Sz is formed by applying photosensitive resin (not shown). For example, after positive sensitive acryl resin is applied, a pre-bake process is executed so as to form the inter-layer insulating film Sz.

Next, as shown in FIG. 27B, the pixel electrode 62p and the touch electrodes 62tg are formed.

The pixel electrode 62p and the touch electrodes 62tg are formed by forming a transparent conductive film on the surface of the inter-layer insulating film Sz and patterning. For example, an ITO film is formed by a sputtering method and then patterned by a photolithography technique so as to form the pixel electrode 62p and the touch electrodes 62tg.

Next, as shown in FIG. 27C, the groove TR is formed in the inter-layer insulating film Sz.

The inter-layer insulating film Sz made of photosensitive resin is patterned by a photolithography technique so as to form the groove TR.

Specifically, an exposure process is executed by a photo mask on which a mask pattern is formed. In this exposure process, exposure light is irradiated to a portion where the groove is to be formed.

After the exposure process is executed, a development process is executed. Thereafter, a back process is performed so as to volatilize a remaining solvent in the inter-layer insulating film Sz or a low-molecular-weight non-polymerized component. By doing so, as shown in FIG. 27C, the groove TR is formed in the inter-layer insulating film Sz.

Next, as shown in FIG. 23, the liquid crystal orientation film HM1g is formed.

The liquid crystal orientation film HM1g is formed by applying an application liquid containing a material for an orientation film onto the pixel electrode 62p and the touch electrodes 62tg. For example, an application liquid in which polyimide is dissolved as a material for an orientation film is applied by a spin coat method. Then, a pre-bake process is executed so as to volatilize a solvent in an application film, and a back process is executed so as to remove a remaining solvent.

As shown in FIG. 23, since the groove TR is provided between a pair of touch electrodes 62*tg*, when the application liquid containing the material for an orientation film is applied, the application liquid enters the groove TR, and is not formed such that the top face of the touch electrode 62*tg* around the groove TR is covered with the application film. That is, since the application liquid enters the groove TR by the effect of surface tension or gravity, no application film is formed on the top face of the touch electrode 62*tg* around the groove TR. For this reason, as shown in FIG. 23, the liquid crystal orientation film HM1*g* is formed such that, while the pixel electrode 62*p* is covered with the liquid crystal orientation film HM1*g*, the surface of the touch electrode 62*tg* is exposed.

After the liquid crystal orientation film HM1*g* is formed in the above-described manner, an alignment process is executed. For example, the alignment process is executed by a rubbing process. In addition, an alignment process, such as a photo-alignment process, an ion beam alignment process, or a grating alignment process, may be executed. For example, when the liquid crystal orientation film HM1*g* induces vertical alignment and the liquid crystal panel 200*g* is brought into the VA (Vertical Align) mode, it is not necessary to separately perform the alignment process.

Then, as shown in FIG. 23, the opposite substrate 202 on which the respective parts are formed and the TFT array substrate 201 are bonded to each other. Thereafter, a liquid crystal material is injected between the TFT array substrate 201 and the opposite substrate 202 to provide the liquid crystal layer 203. Thus, the liquid crystal panel 200*g* is completed.

(Conclusion)

As described above, in this embodiment, the liquid crystal panel 200*g* is deformed by the external pressure such that the touch electrode 25*g* comes into contact with a pair of touch electrodes 62*tg* so as to electrically connect the pair of touch electrodes 62*tg* to each other. The touch electrodes 62*tg* of the TFT array substrate 201 are provided on the TFT array substrate 201 with the inter-layer insulating film (under layer) Sz having the concave groove TR intervening therebetween. The liquid crystal orientation film HM1*g* is formed such that, when the application liquid containing the orientation material is applied onto the surface on which the touch electrodes 62*tg* are formed, the application liquid enters the concave groove TR, and the top face of the touch electrode 62*tg* is not covered therewith. Specifically, the inter-layer insulating film (under layer) Sz is provided such that the groove TR is located between the pair of touch electrodes 62*tg*, and the pair of touch electrodes 62*tg* are formed such that the surfaces thereof around the groove TR are not covered with the liquid crystal orientation film HM1*g*.

For this reason, in this embodiment, the surface of the touch electrode 62*tg* can be exposed without separately executing a process of removing the liquid crystal orientation film HM1*g* from the surface of the touch electrode 62*tg*. Therefore, in this embodiment, manufacturing efficiency and yield can be improved, and an increase in manufacturing costs can be suppressed. Further, the reliability of the device can be improved.

In this embodiment, in the opposite substrate 202, the convex part CO is formed on the xy plane facing the TFT array substrate 201. The flat area HR is formed at the top face of the convex part CO facing the TFT array substrate 201. The touch electrode 25*g* constituting the touch sensor switch SWsg is formed as an independent pattern on the flat area HR while not being formed in an area other than the flat area HR on the convex part CO. Therefore, as described above, the touch electrode 25*g* can be prevented from being disconnected even when being repeatedly used, so the reliability of the device can be improved.

In this embodiment, when the liquid crystal panel 200*g* is deformed by the external pressure, the touch sensor switch SWsg is configured such that the single touch electrode 25*g* comes into contact with the two touch electrodes 62*tg* so as to electrically connect the two touch electrodes 62*tg* to each other.

That is, the touch sensor switch SWsg of this embodiment is a two-point contact type, not a one-point contact type. In the case of a one-point contact type, when a conductive foreign substance exists at the one-point contact position and short-circuit constantly occurs, position detection becomes difficult. However, since the touch sensor switch SWsg is a two-point contact type, even when short-circuit occurs between the one upper touch electrode 25*g* and one of the two lower touch electrodes 62*tg*, if no external pressure is applied, the two lower touch electrodes 62*tg* can be maintained in the open state.

Therefore, in this embodiment, position detection can be accurately executed.

In this embodiment, it is preferable that the convex part CO has a tapered shape to have a tapered angle θ equal to or smaller than 70°. When the tapered angle exceeds 70°, the displacement of the convex part CO increases, and the touch electrode 25*g* may be disconnected.

FIG. 28 is a view showing a relation between the tapered angle θ of the convex part and the displacement x (m) in Embodiment 7 of the invention. A simulation result with respect to the displacement of the convex part CO using ANSYS, which is an FEM structure analysis simulator is shown. In this simulation, as the center condition of the convex part CO, the Young's modulus is 3.5 GPa, and the Poission's ratio is 0.38. The size of the bottom face of the convex part CO is 35 μm×15 μm, and the height of the convex part CO is 2.5 μm. The simulation result when the displacement refers to a distance of deformation of the upper end of the convex part is shown. In FIG. 28, "pressure" represents a pressure to be applied at the time of the simulation.

FIGS. 29A and 29B are sectional views showing a case where the convex part CO is deformed depending on the tapered angle θ in Embodiment 7 of the invention.

As a result of the simulation as described above, as shown in FIG. 28, when the tapered angle θ is 68°, the displacementx (m) is minimized. When the tapered angle θ is in the range of 78° to 90°, the displacementx(m) increases. As the tapered angle θ of the convex part CO decreases from 90° to 45°, the side face of the convex part which is deformed in the transverse direction is changed to a state where the top face is depressed.

Specifically, as shown in FIG. 29A, when the convex part has no tapered shape (tapered angle θ=90°), the side face of the convex part is deformed in the transverse direction. The bottom part of the convex part CO has small deformation, but the top face of the convex part CO is deformed so as to be expanded outwardly and the deformation increases. When the convex part has no tapered shape, tensile stress is applied such that the touch electrode 25*g* formed at the top face of the convex part CO is expanded in the transverse direction, so the touch electrode 25*g* may be damaged.

As shown in FIG. 29B, when the convex part has a tapered shape, the side face of the convex part is hardly to be deformed by the external pressure, and the convex part can be deformed such that the top face thereof is depressed. In particular, if the tapered angle θ of the convex part CO is equal to or smaller than 70°, the convex part can be depressed such that the top face thereof can be easily deformed, and as shown in FIG. 28, the displacement of the convex part CO can be controlled. For this reason, little tensile stress is applied to expand the touch electrode 25g formed at the top face of the convex part CO in the transverse direction, so the touch electrode 25g can be effectively prevented from being damaged.

As shown in FIG. 29B, it is preferable that the touch electrode 25g is formed in an area away from a tapered area TP inwardly by a distance equal to or larger than a width L1 of the tapered area TP of the convex part CO. That is, it is preferable that a distance L2 between the end of the touch electrode 25g and an inflection point when the top face of the convex part CO is inflexed to the side face inclined in a tapered shape is equal to or larger than the width L1 between the inflexion point and the point of the end where the side face of the convex part is located near the opposite substrate 202. In this manner, as shown in FIG. 29B, in this area, the top face of the convex part CO is depressed by the external pressure. For this reason, stress is hardly to concentrate on the touch electrode 25g formed in this area, so the touch electrode 25g can be prevented from being damaged.

In addition, it is preferable that the convex part CO is formed such that the Young's modulus is in a range of 1 to 5 GPa, and the Poission's ratio is in a range of 0.36 to 0.40.

When the Poission's ratio is set to 0.38 as the center condition of the convex part CO, and similarly to the above description, a simulation is executed, the displacement has no change in the above-described range of the Poission's ratio. When the Young's modulus is set to 3.5 GPa as the center condition of the convex part CO, and similarly to the above description, a simulation is executed, the displacement has no change in the above-described range of the Poission's ratio. Therefore, the above-described range is preferable.

MODIFIED EXAMPLE

Although in the above description, as shown in FIGS. 23 and 24, a case where in the TFT array substrate 201, the pixel electrode 62p and the touch electrodes 62tg are formed integrally of a single film has been described, the invention is not limited thereto. That is, although a case where the pixel electrode 62p and the touch electrodes 62tg are formed so as to be physically and electrically connected to each other has been described, the pixel electrode 62p and the touch electrodes 62tg may be formed so as to be physically separated from each other.

Modified Example 1

Figure 30A:
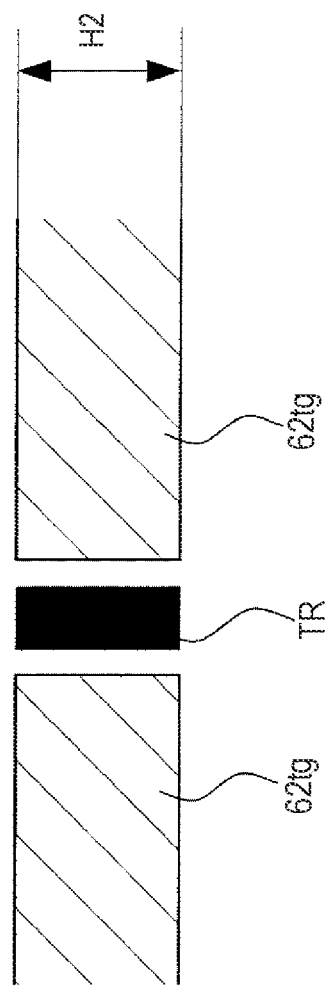
FIGS. 30A and 30B are views showing touch electrodes formed on a TFT array substrate and a touch electrode formed on an opposite substrate in a modified example of Embodiment 7 of the invention.
Figure 30B:
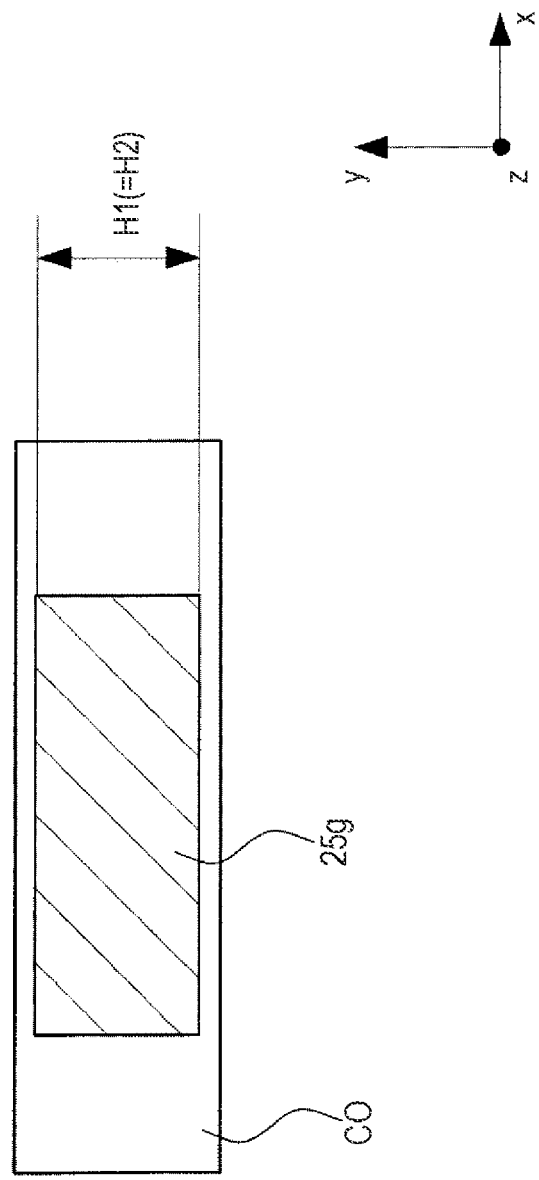

FIGS. 30A and 30B are views showing touch electrodes 62tg formed on a TFT array substrate 201 and a touch electrode 25g formed on an opposite substrate 202 as a modified example of Embodiment 7 of the invention. FIG. 30A is a plan view showing on a magnified scale a portion of the TFT array substrate 201 where the touch electrodes 62tg are formed. FIG. 30B is a plan view showing on a magnified scale a portion of the opposite substrate 202 where the touch electrode 25g is formed.

As shown in FIG. 30A, the touch electrodes 62tg of the TFT array substrate 201 may be formed so as to be physically separated from the pixel electrode 62p (not shown in FIG. 30A). As shown in FIGS. 30A and 30B, each of the touch electrodes 62tg of the TFT array substrate 201 and the touch electrode 25g formed on the opposite substrate 202 are formed such that the widths H1 and H2 thereof in the y direction become equal to each other.

In this modified example, as shown in FIG. 30A, similarly to Embodiment 7, a pair of touch electrodes 62tg are formed so as to be arranged in the x direction on the TFT array substrate 201 with a groove TR intervening therebetween.

For this reason, similarly to the case shown in FIG. 23, since the groove TR is provided between a pair of touch electrodes 62tg, when the application liquid containing the material for an orientation film is applied, the application liquid enters the groove TR. Therefore, similarly to the foregoing embodiment, the liquid crystal orientation film HM1g is formed such that the surface of the touch electrode 62tg around the groove TR is exposed.

Therefore, in this modified example, the same advantages as the above-described embodiment can be obtained.

Modified Example 2

FIG. 31 is a view showing touch electrodes 62tg formed on a TFT array substrate 201 in a modified example of Embodiment 7 of the invention. FIG. 31 shows on a magnified scale a planar portion of the TFT array substrate 201 where the touch electrodes 62tg are formed.

As shown in FIG. 31, the structure of the groove TR is not limited to the foregoing embodiment.

For example, as shown in FIG. 31, a groove TR1 may be formed between a pair of touch electrodes 62tg arranged in the x direction on the surface (xy plane) of the TFT array substrate 201, and grooves TR2 and TR3 may be formed separately at different positions. As shown in FIG. 31, the grooves TR2 and TR3 may be formed such that a pair of touch electrodes 62tg extending in the x direction are sandwiched in the y direction between a pair of groove TR2 and TR3 linearly extending linearly in the x direction on the surface (xy plane) of the TFT array substrate 201.

In this case, since a portion of the side extending in the x direction for dividing a pair of touch electrodes 62tg is located around a pair of grooves TR2 and TR3 extending linearly in the x direction, when the application liquid containing the material for an orientation film is applied, the application liquid enters the grooves TR2 and TR3. Therefore, the liquid crystal orientation film HM1g is formed such that the surface of the touch electrode 62tg around the grooves TR2 and TR3 extending in the x direction is exposed.

Therefore, in this modified example, the same advantages as this embodiment described above can be obtained.

Modified Example 3

Figure 32:
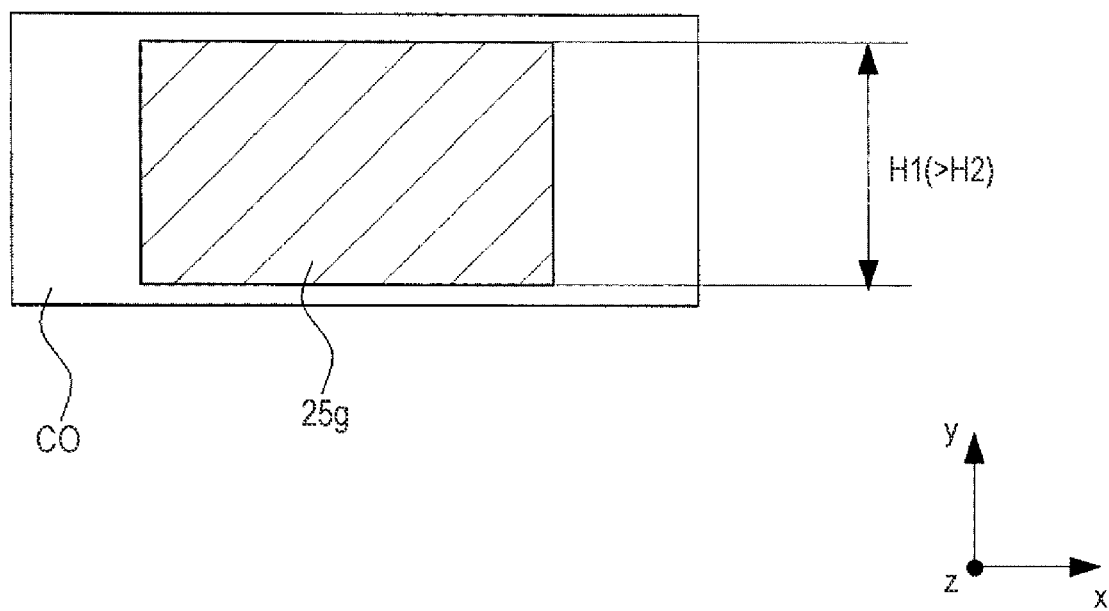
FIG. 32 is a view showing a touch electrode formed on an opposite substrate in a modified example of Embodiment 7 of the invention.

FIG. 32 is a view showing a touch electrode 25g formed on an opposite substrate 202 as a modified example of Embodiment 7 of the invention. FIG. 32 shows on a magnified scale a planar portion of the opposite substrate 202 where the touch electrode 25g is formed.

As shown in FIG. 32, the touch electrode 25g of the opposite substrate 202 and each of the touch electrodes 62tg of the TFT array substrate 201 may be formed such that the widths H1 and H2 thereof in the y direction are not equal to each other. It is preferable that the touch electrode 25g of the opposite substrate 202 is formed such that the width H1 thereof in the y direction is larger than the width H2 of each of the touch electrodes 62tg of the TFT array substrate 201.

FIGS. 33A to 33C are views illustrating the advantages of modified example 3 of Embodiment 7 of the invention. FIG. 33A is a side view showing a case the touch electrode 25g formed on the opposite substrate 202 and each of the touch electrodes 62tg of the TFT array substrate 201 come into contact with each other. FIG. 33B is a plan view showing a case where, in modified example 1, the touch electrode 25*g* formed on the opposite substrate 202 and each of the touch electrodes 62*tg* of the TFT array substrate 201 come into contact with each other, and the touch electrode 25*g* is damaged. FIG. 33C is a plan view showing a case where, in modified example 3, the touch electrode 25*g* formed on the opposite substrate 202 and each of the touch electrodes 62*tg* of the TFT array substrate 201 come into contact with each other, and the touch electrode 25*g* is damaged.

As shown in FIG. 33A, when the touch electrode 25*g* of the opposite substrate 202 and each of the touch electrodes 62*tg* of the TFT array substrate 201 come into contact with each other, the touch electrode 25*g* of the opposite substrate 202 may be deformed. For this reason, as shown in FIGS. 33B and 33C, the touch electrode 25*g* of the opposite substrate 202 may be cracked at a portion with which the end of each of the touch electrodes 62*tg* of the TFT array substrate 201 comes into contact.

In the case of modified example 1, the touch electrodes 25*g* and 62*t* of the opposite substrate 202 and the TFT array substrate 201 have the same widths H1 and H2. For this reason, as shown in FIG. 33B, the touch electrode 25*g* of the opposite substrate 202 may be cracked over the entire width in the y direction. Therefore, a portion of the touch electrode 25*g* of the opposite substrate 202 with which each of the touch electrodes 62*tg* of the TFT array substrate 201 comes into contact may be disconnected, and the reliability as a touch sensor may be deteriorated.

In contrast, in the case of modified example 3, as described above, the width H1 of the touch electrode 25*g* of the opposite substrate 202 is larger than the width H2 of each of the touch electrodes 62*tg* of the TFT array substrate 201. In this case, the touch electrode 25*g* of the opposite substrate 202 comes into contact with the touch electrodes 62*tg* of the TFT array substrate 201, as shown in FIG. 33C, a contact portion located at the center in the y direction may be cracked. However, since each of the touch electrodes 62*tg* of the TFT array substrate 201 is not in contact with an end other the contact portion located at the center in the y direction, no crack occurs. For this reason, even when the touch electrodes 25*g* of the opposite substrate 202 may cracked, in a state where the touch electrode 25*g* of the opposite substrate 202 and the touch electrodes 62*tg* of the TFT array substrate 201 come into contact with each other, the touch electrodes 62*tg* are in the conduction state and can be prevented from being disconnected. That is, in an area other than the portion where the touch electrode 25*g* of the opposite substrate 202 comes into contact with a pair of touch electrodes 62*tg* of the TFT array substrate 201, the touch electrode 25*g* is provided so as to electrically connect the pair of touch electrodes 62*tg*, so the reliability can be improved.

Modified Examples 4 to 6

Figures 35A, 35B:
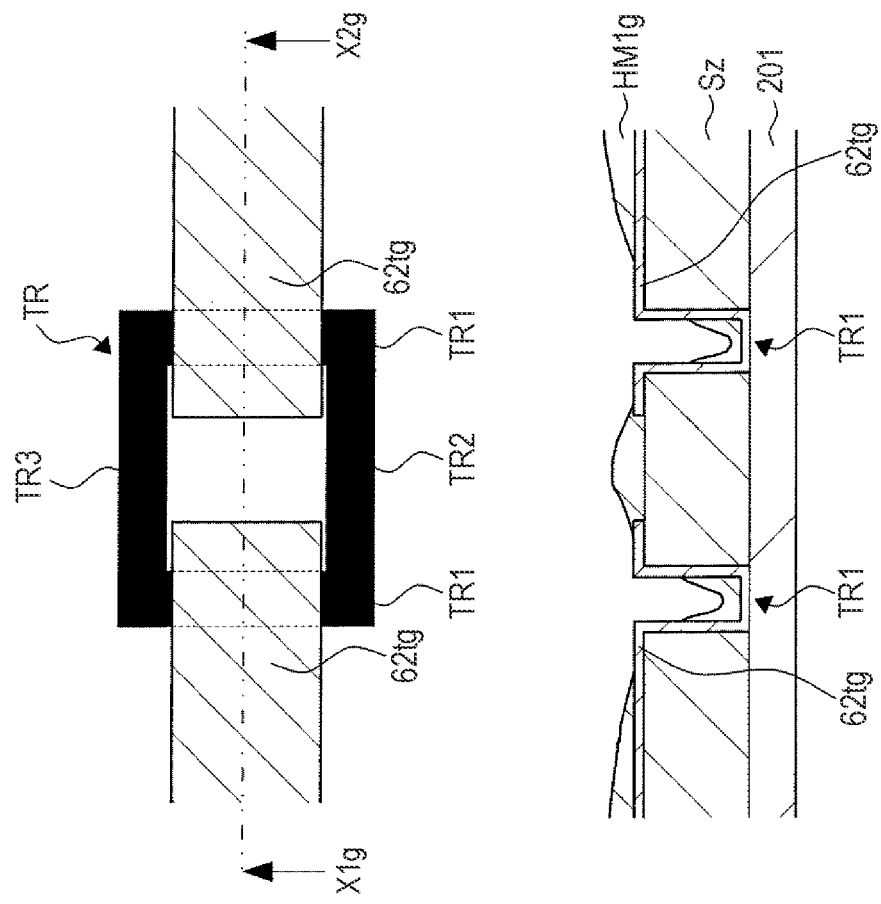
FIGS. 35A and 35B are views showing touch electrodes formed on a TFT array substrate in a modified example of Embodiment 7 of the invention.
Figures 36A, 36B:
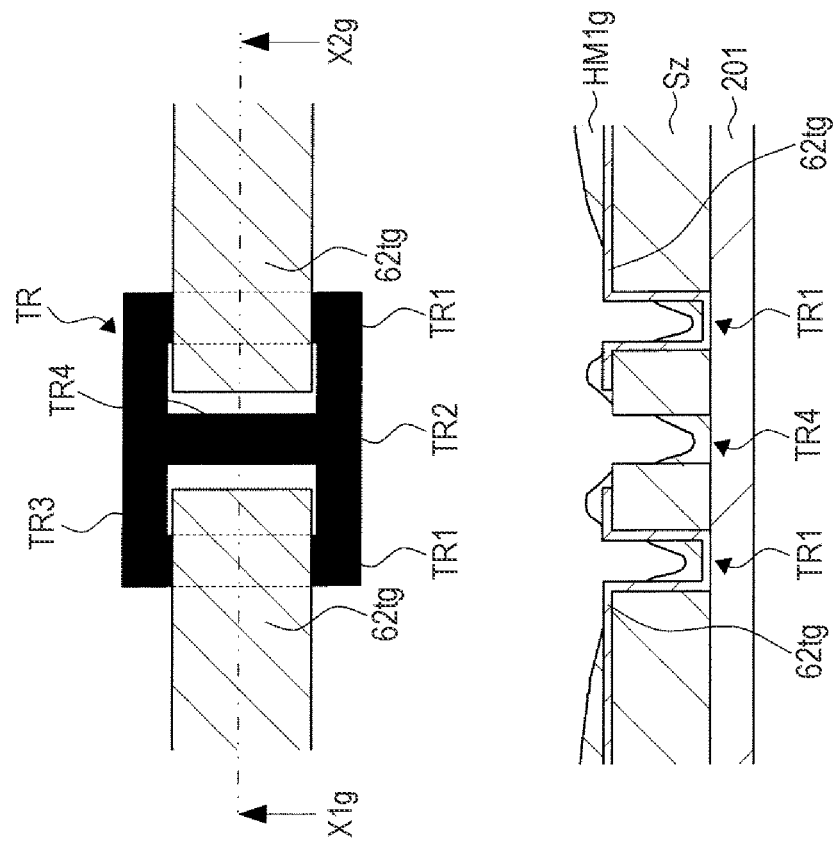
FIGS. 36A and 36B are views showing touch electrodes formed on a TFT array substrate in a modified example of Embodiment 7 of the invention.

FIGS. 34A to 36B are views showing touch electrodes 62*tg* formed on a TFT array substrate 201 in modified examples of Embodiment 7 of the invention. FIGS. 34A and 34B show modified example 4, FIGS. 35A and 35B show modified example 5, and FIGS. 36A and 36B show modified example 6. Of these, FIGS. 34A, 35A, and 36A are plan views showing on a magnified scale a portion of the TFT array substrate 201 where the touch electrodes 62*tg* are formed. FIGS. 34B, 35B, and 36B are sectional views showing on a magnified scale a portion of the TFT array substrate 201 where the touch electrodes 62*tg* are formed. FIGS. 34B, 35B, and 36B show the section of an X1*g*-X2*g* portion of FIGS. 34A, 35A, and 36A.

As shown in the respective drawings, each of the touch electrodes 62*tg* of the TFT array substrate 201 may be formed so as to cover the inner surface of the groove TR.

Specifically, as shown in FIG. 34A, as modified example 4, grooves TR1 extending in the y direction may be formed with respect to a pair of touch electrodes 62*tg* extending in the x direction on the surface (xy plane) of the TFT array substrate 201.

In this case, when the application liquid containing the material for an orientation film is applied, the application liquid enters the grooves TR1, and as shown in FIG. 34B, the liquid crystal orientation film HM1*g* is formed. The liquid crystal orientation film HM1*g* is formed such that the top face around the groove TR1 of the section of each of the touch electrodes 62*tg* along the x direction is exposed. For this reason, when the touch electrode 25*g* of the opposite substrate 202 comes into contact with the exposed surface of each of the touch electrodes 62*tg*, position detection is executed.

As modified example 5, as shown in FIG. 35A, grooves TR may be formed such that the touch electrodes 62*tg* are sandwiched in the y direction between a pair of grooves TR2 and TR3 extending linearly in the x direction on the surface (xy plane) of the TFT array substrate 201.

In this case, when the application liquid containing the material for an orientation film is applied, the application liquid enters the grooves TR1, and as shown in FIG. 35B, similarly to modified example 4, the liquid crystal orientation film HM1*g* is formed at the X1*g*-X2*g* portion. The liquid crystal orientation film HM1*g* is formed such that the top face located around the groove TR of the section of each of the touch electrodes 62*tg* along the x direction is exposed. For this reason, when the touch electrode 25*g* of the opposite substrate 202 comes into contact with the exposed surface of each of the touch electrodes 62*tg*, position detection is executed.

As modified example 6, as shown in FIG. 36A, a pair of grooves TR4 extending linearly in the x direction may be formed between the touch electrodes 62*tg* extending in the x direction on the surface (xy plane) of the TFT array substrate 201.

In this case, when the application liquid containing the material for an orientation film is applied, the application liquid enters the grooves TR1 and TR4, and as shown in FIG. 36B, the liquid crystal orientation film HM1*g* is formed at the X1*g*-X2*g* portion. The liquid crystal orientation film HM1*g* is formed such that the top face located around the grooves TR1 and TR4 of the section of each of the touch electrodes 62*tg* along the x direction is exposed. For this reason, when the touch electrode 25*g* of the opposite substrate 202 comes into contact with the exposed surface of each of the touch electrodes 62*tg*, position detection is executed.

Therefore, in the respective modified examples, the same advantages as this embodiment can be obtained.

In the case of modified examples 4 to 6, since the touch electrodes 62*tg* are provided so as to cover the inner surface of the grooves TR, when the surface of the liquid crystal panel 200*g* is pressed and deformed, the touch electrodes 62*tg* inside the grooves TR may be disconnected. For this reason, in terms of disconnection prevention, other examples may be suitably used.

Modified Example 7

FIGS. 37A and 37B are views showing touch electrodes 62*tg* formed on a TFT array substrate 201 in a modified example of Embodiment 7 of the invention. FIG. 37A is a plan view showing on a magnified scale a portion of the TFT array substrate 201 where the touch electrodes 62*tg* are formed. FIG. 37B is a sectional view showing on a magnified scale a portion of the TFT array substrate 201 where the touch electrodes 62*tg* are formed. FIG. 37B shows the section of an X1*g*-X2*g* portion of FIG. 37A.

As shown in FIG. 37A, each of the touch electrodes 62*tg* of the TFT array substrate 201 is not limited to a rectangular shape. Specifically, the each of the touch electrodes 62*tg* may include a portion 62*tx* extending in the x direction and portions 62*ty* extending in the y direction. In this case, the portion 62*tx* extending in the x direction is provided at the upper part, and plural portions 62*ty* extending in the y direction downward from the portion 62*tx* extending in the x direction are provided at intervals in the x direction. Grooves TRa are respectively provided to be arranged in the x direction between the plural portions 62*ty* extending in the y direction.

In this case, when the application liquid containing the material for an orientation film is applied, the application liquid enters the grooves TR and TRa, and as shown in FIG. 37B, the liquid crystal orientation film HM1*g* is formed at the X1*g*-X2*g* portion. For this reason, when the touch electrode 25*g* of the opposite substrate 202 comes into contact with the exposed surface of each of the touch electrodes 62*tg*, position detection is executed.

In this embodiment, the grooves TRa are respectively provided between the plural portions 62*ty* extending in the y direction, so the surface of the end of each of the portions 62*ty* is exposed while not being covered with the liquid crystal orientation film HM1*g*. For this reason, in the touch electrode 25*g* of the opposite substrate 202, even when a portion corresponding to the groove TR at the center is cracked, a pair of touch electrodes 62*tg* are electrically connected to each other at this portion 62*ty*. Therefore, the reliability of the device can be improved.

Therefore, in this modified example, the same advantages as this embodiment can be obtained.

Modified Example 8

Figure 38:
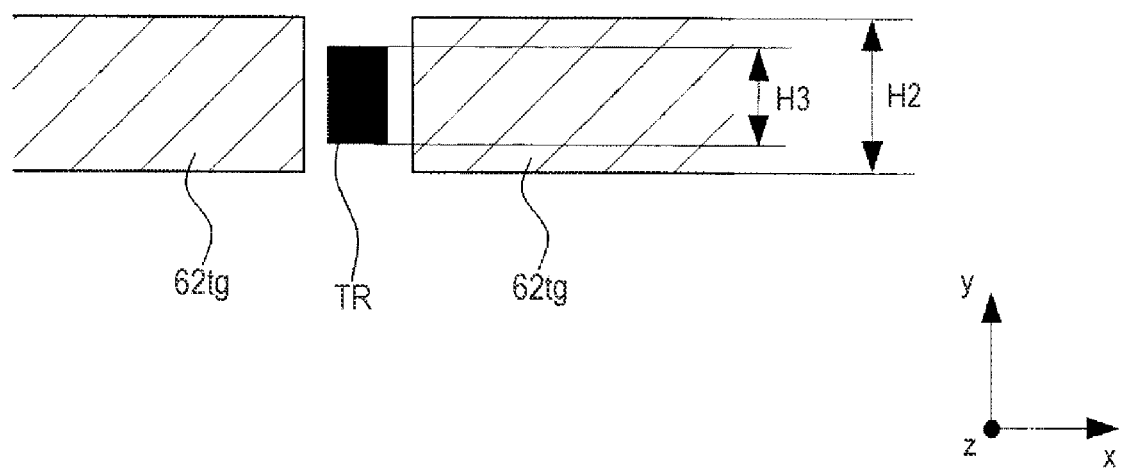
FIG. 38 is a view showing touch electrodes formed on a TFT array substrate in a modified example of Embodiment 7 of the invention.

FIG. 38 is a view showing touch electrodes 62*tg* formed on a TFT array substrate 201 in a modified example of Embodiment 7 of the invention. FIG. 38 shows on a magnified scale a planar portion of the TFT array substrate 201 where the touch electrodes 62*tg* are formed.

Although in modified example 1, as shown in FIGS. 30A and 30B, a case where the width of the groove TR in the y direction is equal to the width of each of the touch electrodes 62*tg* has been described, the invention is not limited. As shown in FIG. 38, the width of the groove TR in the y direction is smaller than the width of each of the touch electrodes 62*tg*.

In this case, the same advantages as this embodiment can also be obtained.

Modified Examples 9 to 13

FIGS. 39A to 43B are views showing touch electrodes 62*tg* formed on a TFT array substrate 201 in modified examples of Embodiment 7 of the invention. FIGS. 39A and 39B show modified example 9, FIGS. 40A and 40B show modified example 10, FIGS. 41A and 41B show modified example 11, FIGS. 42A and 42B show modified example 12, and FIGS. 43A and 43B show modified example 13. Of these, FIGS. 39A, 40A, 41A, 42A, and 43A are plan views showing on a magnitude scale a portion of the TFT array substrate 201 where the touch electrodes 62*tg* are formed. FIGS. 39B, 40B, 41B, 42B, and 43B are sectional views showing on a magnitude scale a portion of the TFT array substrate 201 where the touch electrodes 62*tg* are formed. FIGS. 39B, 40B, 41B, 42B, and 43B show the section of an Y1*g*-Y2*g* portion of FIGS. 39A, 40A, 41A, 42A, and 43A.

As shown in the respective drawings, only a groove TR extending linearly in the x direction may be formed with respect to each of the touch electrodes 62*tg* of the TFT array substrate 201. That is, in the inter-layer insulating film Sz serving as an under layer, the grooves TR may be provided so as to extend in the arrangement x direction of a pair of touch electrodes 62*tg*.

Specifically, as modified example 9, as shown in FIG. 39A, a pair of touch electrodes 62*tg* extending in the x direction may be sandwiched in the y direction between the grooves TR extending in the y direction on the surface (xy plane) of the TFT array substrate 201.

In this case, when the application liquid containing the material for an orientation film is applied, the application liquid enters the grooves TR, and as shown in FIG. 39B, the liquid crystal orientation film HM1*g* is formed. In this case, liquid crystal orientation film HM1*g* is formed such that the top face located around the groove TR of the section of each of the touch electrodes 62*tg* along the y direction is exposed. That is, the liquid crystal orientation film HM1*g* is formed such that the top faces at both ends of each of the touch electrodes 62*tg* in the y direction are exposed. For this reason, when the touch electrode 25*g* of the opposite substrate 202 comes into contact with the exposed surface of each of the touch electrodes 62*tg*, position detection is executed.

In this modified example, the top face located around groove TR is hardly to be covered with the liquid crystal orientation film HM1*g*, so the sensor characteristics can be suitably realized.

As modified example 10, as shown in FIG. 40A, a groove TR extending in the y direction may be provided below a pair of touch electrodes 62*tg* extending in the x direction on the surface (xy plane) of the TFT array substrate 201.

In this case, when the application liquid containing the material for an orientation film is applied, the application liquid enters the groove TR, and as shown in FIG. 40B, the liquid crystal orientation film HM1*g* is formed. In this case, the liquid crystal orientation film HM1*g* is formed such that the top face around the groove TR of the section of each of the touch electrodes 62*tg* along the y direction is exposed. That is, the liquid crystal orientation film HM1*g* is formed such that the top face at one end of each of the touch electrodes 62*tg* in the y direction is exposed. For this reason, when the touch electrode 25*g* of the opposite substrate 202 comes into contact with the exposed surface of each of the touch electrodes 62*tg*, position detection is executed.

In this modified example, the entire occupying area can be reduced, as compared with modified example 9.

As modified example 11, as shown in FIG. 41A, a pair of touch electrodes 62*tg* may be formed such that the touch electrodes 62*tg* have a concave shape in the y direction on the xy plane, and the concave parts face each other in the y direction. A groove TR may be provided so as to extend in the y direction inside the concave portions.

In this case, when the application liquid containing the material for an orientation film is applied, the application liquid enters the groove TR, and as shown in FIG. 41B, the liquid crystal orientation film HM1*g* is formed. In this case, the liquid crystal orientation film HM1*g* is formed such that the top face located around the groove TR of the section of each of the touch electrodes 62*tg* along the y direction is exposed. That is, the liquid crystal orientation film HM1*g* is formed such that the top face at each of the ends of the touch electrodes 62*tg* with the groove TR sandwiched therebetween is exposed. For this reason, when the touch electrode 25*g* of the opposite substrate 202 comes into contact with the exposed surface of each of the touch electrodes 62*tg*, position detection is executed.

In this modified example, the entire occupying area can be reduced, as compared with modified example 9 and modified example 10.

As modified example 12, as shown in FIG. 42A, each of touch electrodes 62*tg* may be formed such that a portion which protrudes convexly in the y direction is located at the center in the x direction on the xy plane. Then, a pair of touch electrodes 62*tg* may be provided such that the convex parts face each other in the y direction. The portions which protrude convexly may be sandwiched between a pair of grooves TR extending in the y direction.

In this case, when the application liquid containing the material for an orientation film is applied, the application liquid enters the grooves TR, and as shown in FIG. 42B, the liquid crystal orientation film HM1*g* is formed. In this case, the liquid crystal orientation film HM1*g* is formed such that the top face located around the grooves TR of the section of each of the touch electrodes 62*tg* along the y direction is exposed. That is, the liquid crystal orientation film HM1*g* is formed such that the top face of the end of each of the touch electrodes 62*tg* sandwiched between a pair of grooves TR is exposed. For this reason, when the touch electrode 25*g* of the opposite substrate 202 comes into contact with the exposed surface of each of the touch electrodes 62*tg*, position detection is executed.

In this modified example, the top face located around the grooves TR is hardly to be covered with the liquid crystal orientation film HM1*g*, as compared with modified example 11, and the sensor characteristics can be suitably realized.

As modified example 13, as shown in FIG. 43A, each of touch electrodes 62*tg* may be formed such that a portion which protrudes convexly in the y direction is located at the upper end in the x direction on the xy plane. A pair of touch electrodes 62*tg* may be provided such that the convex parts face each other in the y direction. A par of grooves TR which extend in the y direction may be arranged below the portions which protrude convexly.

In this case, when the application liquid containing the material for an orientation film is applied, the application liquid enters the grooves TR, and as shown in FIG. 43B, the liquid crystal orientation film HM1*g* is formed. In this case, the liquid crystal orientation film HM1*g* is formed such that the top face located around the groove TR of the section of each of the touch electrodes 62*tg* in the y direction is exposed. That is, the liquid crystal orientation film HM1*g* is formed such that the top surface of the end of each of the touch electrodes 62*tg* located near the groove TR is exposed. For this reason, when the touch electrode 25*g* of the opposite substrate 202 comes into contact with the exposed surface of each of the touch electrodes 62*tg*, position detection is executed.

In this modified example, the entire occupying area can be reduced, as compared with modified examples 9 to 12.

Figure 44:
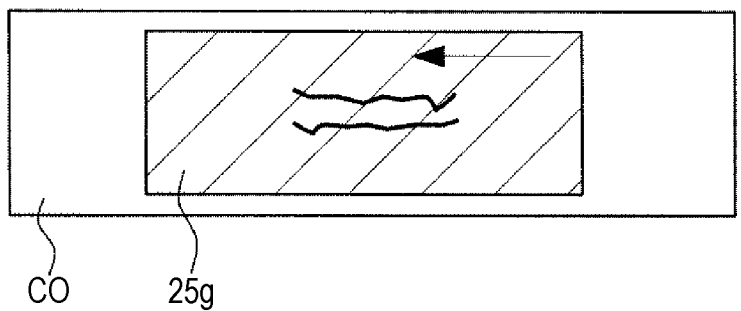
FIG. 44 is a view illustrating the advantages of modified examples 9 to 13 of Embodiment 7 of the invention.

FIG. 44 is a view illustrating the advantages of modified examples 9 to 13 of Embodiment 7 of the invention. FIG. 44 is a plan view showing a case where the touch electrode 25*g* formed on the opposite substrate 202 and each of the touch electrodes 62*tg* of the TFT array substrate 201 come into contact with each other, and the touch electrode 25*g* is damaged.

In the case of modified examples 9 to 13, as described above, the exposed portion of each of the touch electrodes 62*tg* of the TFT array substrate 201 extending in the y direction and the touch electrode 25*g* of the opposite substrate 202 come into contact with each other, and the touch electrodes 62*tg* are electrically connected to each other. For this reason, as shown in FIG. 44, a crack occurring in a portion of the touch electrode 25*g* of the opposite substrate 202 with which each of the touch electrodes 62*tg* of the TFT array substrate 201 comes into contact extends in the y direction. Therefore, the touch electrode 25*g* of the opposite substrate 202 can be prevented from being disconnected in the y direction.

Therefore, in this modified example, the reliability of the device can be further improved.

<8. Embodiment 8>

Hereinafter, Embodiment 8 of the invention will be described.

(Detailed Structure of Liquid Crystal Panel)

Figure 45:
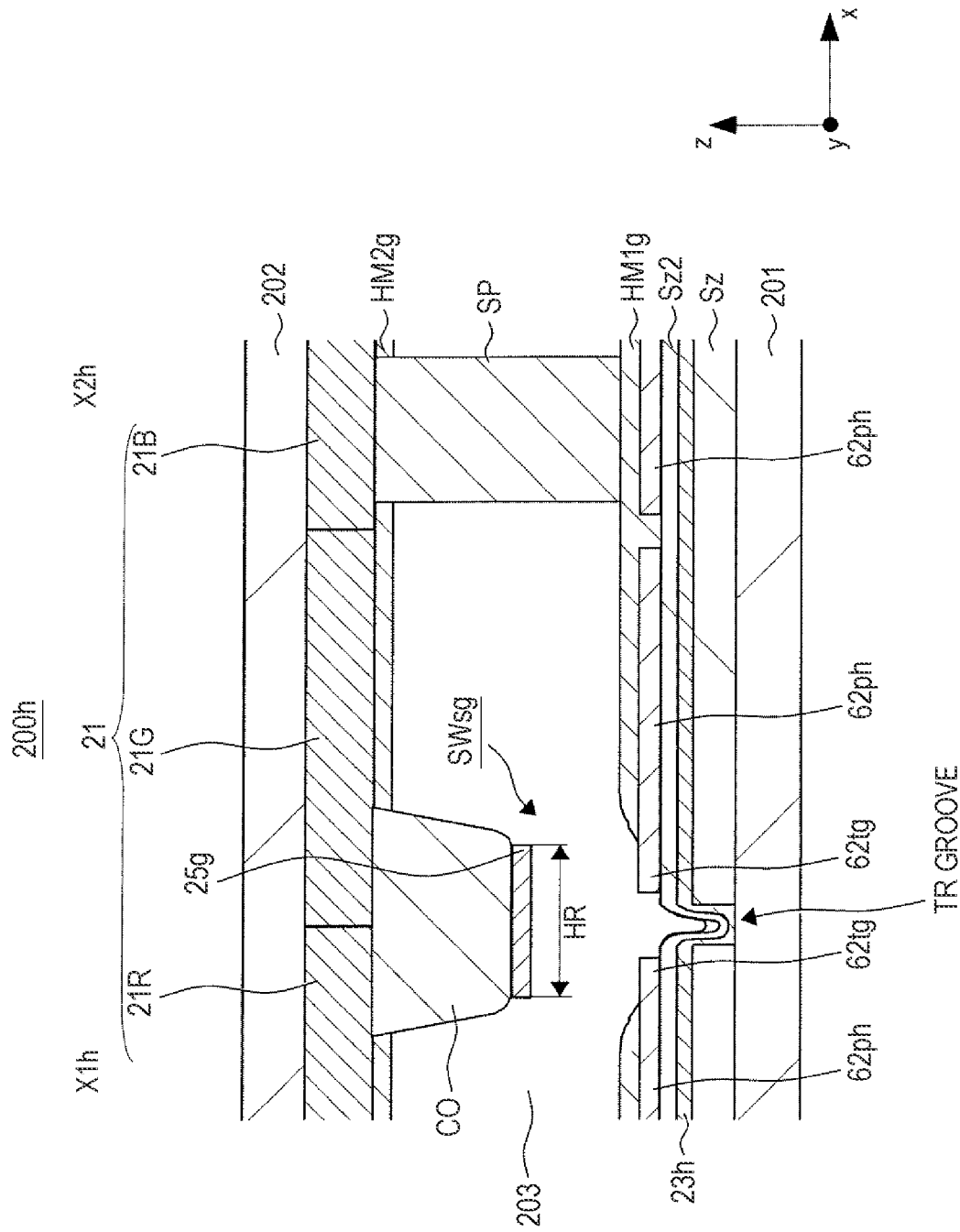
FIG. 45 is a view showing a main part of a liquid crystal panel according to Embodiment 8 of the invention.
Figure 46:
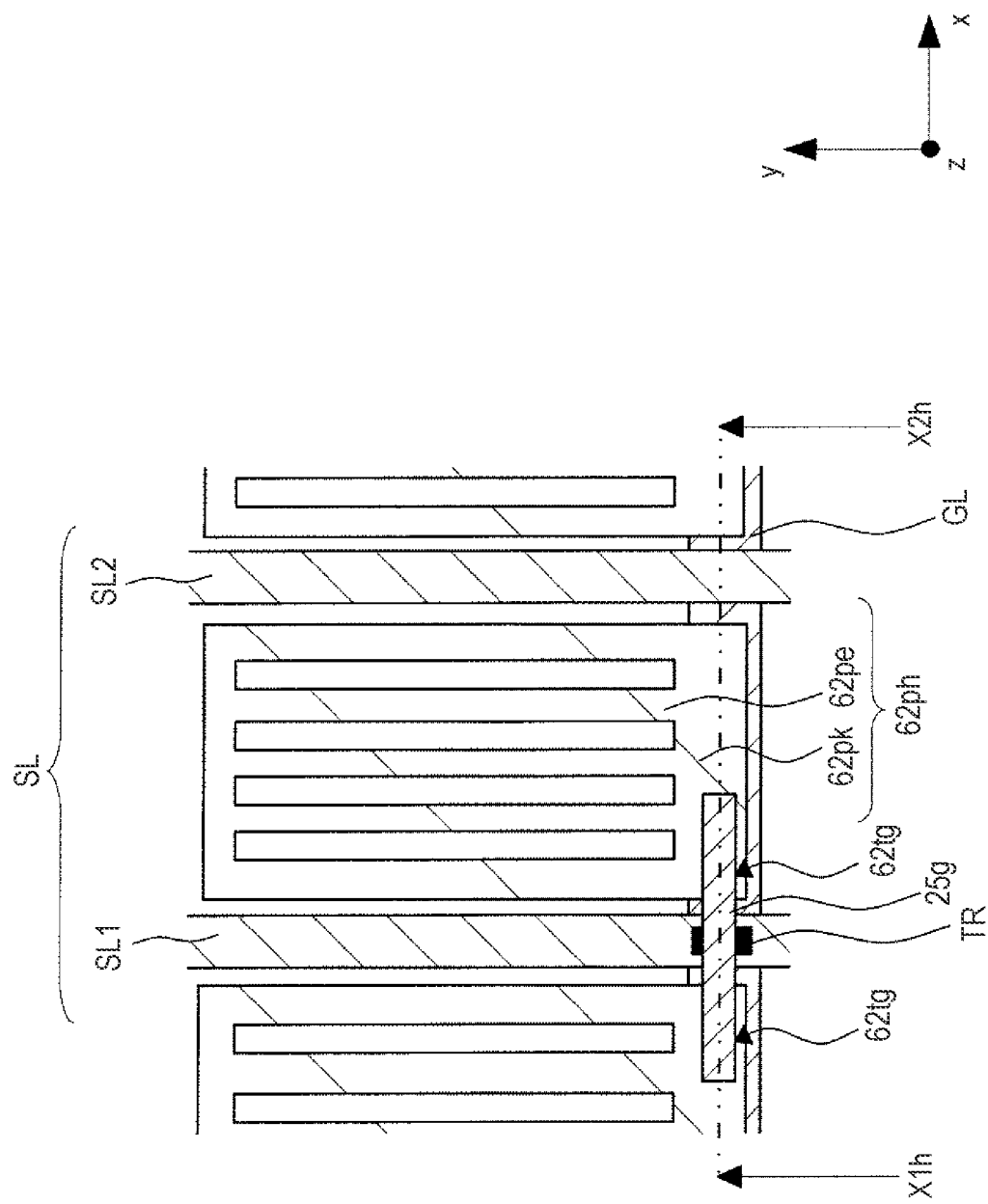
FIG. 46 is a view showing a main part of the liquid crystal panel according to Embodiment 8 of the invention.

FIGS. 45 and 46 are views showing a main part of a liquid crystal panel 200*h* according to Embodiment 8 of the invention.

FIG. 45 is a sectional view schematically showing the outline of a pixel P provided in a display area PA.

FIG. 46 is a top view schematically showing the outline of the pixel P provided in the display area PA. FIG. 45 corresponds to an X1*h*-X2*h* portion of FIG. 46. For convenience of illustration, the respective members are shown while scale change is suitably performed.

As shown in FIGS. 45 and 46, in this embodiment, respective parts of a pixel electrode 62*ph*, a common electrode 23*h*, and the like are formed so as to correspond to an FFS (Fringe Field Switching) system. This embodiment is similar to Embodiment 7 except for this point and points relevant thereto. Thus, the description of duplicate portions is omitted.

As shown in FIGS. 45 and 46, in this embodiment, each of the pixel electrode 62*ph* and the common electrode 23*h* is provided on the TFT array substrate 201.

As shown in FIG. 45, the pixel electrode 62*ph* is formed on the side of the TFT array substrate 201 facing the opposite substrate 202.

As shown in FIG. 45, the pixel electrode 62*ph* is provided on an inter-layer insulating film Sz2 which is formed of an insulating material so as to cover the common electrode 23*h* on the TFT array substrate 201. The pixel electrode 62*ph* is provided on the inter-layer insulating film Sz2 formed of, for example, a silicon nitride film.

In this embodiment, since the liquid crystal panel 200*h* is an FFS system, as shown in FIG. 46, the pixel electrode 62*ph* is patterned in a comb-like shape on the xy plane.

Specifically, as shown in FIG. 46, the pixel electrode 62*ph* has core parts 62*pk* and branch parts 62*pe*.

In the pixel electrode 62*ph*, as shown in FIG. 46, each of the core parts 62*pk* extends in the x direction. In this case, as shown in FIG. 46, two core parts 62*pk* are arranged in parallel in the y direction.

In the pixel electrode 62*ph*, as shown in FIG. 46, the branch parts 62*pe* are connected to the core parts 62*pk* and extend in the y direction. As shown in FIG. 46, plural branch parts 62*pe* are arranged to be spaced from each other in the x direction. The branch parts 62*pe* whose both ends are connected to the core parts 62*pk* are arranged so as to extend in parallel to each other.

As shown in FIG. 45, similarly to Embodiment 7, the pixel electrode 62*ph* is formed integrally with touch electrodes 62*tg*.

As shown in FIG. 45, the common electrode 23*h* is formed on the side of the TFT array substrate 201 facing the opposite substrate 202. In this case, the common electrode 23*h* is provided on the inter-layer insulating film Sz formed on the TFT array substrate 201. The common electrode 23h faces each of the plural pixel electrodes 62ph provided so as to correspond to the plural pixels P through the inter-layer insulating film Sz2.

A liquid crystal layer 203 is formed such that liquid crystal molecules are horizontally oriented.

(Conclusion)

As described above, in this embodiment, similarly to Embodiment 7, the touch electrodes 62tg of the TFT array substrate 201 are provided on the TFT array substrate 201 with an inter-layer insulating film (under layer) Sz having a concave groove TR intervening therebetween. A liquid crystal orientation film HM1g is formed such that, when an application liquid containing an orientation material is applied onto the surface on which the touch electrodes 62tg are formed, the application liquid enters the concave groove TR, and the top face of the touch electrode 62tg is exposed while not being covered therewith. Specifically, the inter-layer insulating film (under layer) Sz is provided such that the groove TR is located between a pair of touch electrodes 62tg, and the pair of touch electrodes 62tg are formed such that the surface around the groove TR is exposed while not being covered with the liquid crystal orientation film HM1g.

For this reason, in this embodiment, the surface of each of the touch electrodes 62tg can be exposed without separately executing a process of removing the liquid crystal orientation film HM1g from the surface of each of the touch electrodes 62tg. Therefore, in this embodiment, manufacturing efficiency and yield can be improved, and an increase in manufacturing costs can be suppressed. Further, the reliability of the device can be improved.

In this embodiment, the liquid crystal panel 200h is an FFS system, but as shown in FIG. 45, similarly to Embodiment 7, a convex part CO is formed on the xy plane of the opposite substrate 202 facing the TFT array substrate 201. In this case, as shown in FIG. 45, a flat area HR is provided at the top face of the convex part CO facing the TFT array substrate 201. The touch electrode 25g constituting the touch sensor switch SWsg is formed on the flat area HR as an independent pattern while not being formed in an area other than the flat area HR on the convex part CO. Therefore, in this embodiment, similarly to Embodiment 7, the touch electrodes 25g can be prevented from being disconnected, so the reliability of the device can be improved.

Modified Examples 1 to 3

Figure 47:
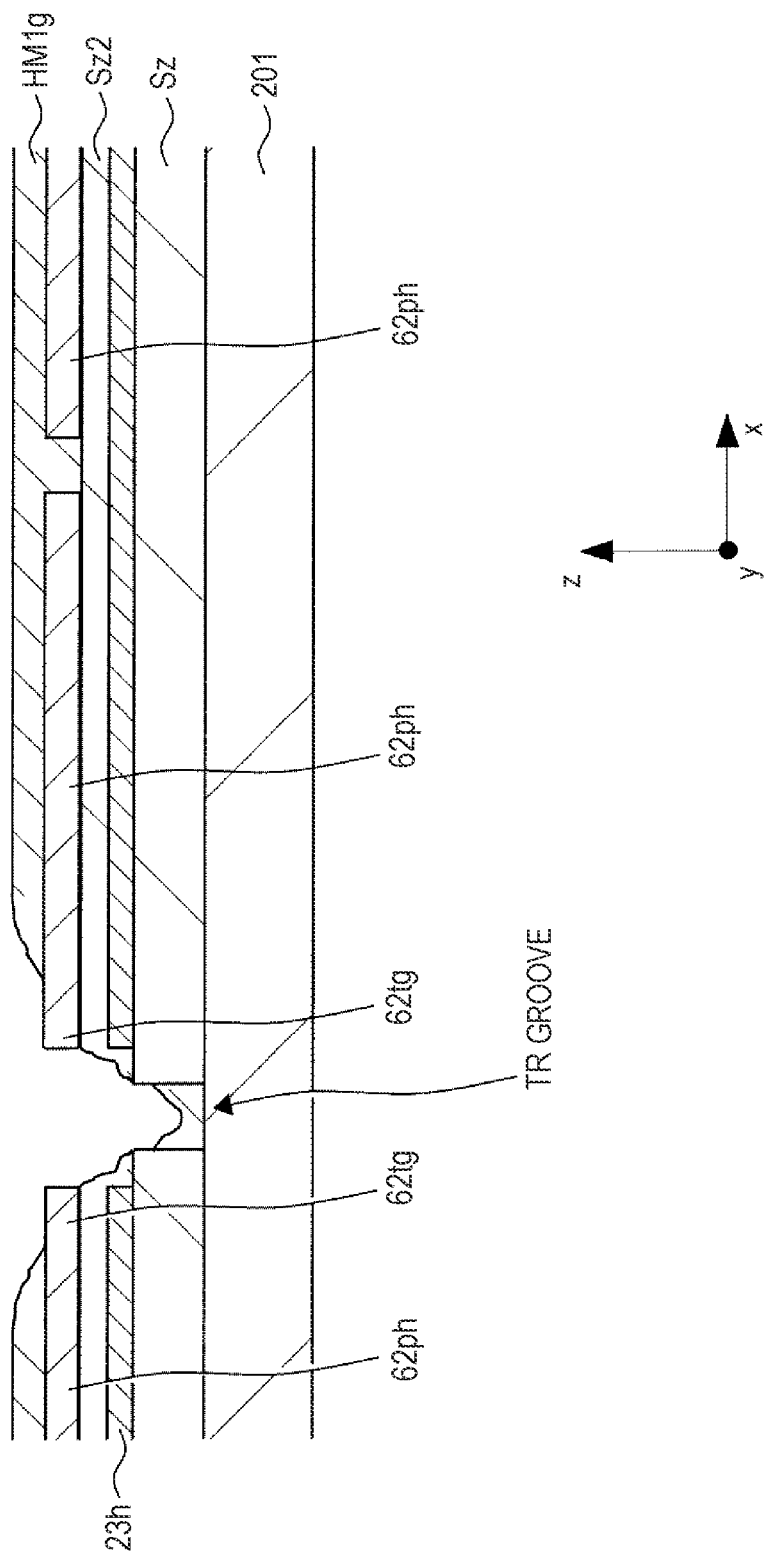
FIG. 47 is a view showing a common electrode and an inter-layer insulating film in a modified example of Embodiment 8 of the invention.
Figure 48:
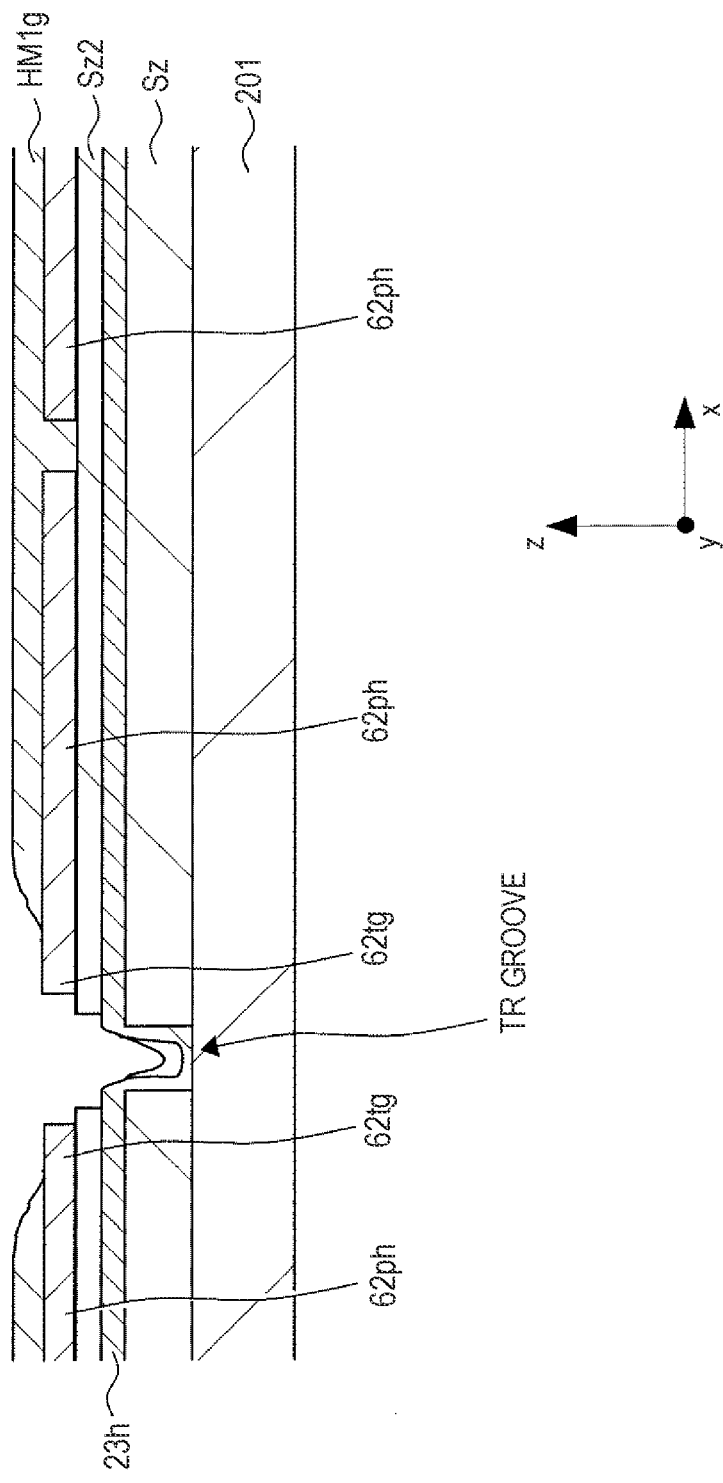
FIG. 48 is a view showing a common electrode and an inter-layer insulating film in a modified example of Embodiment 8 of the invention.
Figure 49:
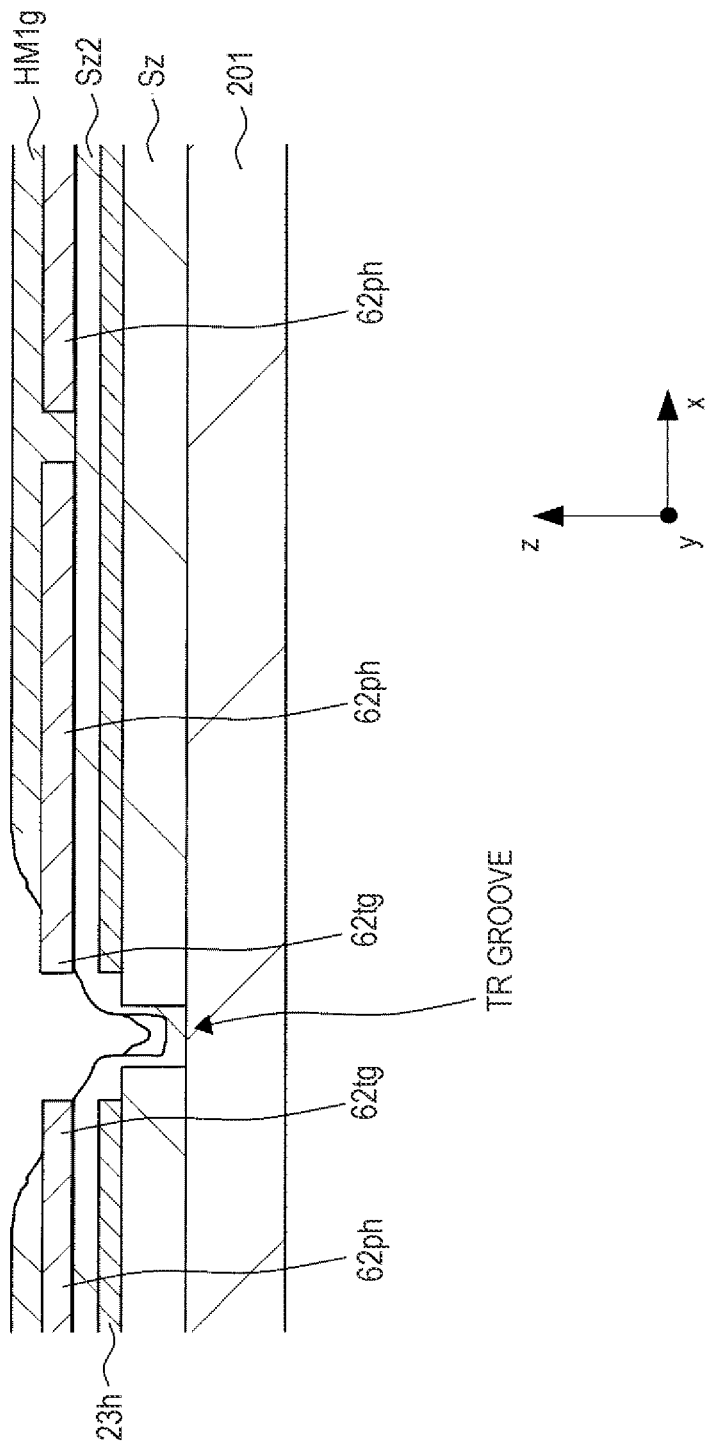
FIG. 49 is a view showing a common electrode and an inter-layer insulating film in a modified example of Embodiment 8 of the invention.

FIGS. 47 to 49 are views showing a common electrode 23h, and an inter-layer insulating film Sz2 as modified examples of Embodiment 8 of the invention. The respective drawings show the section.

Although in the above-description, as shown in FIG. 45, a case where the common electrode 23h and the inter-layer insulating film Sz2 cover the inside of the groove TR on the TFT array substrate 201 has been described, the invention is not limited thereto. As shown in the respective drawings, the common electrode 23h and the inter-layer insulating film Sz2 may not be formed so as to cover the inside of the groove TR.

Specifically, as modified example 1, as shown in FIG. 47, a common electrode 23h and an inter-layer insulating film Sz2 may be formed in the same manner as in the foregoing embodiment, except that the inside of the groove TR is not covered therewith.

In this case, the common electrode 23h is not formed over a step, occurrence of leakage when being damaged is reduced.

As modified example 2, as shown in FIG. 48, a common electrode 23h and an inter-layer insulating film Sz2 may be formed in the same manner as in the foregoing embodiment, except that only the inter-layer insulating film Sz2 does not cover the inside the groove TR.

As modified example 3, as shown in FIG. 49, a common electrode 23h and an inter-layer insulating film Sz2 may be formed in the same manner as in the foregoing embodiment, except that only the common electrode 23h does not cover the inside of the groove TR.

Modified Example 4

Figure 50:
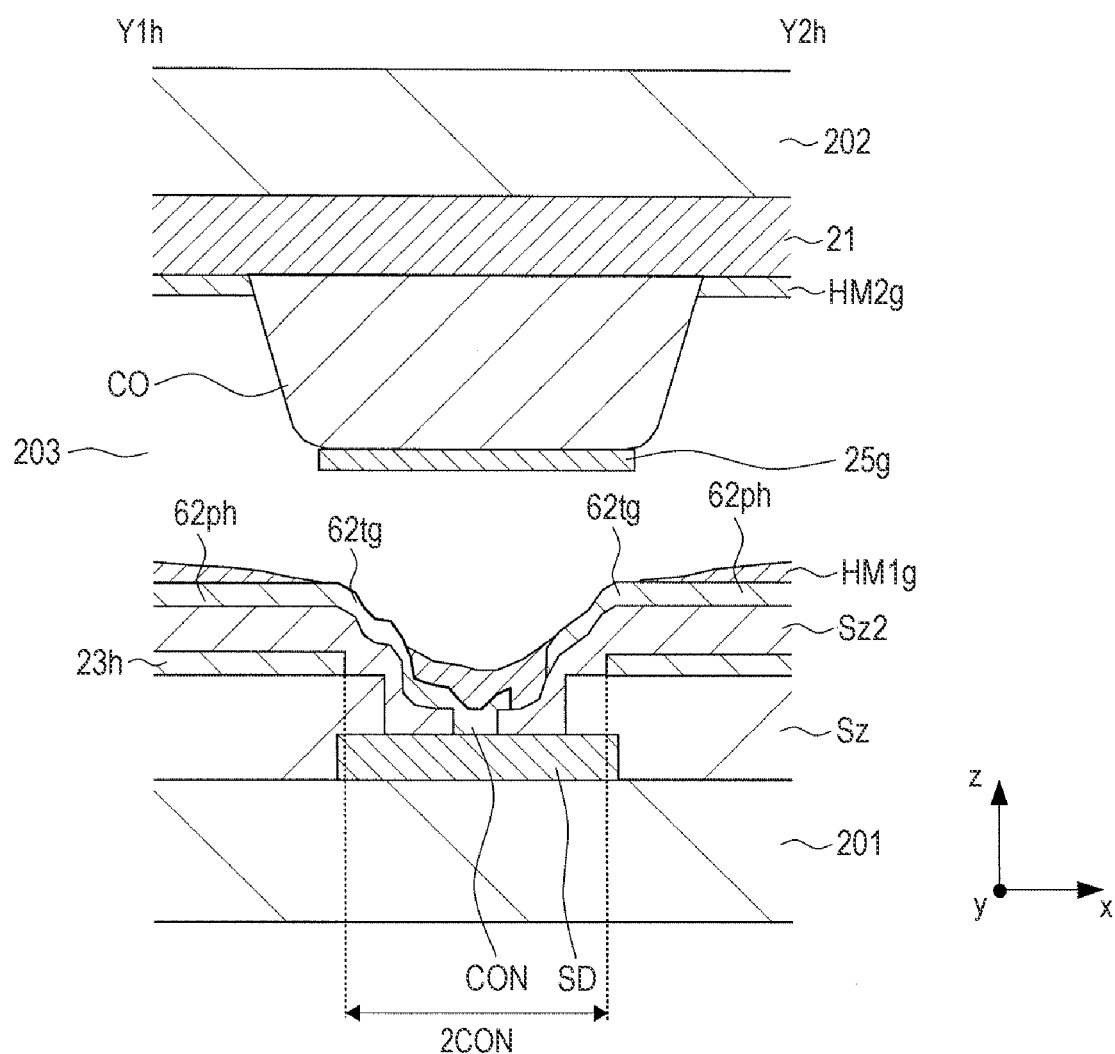
FIG. 50 is a view showing a main part of a modified example of Embodiment 8 of the invention.
Figure 51:
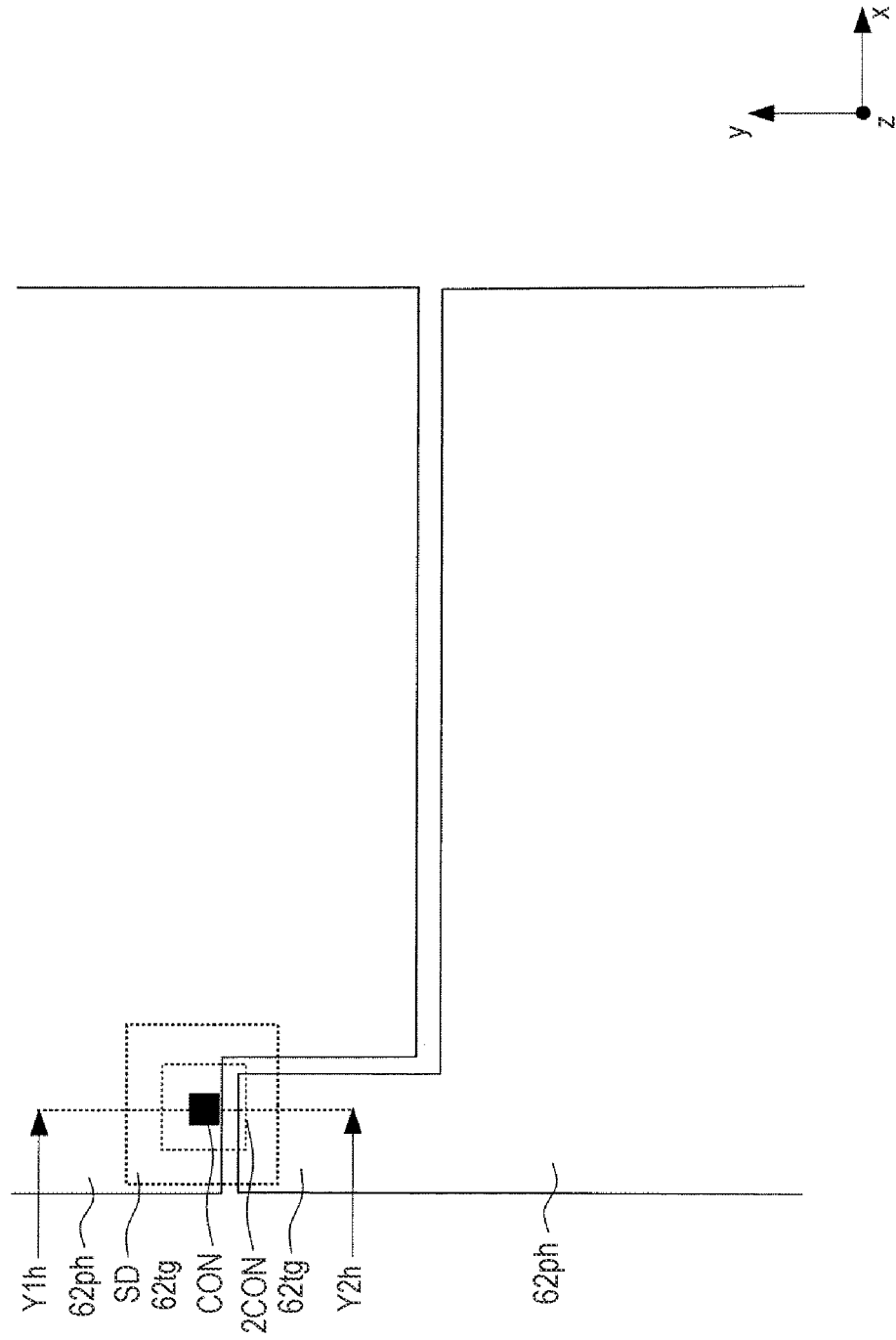
FIG. 51 is a view showing a main part of a modified example of Embodiment 8 of the invention.

FIGS. 50 to 51 are diagram showing a main part of a modified example of Embodiment 8 of the invention.

FIG. 50 is a sectional view schematically showing the outline of a pixel P provided in a display area PA.

FIG. 51 is a top view schematically showing the outline of the pixel P provided in the display area PA. FIG. 50 corresponds to a Y1h-Y2h portion of FIG. 51. For convenience of illustration, the respective members are shown while scale change is suitably performed.

As shown in FIGS. 50 and 51, it is preferable that the touch electrodes 62tg are formed at portions where contacts CON and 2CON are formed so as to be electrically connected to a source electrode of a conductive layer SD (a layer electrically connected to the source electrode of the pixel switching element 31).

Specifically, in this modified example, the conductive layer SD connected to each of the touch electrodes 62tg is provided on the side of the TFT array substrate 201 facing the opposite substrate 202. A touch sensor switch SWsg is provided so as to come into contact with a pair of touch electrodes 62tg and a touch electrode 25 at the contacts (CON and 2CON) where the touch electrodes 62gt and the conductive layer SD are connected to each other.

In this case, the pixel layout can be effectively arranged, so the aperture ratio of the liquid crystal display device can be improved.

When the same configuration is made for a mode, such as an IPS (In-Plane-Switching) system, in which a transverse electric field is applied to the liquid crystal layer 203, other then the FFS system, the same effects can be obtained.

<9. Others>

When the invention is carried out, no limitation is made to the foregoing embodiments, but various modifications can be adopted. The respective embodiments may be suitably combined with each other.

Although in the foregoing embodiments, a case where the liquid crystal panel is a transmission type has been described, the invention is not limited thereto. The invention may be applied to a case where a liquid crystal panel is of a reflection type or a semi-transparent type in which both the transmission type and the reflection type can be used.

The invention may be applied to a display panel, such as an organic EL display or the like, other than the liquid crystal panel.

The invention may be applied to a resistive film type touch sensor externally attached to a device, in addition to a case where the touch sensor is incorporated in the display panel.

The liquid crystal display device 100 of this embodiment may be applied as a component of various electronic apparatuses.

FIGS. 52 to 56 are views showing an electronic apparatus to which the liquid crystal display device 100 according to the embodiment of the invention is applied.

Figure 52:
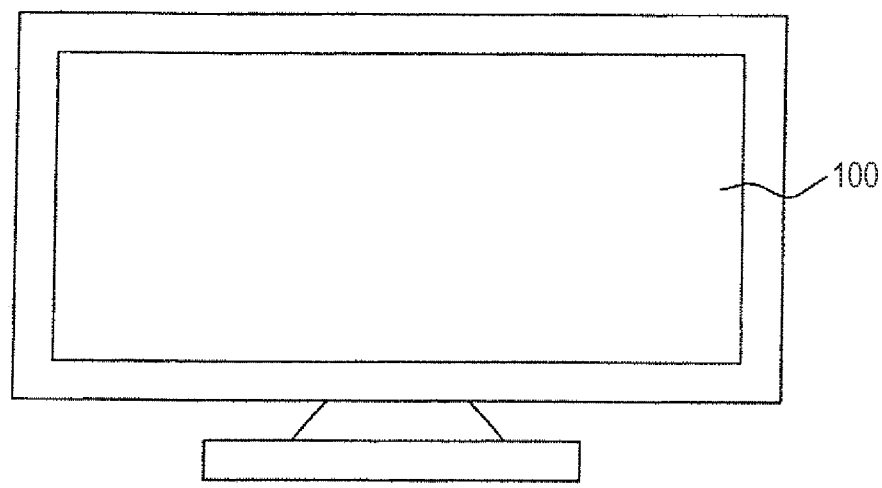
FIG. 52 is a view showing an electronic apparatus to which the display device according to the embodiment of the invention is applied.

As shown in FIG. 52, in a television to receive and display a television broadcast, the liquid crystal display device 100 may be applied as a display device which displays the received image on a display screen and to which an operation instruction of an operator is input.

Figure 53:
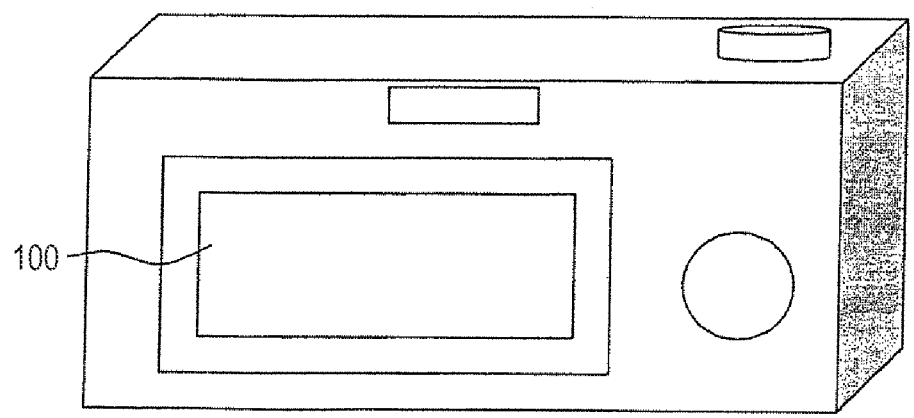
FIG. 53 is a view showing an electronic apparatus to which the display device according to the embodiment of the invention is applied.

As shown in FIG. 53, in a digital still camera, the liquid crystal display device 100 may be applied as an image display device which displays an image, such as a photographed image, on a display screen and to which an operation instruction of an operator is input.

Figure 54:
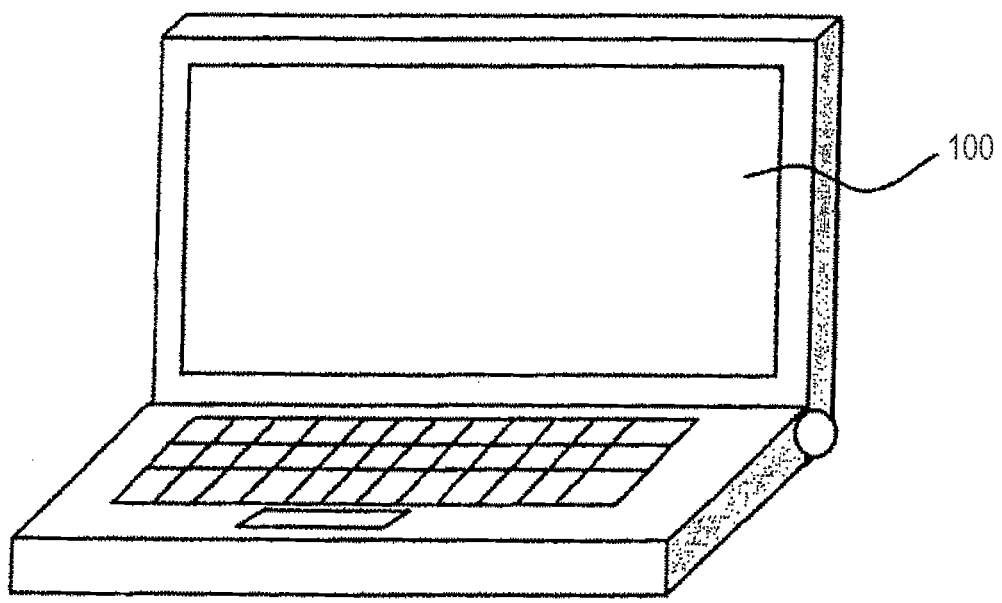
FIG. 54 is a view showing an electronic apparatus to which the display device according to the embodiment of the invention is applied.

As shown in FIG. 54, in a notebook type personal computer, the liquid crystal display device 100 may be applied as a display device which displays an operation image and the like on a display screen and to which an operation instruction of an operator is input.

Figure 55:
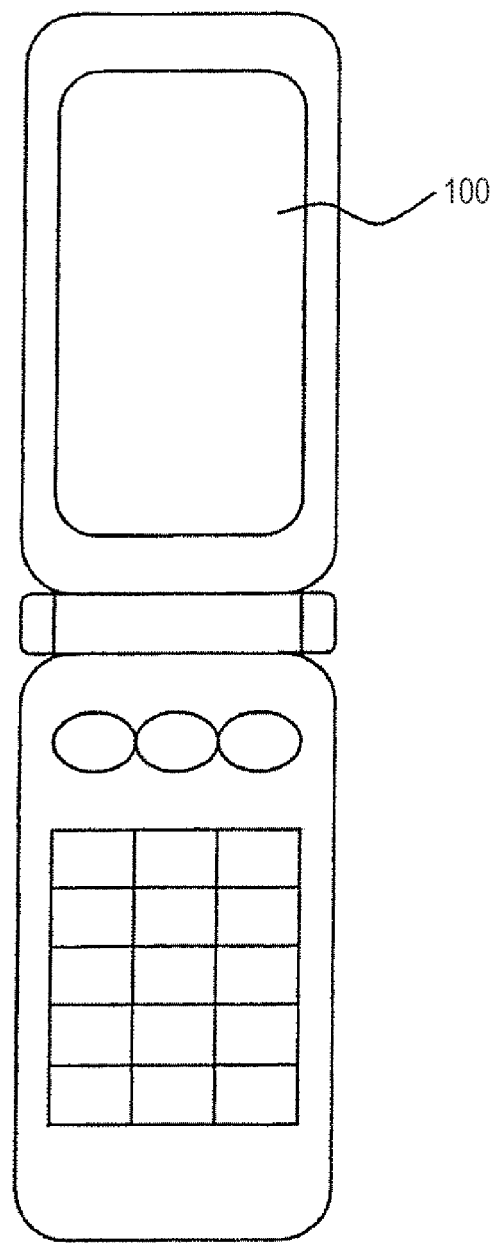
FIG. 55 is a view showing an electronic apparatus to which the display device according to the embodiment of the invention is applied.

As shown in FIG. 55, in a cellular phone terminal, the liquid crystal display device 100 may be applied as a display device which displays an operation image and the like on a display screen and to which an operation instruction of an operator is input.

Figure 56:
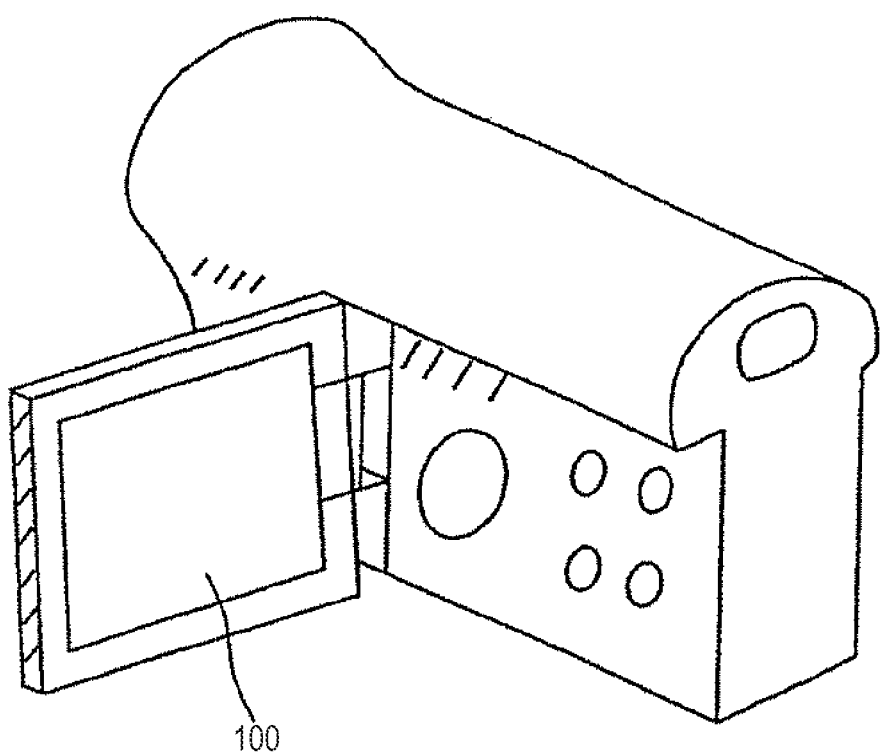
FIG. 56 is a view showing an electronic apparatus to which the display device according to the embodiment of the invention is applied.

As shown in FIG. 56, in a video camera, the liquid crystal display device 100 may be applied as a display device which displays an operation image and the like on a display screen and to which an operation instruction of an operator is inputted.

In the foregoing embodiments, the touch electrodes 25, 25b, 25c, 25e, 25f, and 25g correspond to one of the first touch electrode and the second touch electrode of the invention. In the foregoing embodiments, the touch electrodes 62t, 62tb, 62td, 62te, 62tf, and 62tg correspond to one of the first touch electrode and the second touch electrode of the invention. In the foregoing embodiments, the elastic members 63, 63b, 63e, 63f, 71c, and 71d correspond to the elastic member of the invention. In the foregoing embodiments, the liquid crystal display device 100 corresponds to the liquid crystal display device, the display device, and the information input device of the invention. In the foregoing embodiments, the liquid crystal panels 200, 200b, 200c, 200d, 200e, 200eb, 200f, 200fb, 200g, and 200h correspond to the liquid crystal panel of the invention. In the foregoing embodiments, the TFT array substrate 201 corresponds to one of the first substrate and the second substrate of the invention. In the foregoing embodiments, the opposite substrate 202 corresponds to one of the first substrate and the second substrate of the invention. In the foregoing embodiments, the liquid crystal layer 203 corresponds to the liquid crystal layer of the invention. In the foregoing embodiments, the concave and convex areas 500, 500b, 500c, 500d, 500e, and 500f corresponds to the concave and convex area of the invention. In the foregoing embodiments, the liquid crystal orientation films HM1, HM1b, HM1d, HM1e, HM1f, and HM1g correspond to one of the first liquid crystal orientation film and the second liquid crystal orientation film. In the foregoing embodiments, the liquid crystal orientation films HM2, HM2b, HM2c, HM2e, HM2f, and HM2g correspond to one of the first liquid crystal orientation film and the second liquid crystal orientation film. In the foregoing embodiments, the display area PA corresponds to the display area of the invention. In the foregoing embodiments, the column spacers SP, SPe, and SPf correspond to the column spacer of the invention. In the foregoing embodiments, the touch sensor switches SWs, SWsb, SWsc, SWsd, SWse, SWsf, and SWsg correspond to the touch sensor switch of the invention.

The present application contains subject matter related to that disclosed in Japanese Priority Patent Applications JP 2009-023931 and JP 2009-265486 filed in the Japan Patent Office on Feb. 4, 2009 and Nov. 20, 2009, respectively, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
a liquid crystal panel including,
(A) a first substrate,
(B) a second substrate opposite to and spaced from the first substrate,
(C) a color filter having a first plurality of grooves spaced from each other along a surface of the color filter; and
(D) a liquid crystal layer provided in a space between the first substrate and the second substrate, the liquid crystal layer having a built-in touch sensor switch in a display area operable to cause an image to be displayed by the liquid crystal panel, the touch sensor switch including (i) a first touch electrode provided on a surface of the first substrate facing the second substrate, and (ii) a second touch electrode provided on a surface of the second substrate facing the first substrate and spaced from and facing the first touch electrode,
wherein,
the first touch electrode and the second touch electrode are operable to contact each other when the liquid crystal panel is deformed by an external pressure,
liquid crystal molecules in the liquid crystal layer are oriented by (i) a first liquid crystal orientation film provided on the surface of the first substrate facing the second substrate and (ii) a second liquid crystal orientation film provided on the surface of the second substrate facing the first substrate,
the first touch electrode is provided on the surface of the first substrate facing the second substrate and covering a surface of a concave and convex area of an inter-layer insulating film, the concave and convex area including a second plurality of grooves spaced from each other along the concave and convex area, the second plurality of grooves being complementary to the first plurality of grooves in the surface of the color filter, and
the surface of the first touch electrode includes an orientation material, the orientation material exposing a top face of a convex part of the concave and convex area in the first touch electrode.

2. The liquid crystal display device according to claim 1, wherein the second touch electrode is provided on the surface of the second substrate facing the first substrate and covers at least a top face of an elastic member protruding convexly.

3. The liquid crystal display device according to claim 2, wherein,
the liquid crystal panel includes a column spacer provided in the space between the first substrate and the second substrate, and
a height of the elastic member provided on the second substrate is lower than the column spacer.

4. The liquid crystal display device according to claim 1, wherein in a state where the first touch electrode is covered on the concave and convex area, a width of the convex part is 0.5 to 5.0 μm, and a distance between the top face of the convex part and a bottom face of the concave part is 0.5 to 2.0 μm.

5. A manufacturing method of a liquid crystal display device, the method comprising the step of:

forming a liquid crystal panel including a first substrate, a second substrate opposite to and spaced from the first substrate, a color filter having a first plurality of grooves spaced from each other along a surface of the color filter, and a liquid crystal layer provided in a space between the first substrate and the second substrate, wherein, the liquid crystal panel forming step includes the steps of,
(A) forming a touch sensor switch in a display area operable to cause an image to be displayed in the liquid crystal panel;
(B) forming a first liquid crystal orientation film on a surface of the first substrate facing the second substrate, and
(C) forming a second liquid crystal orientation film on a surface of the second substrate facing the first substrate, the touch sensor switch forming step includes the steps of,
(A) forming a first touch electrode on the surface of the first substrate facing the second substrate, and
(B) forming a second touch electrode on the surface of the second substrate facing the first substrate, the second touch electrode spaced from and facing the first touch electrode, in the first touch electrode forming step, the first touch electrode is formed on the surface of the first substrate facing the second substrate and covering a surface of a concave and convex area of an inter-layer insulation film, the concave and convex area including a second plurality of grooves spaced from each other along the concave and convex area the second plurality of grooves being complementary to the first plurality of grooves in the surface of the color filter, and in the first liquid crystal orientation film forming step, the first liquid crystal orientation film is formed by applying an orientation material such that a surface of a top face of a convex part of the concave and convex area in the first touch electrode is exposed.

6. A display device comprising:

a display panel including a first substrate, a second substrate spaced from and opposite to the first substrate, a color filter having a first plurality of grooves spaced from each other along a surface of the color filter, and a touch sensor switch, the touch sensor switch including (i) a first touch electrode provided on a surface of the first substrate facing the second substrate, and (ii) a second touch electrode provided on a surface of the second substrate facing the first substrate and spaced from and facing the first touch electrode, wherein, the first touch electrode and the second touch electrode are operable to contact each other when the touch panel is deformed by an external pressure, and the first touch electrode is provided on the surface of the first substrate facing the second substrate and covering a surface of a concave and convex area of an inter-layer insulation film, the concave and convex area including a second plurality of grooves spaced from each other along the concave and convex area, the second plurality of grooves corresponding to the first plurality of grooves in the surface of the color filter, and the surface of the first touch electrode includes an application film formed to expose a surface of a top face of a convex part of the concave and convex area in the first touch electrode.

7. An information input device comprising:

a touch panel including a first substrate, a second substrate spaced from and opposite to the first substrate, a color filter having a first plurality of grooves spaced from each other along a surface of the color filter, and a touch sensor switch, the touch sensor switch including (i) a first touch electrode provided on a surface of the first substrate facing the second substrate, and (ii) a second touch electrode provided on a surface of the second substrate facing the first substrate and spaced from and facing the first touch electrode, wherein, the first touch electrode and the second touch electrode are operable to contact each other when the touch panel is deformed by an external pressure, and the first touch electrode is provided on the surface of the first substrate facing the second substrate and covering a surface of a concave and a convex area, the concave and convex area including a second plurality of grooves spaced from each other along the concave and convex area, the second plurality of grooves being complementary to the first plurality of grooves in the surface of the color filter, and the surface of the first touch electrode includes an application film formed to expose a surface of a top face of a convex part of the concave and convex area in the first touch electrode.

* * * * *